June 3, 1930. M. M. GOLDBERG 1,761,662
AUDITING MACHINE
Filed Feb. 26, 1923 30 Sheets-Sheet 1

June 3, 1930.　　　M. M. GOLDBERG　　　1,761,662
AUDITING MACHINE
Filed Feb. 26, 1923　　　30 Sheets-Sheet 2

Inventor
MAXIMILIAN M. GOLDBERG
By Carl Beust
Henry E. Stauffer
His Attorneys

June 3, 1930.　　　M. M. GOLDBERG　　　1,761,662
AUDITING MACHINE
Filed Feb. 26, 1923　　30 Sheets-Sheet 3

Inventor
MAXIMILIAN M. GOLDBERG
By Earl Beust
Henry E. Stauffer
His Attorneys

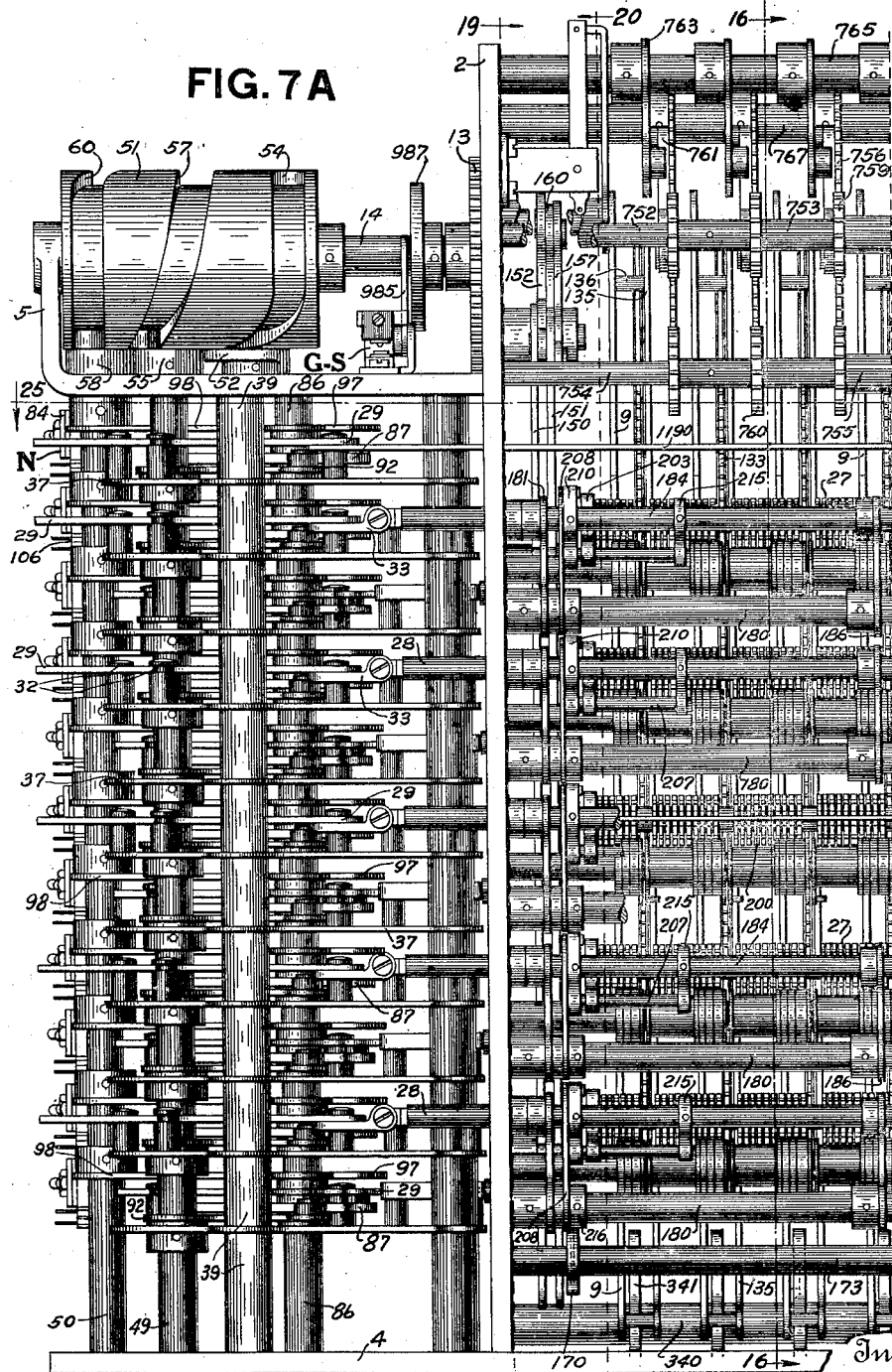

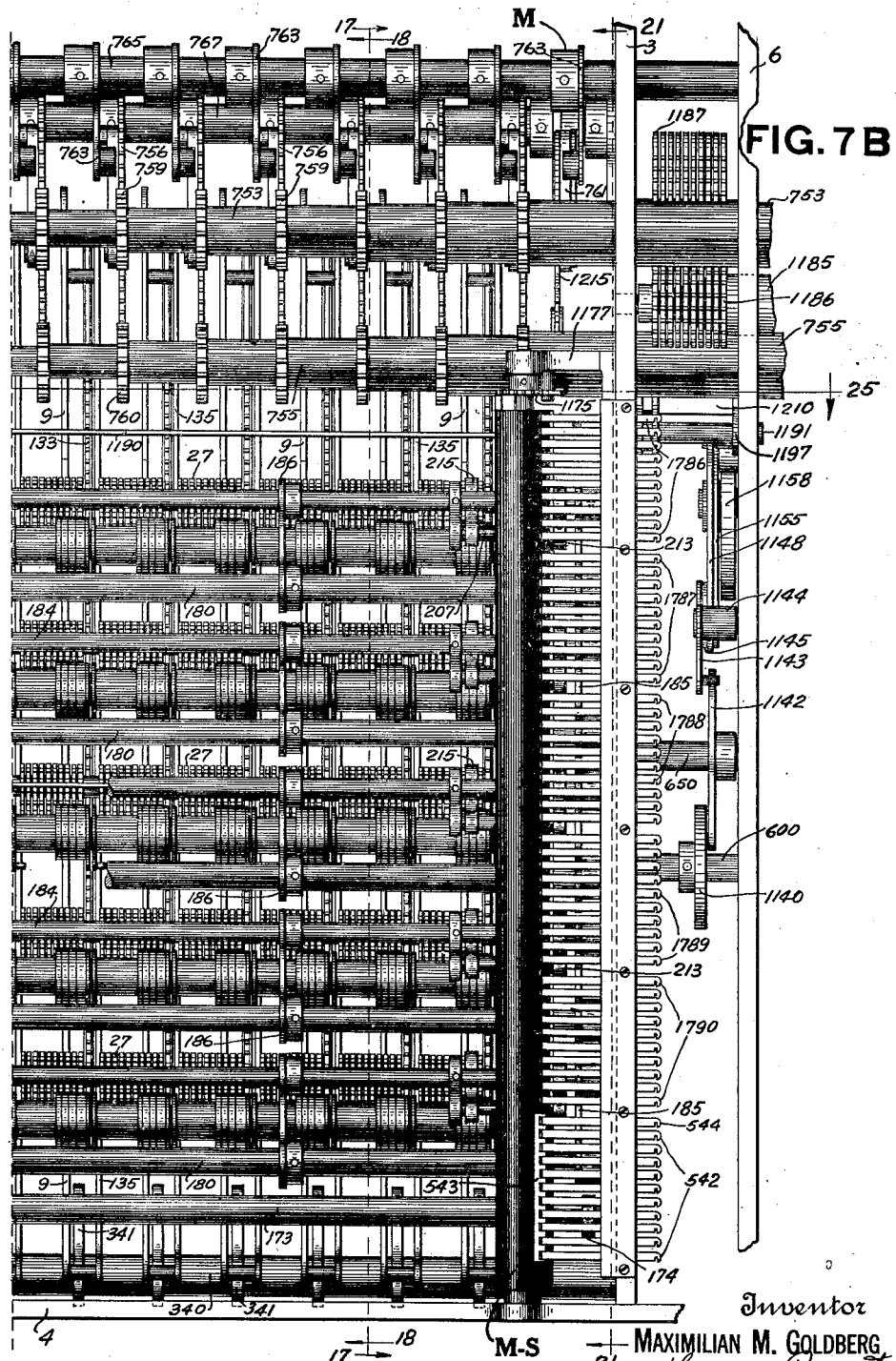

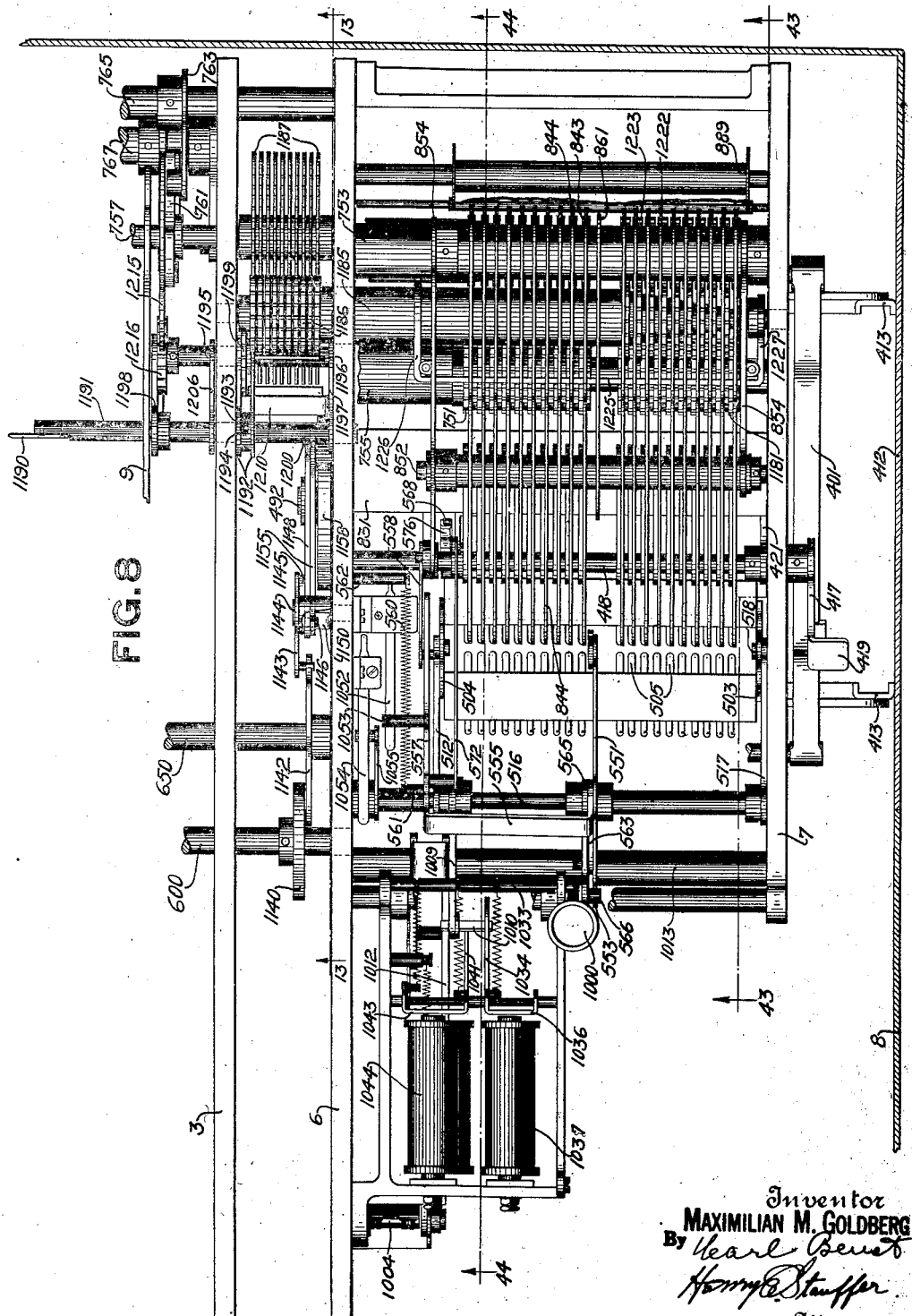

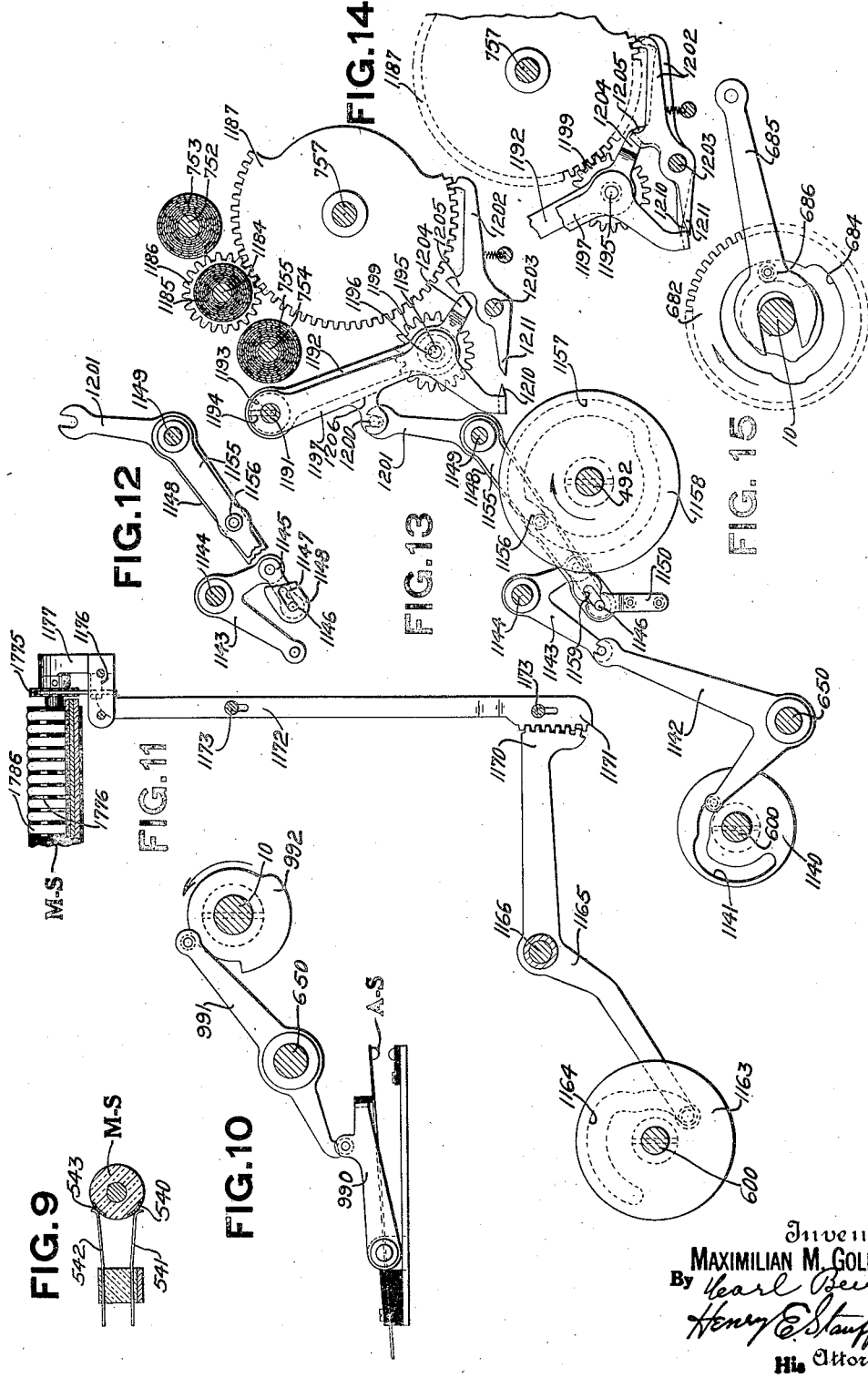

June 3, 1930.  M. M. GOLDBERG  1,761,662
AUDITING MACHINE
Filed Feb. 26, 1923  30 Sheets-Sheet 8

Inventor
MAXIMILIAN M. GOLDBERG
By
His Attorneys

June 3, 1930.  M. M. GOLDBERG  1,761,662
AUDITING MACHINE
Filed Feb. 26, 1923  30 Sheets-Sheet 9

Inventor
MAXIMILIAN M. GOLDBERG
By
His Attorneys

June 3, 1930. M. M. GOLDBERG 1,761,662
AUDITING MACHINE
Filed Feb. 26, 1923 30 Sheets-Sheet 12

Inventor
MAXIMILIAN M. GOLDBERG
By
His Attorneys

June 3, 1930. M. M. GOLDBERG 1,761,662
AUDITING MACHINE
Filed Feb. 26, 1923 30 Sheets-Sheet 13

Inventor
MAXIMILIAN M. GOLDBERG
By Pearl Beust
Henry E Stauffer
His Attorneys

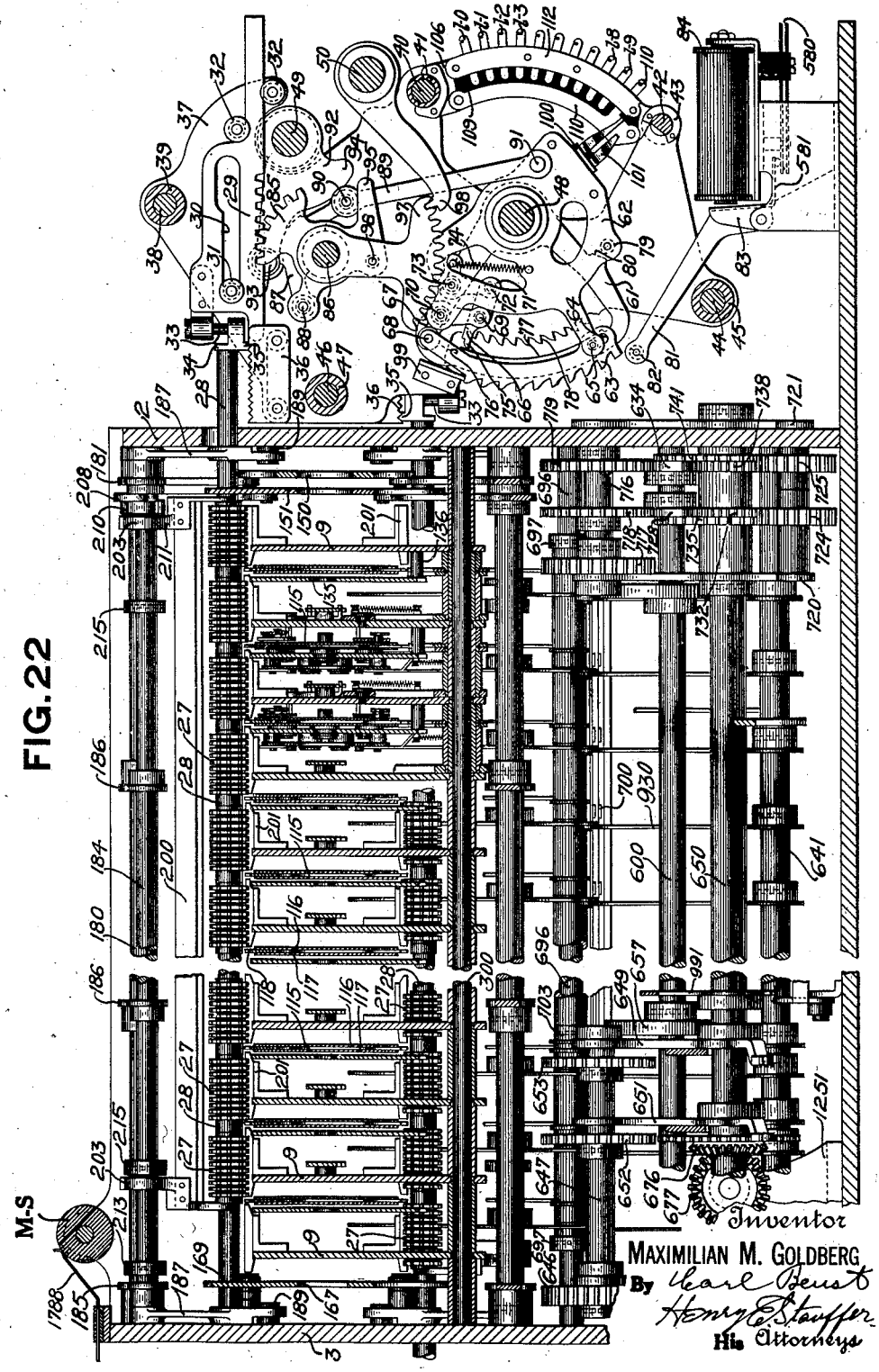

June 3, 1930.   M. M. GOLDBERG   1,761,662
AUDITING MACHINE
Filed Feb. 26, 1923   30 Sheets-Sheet 15
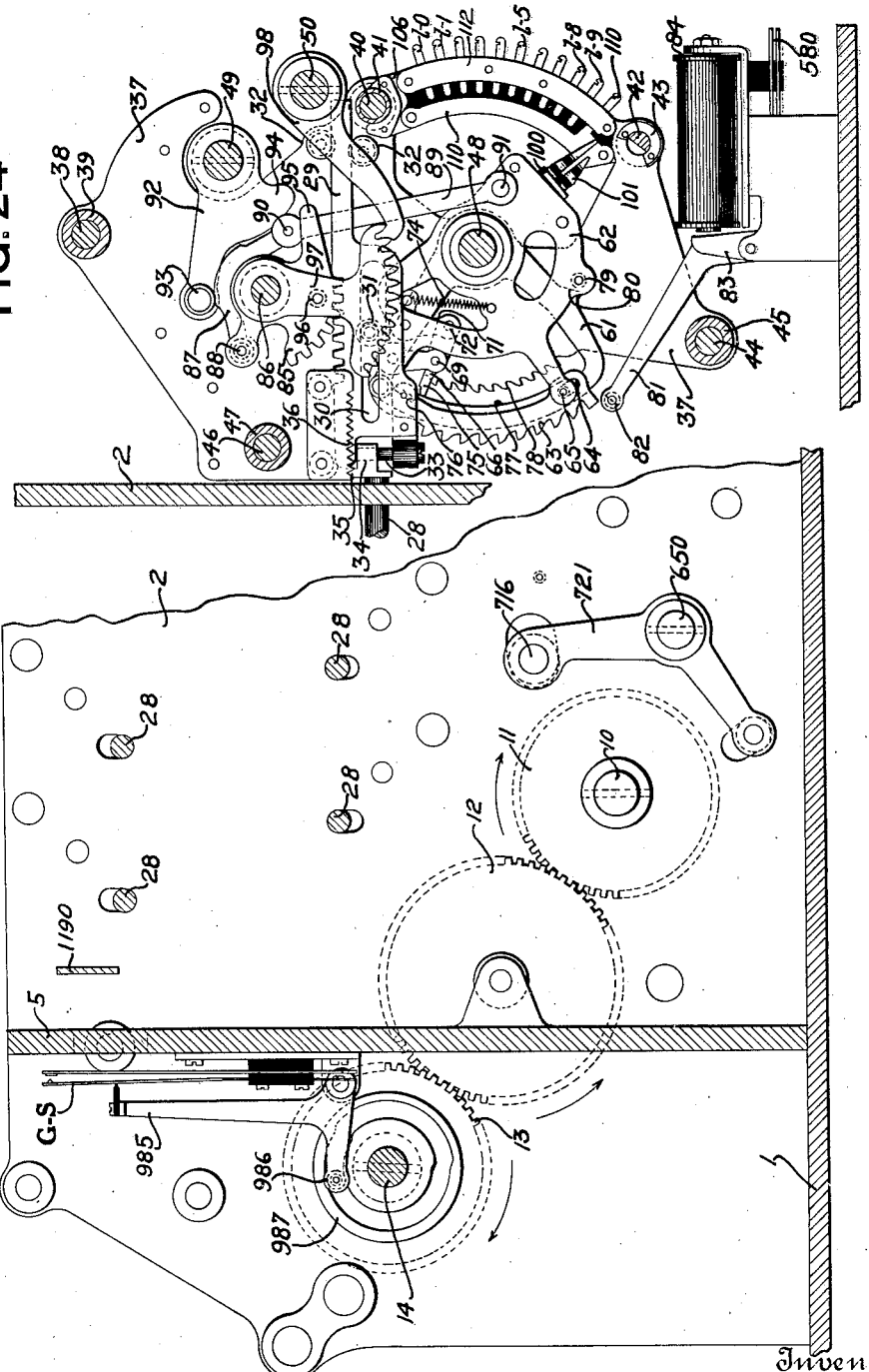
Inventor
MAXIMILIAN M. GOLDBERG
By
His Attorneys June 3, 1930.    M. M. GOLDBERG    1,761,662
AUDITING MACHINE
Filed Feb. 26, 1923    30 Sheets-Sheet 16

Inventor
MAXIMILIAN M. GOLDBERG
By Carl Beust
Henry E. Stauffer
His Attorneys

June 3, 1930.  M. M. GOLDBERG  1,761,662
AUDITING MACHINE
Filed Feb. 26, 1923    30 Sheets-Sheet 17
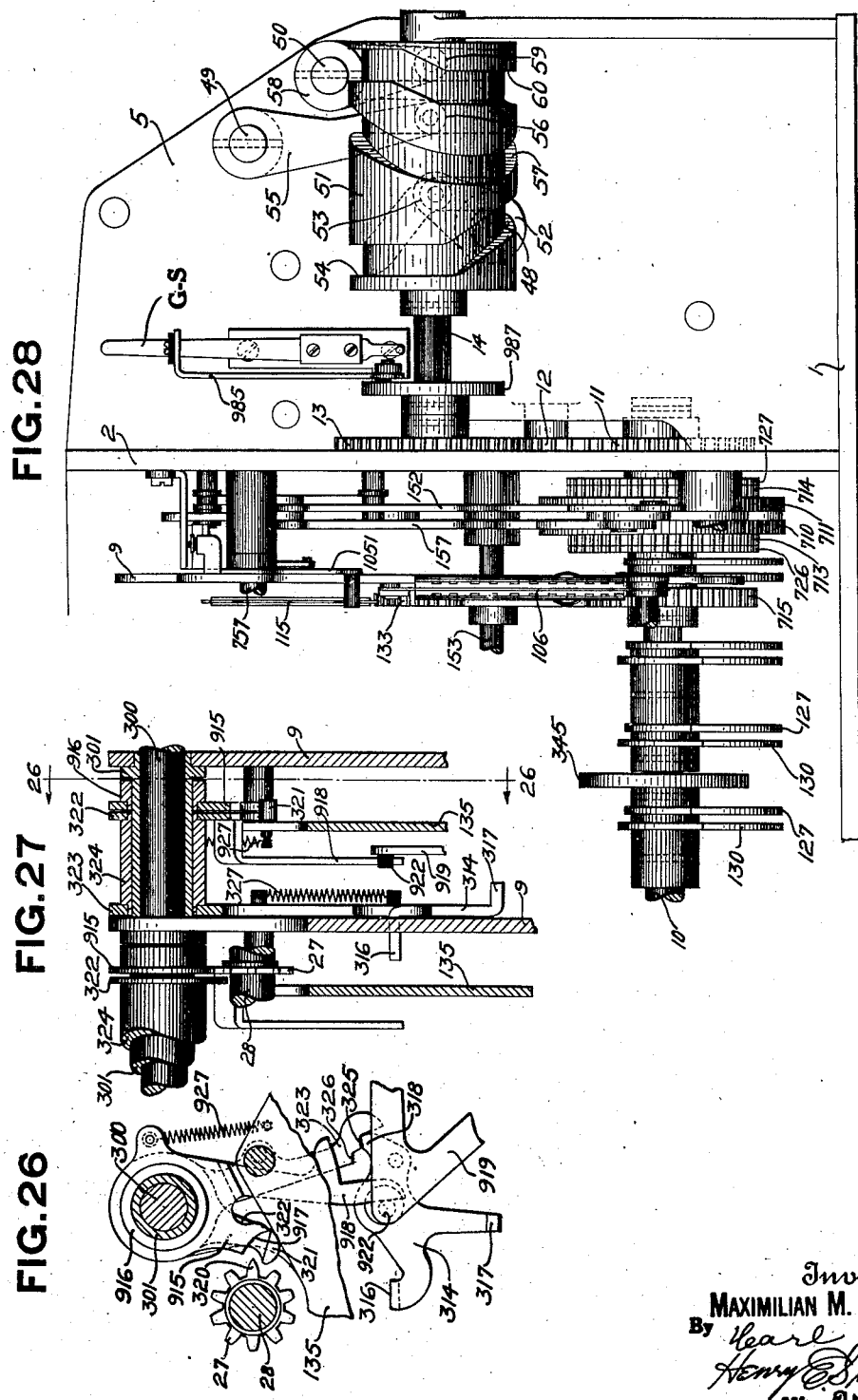
Inventor
MAXIMILIAN M. GOLDBERG
By Hearl Beust
Henry E Stauffer
His Attorneys

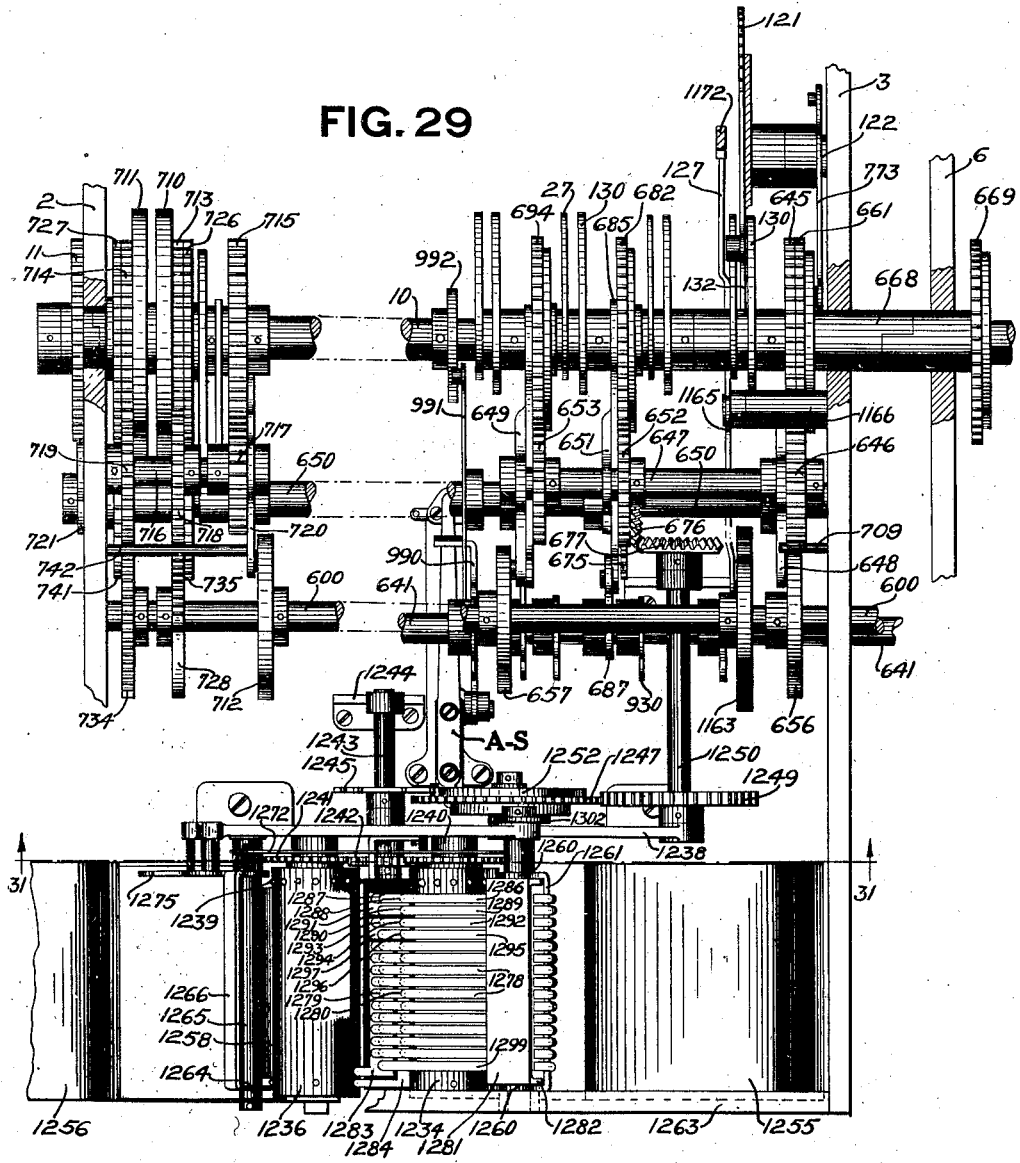

June 3, 1930.  M. M. GOLDBERG  1,761,662
AUDITING MACHINE
Filed Feb. 26, 1923   30 Sheets-Sheet 19

Inventor
MAXIMILIAN M. GOLDBERG
By Carl Beust
Henry E. Stauffer
His Attorneys

June 3, 1930.  M. M. GOLDBERG  1,761,662
AUDITING MACHINE
Filed Feb. 26, 1923   30 Sheets-Sheet 20
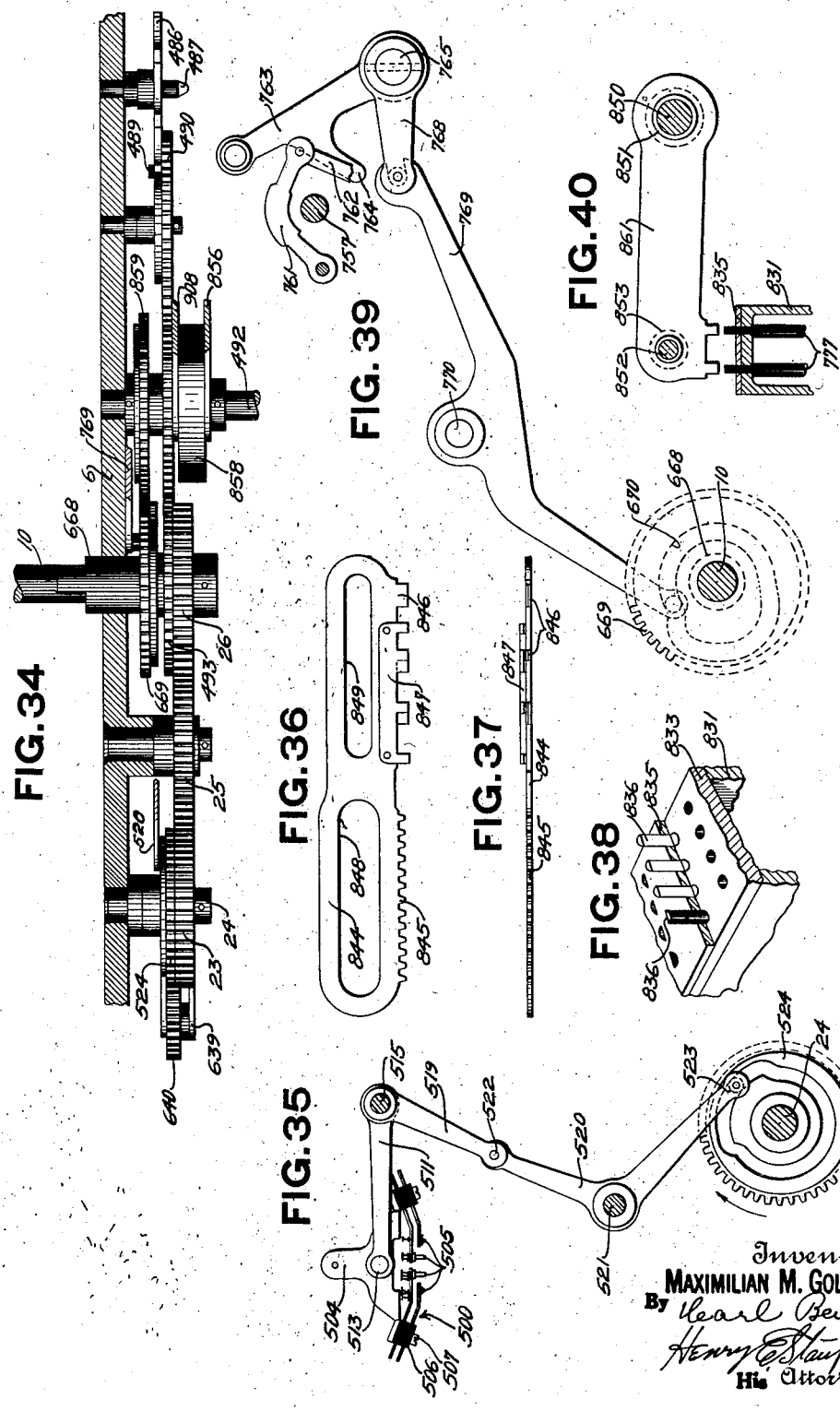
Inventor
MAXIMILIAN M. GOLDBERG
By
His Attorneys

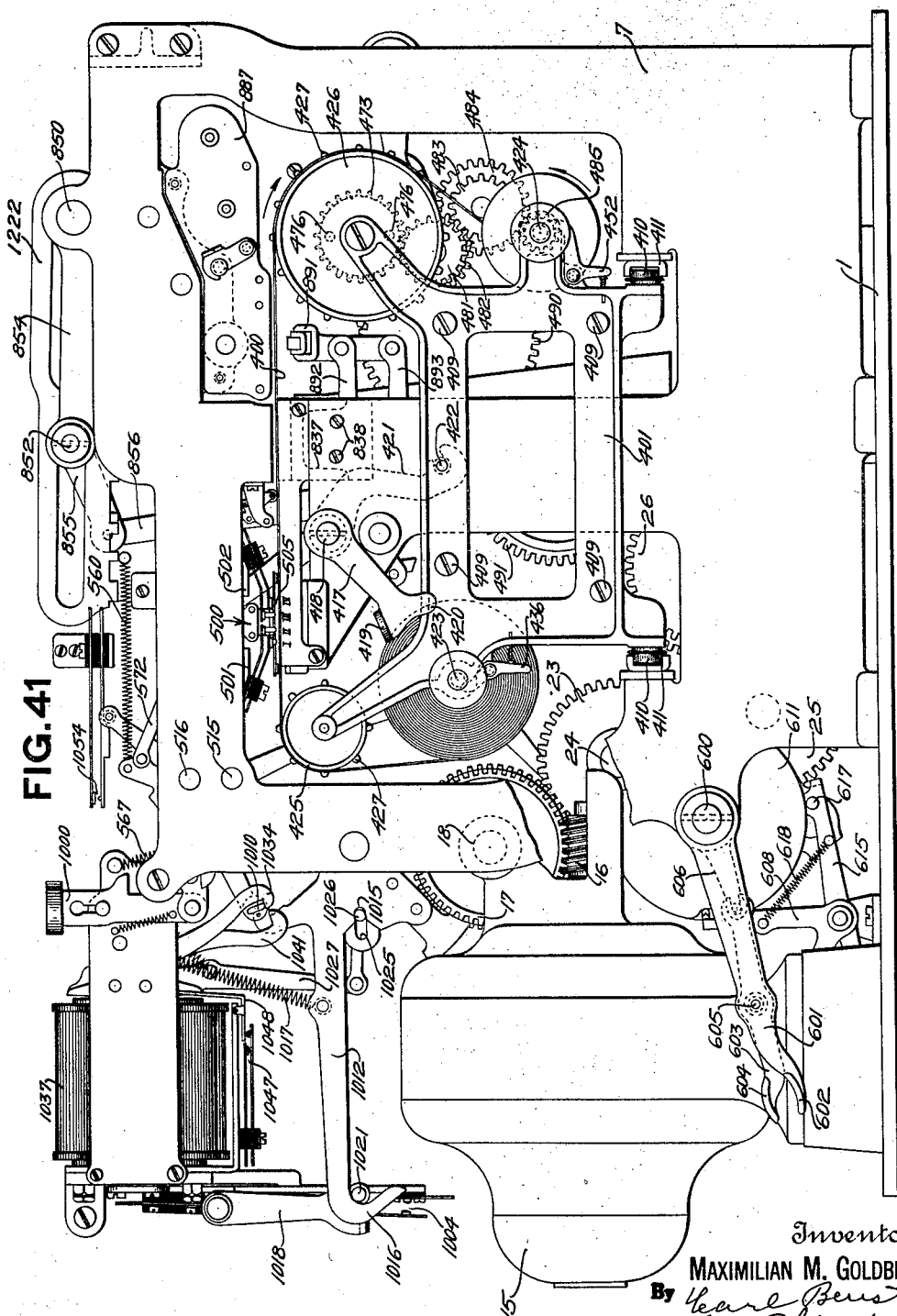

June 3, 1930.  M. M. GOLDBERG  1,761,662
AUDITING MACHINE
Filed Feb. 26, 1923.  30 Sheets-Sheet 22

Inventor
MAXIMILIAN M. GOLDBERG
By Carl Beust
Henry E Stauffer
His Attorneys

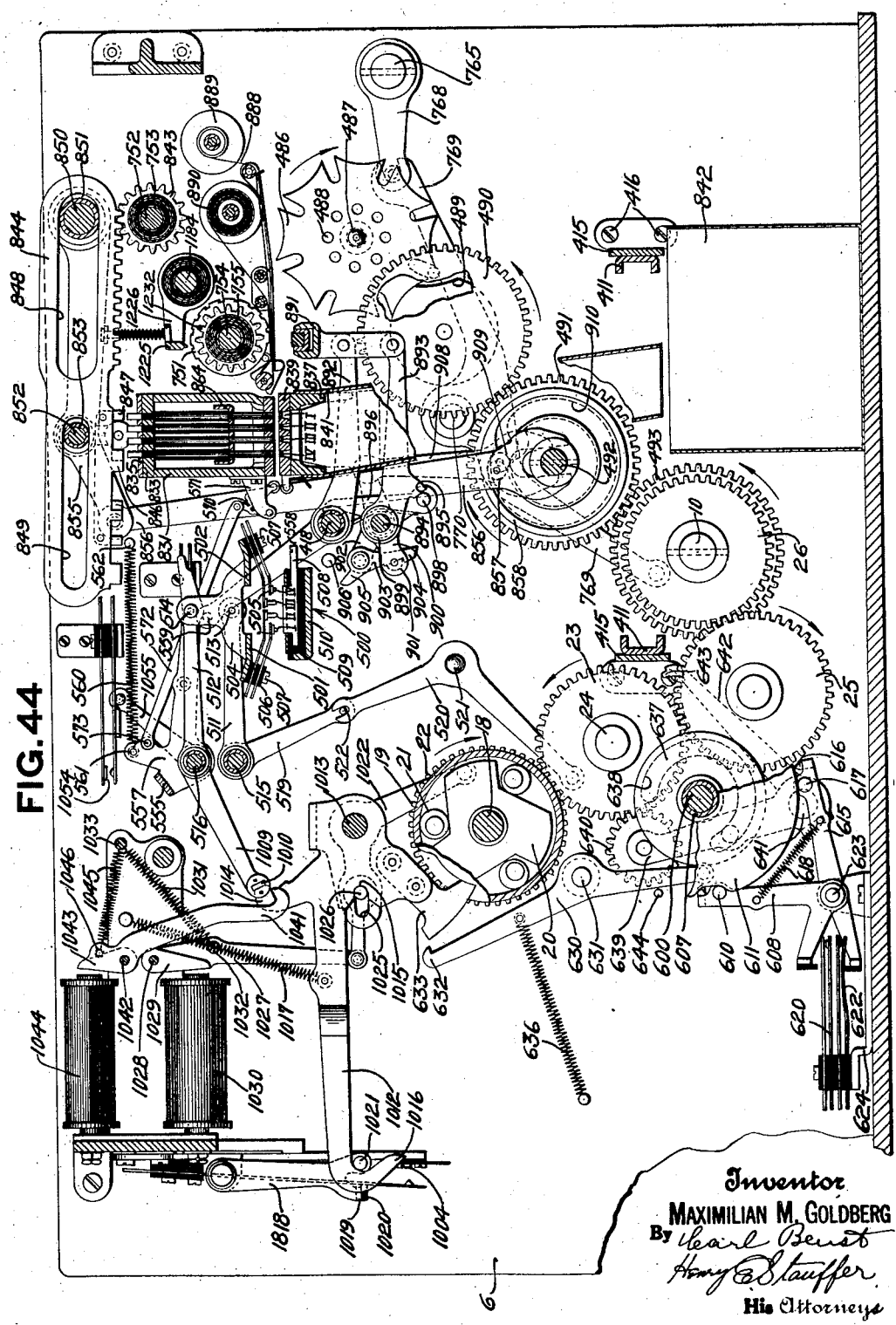

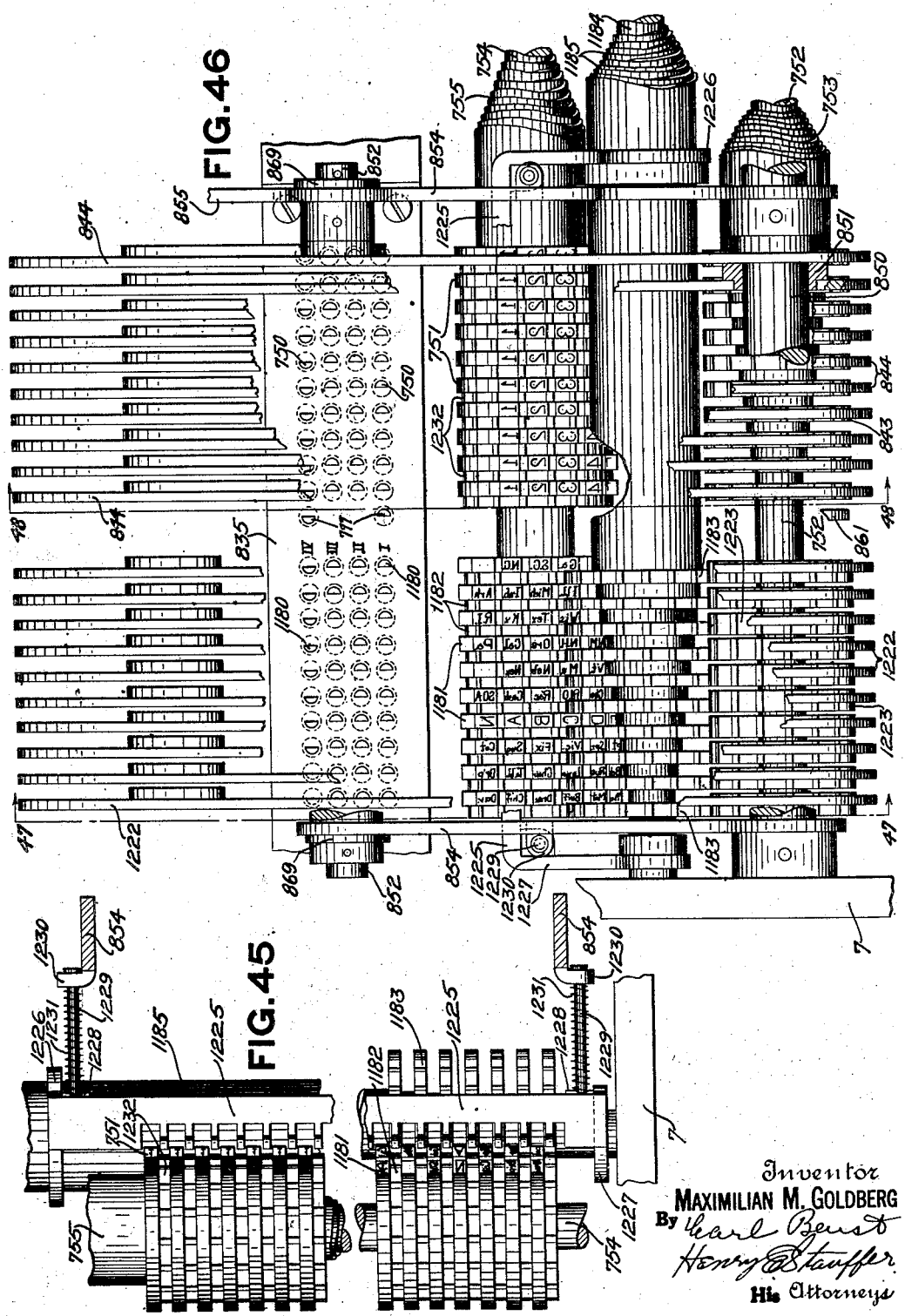

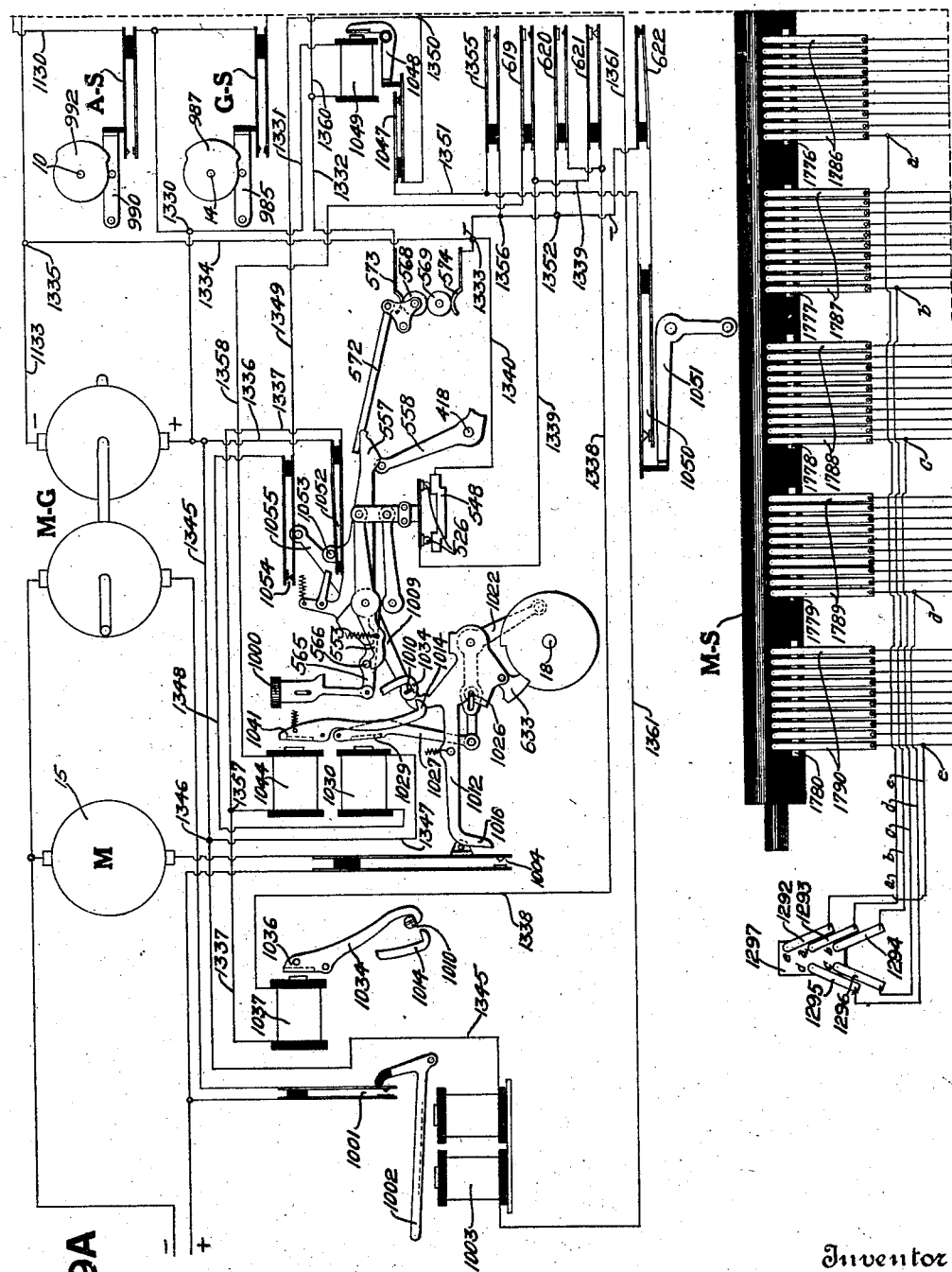

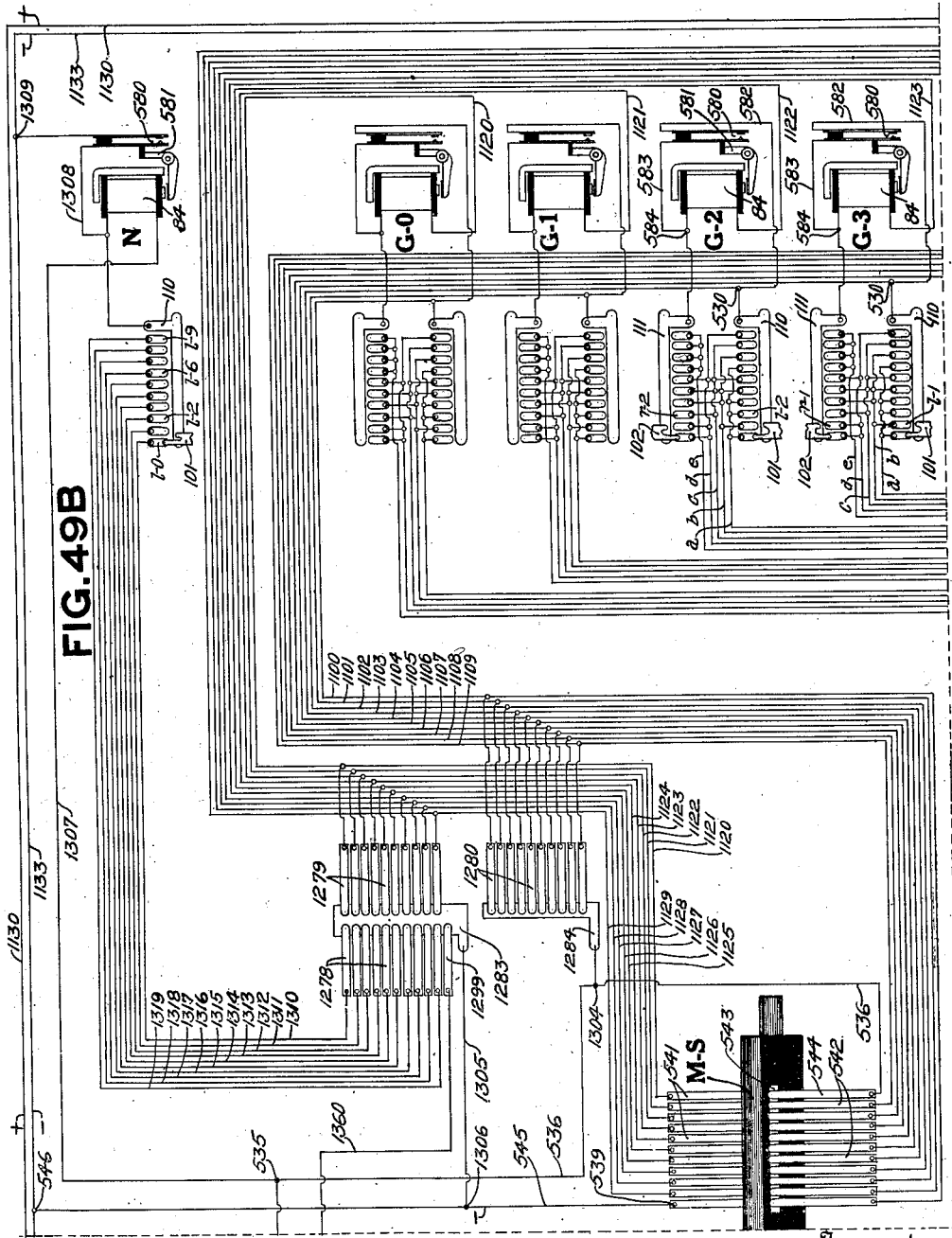

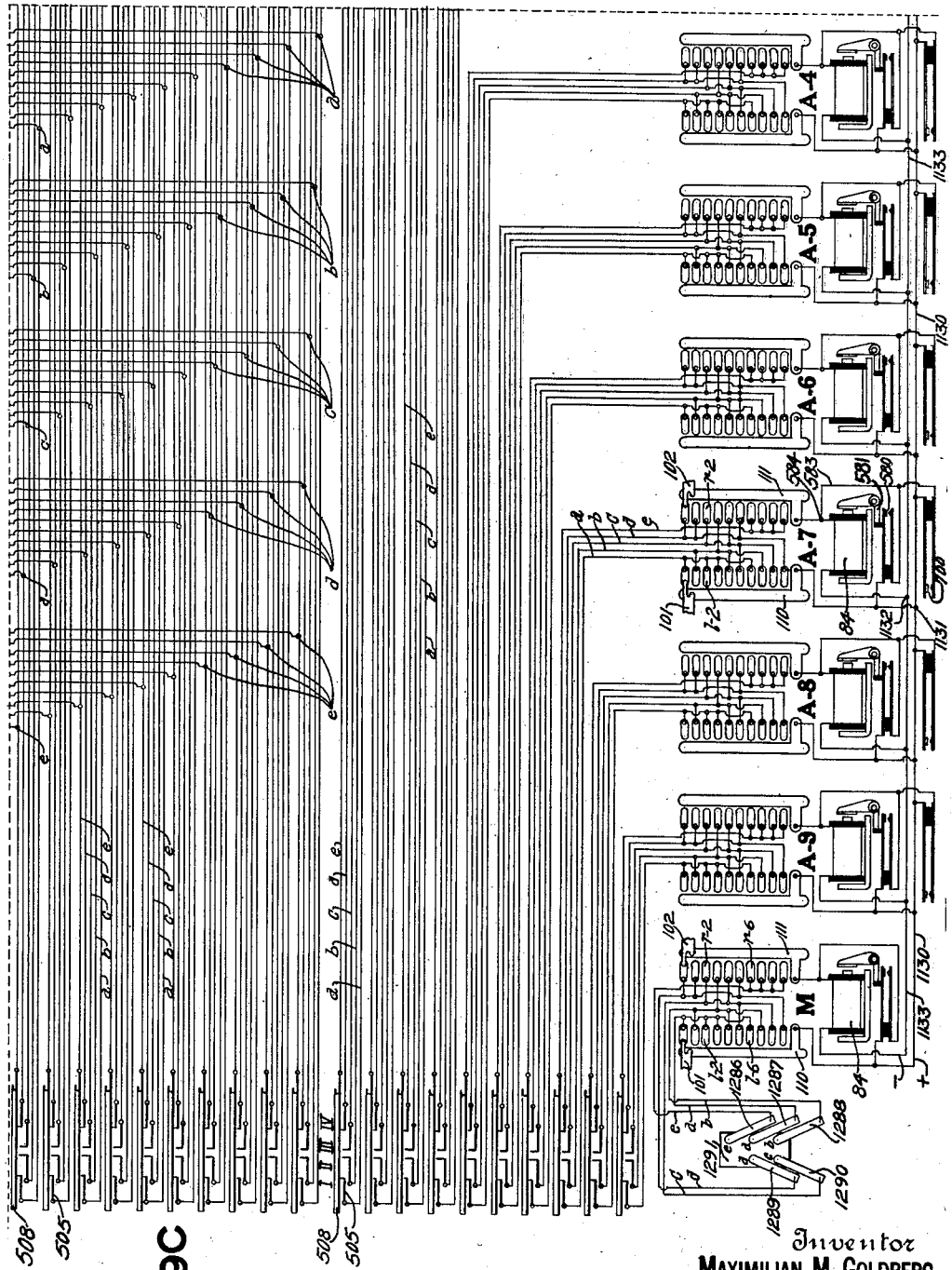

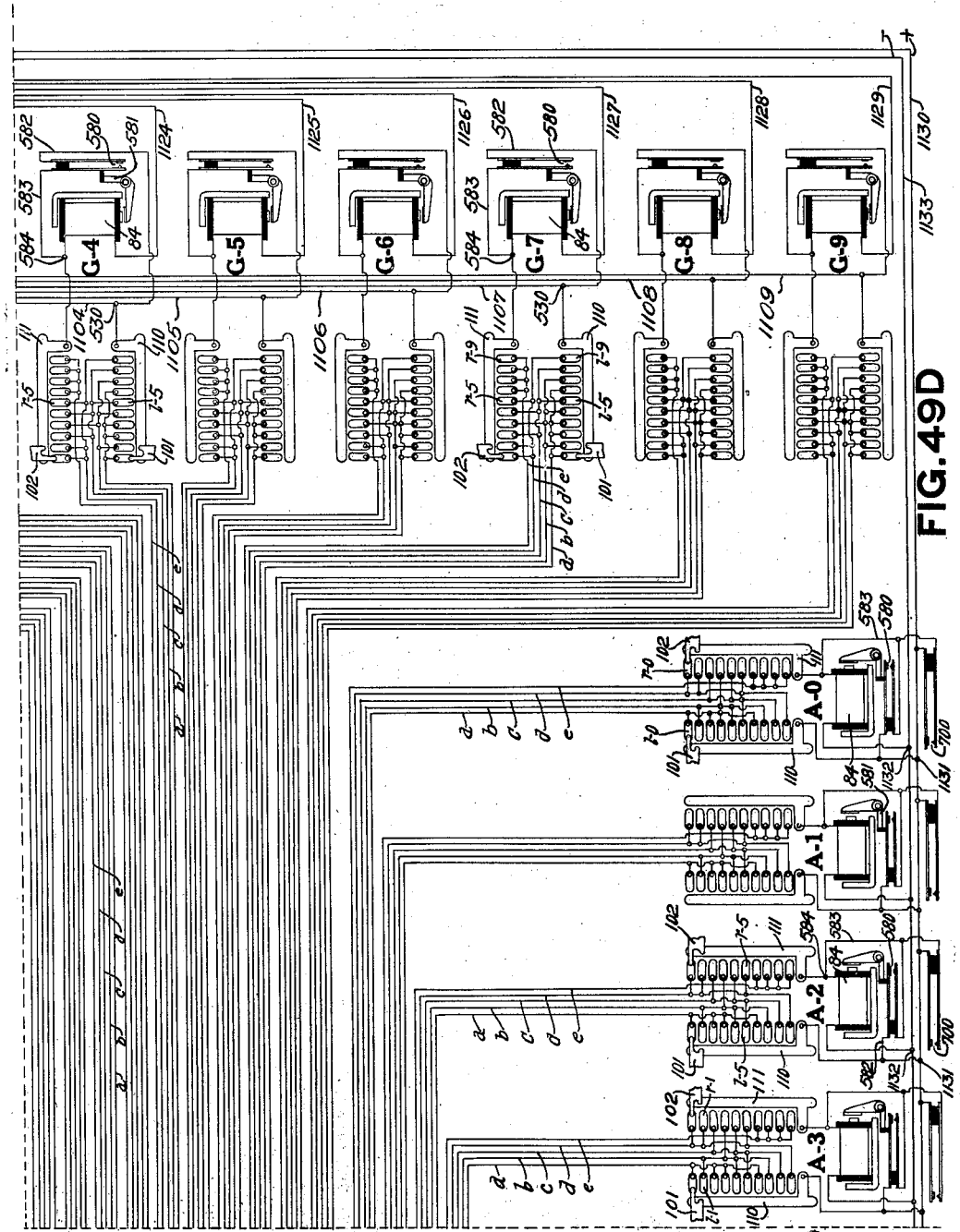

Patented June 3, 1930

1,761,662

UNITED STATES PATENT OFFICE

MAXIMILIAN M. GOLDBERG, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND

AUDITING MACHINE

Application filed February 26, 1923. Serial No. 621,286.

This invention relates to auditing machines of the type illustrated and described in the Letters Patent of the United States to Maximilian M. Goldberg, No. 1,694,009, dated December 4, 1928. It is arranged to compile data from previously prepared records, and to produce other records embodying these data. These latter records, produced by the machine are prepared in such a manner that data may be compiled from them by the same mechanism which compiles data from the above mentioned previously prepared records. This manner of producing the records is a distinguishing feature between the machine shown herein and the machine illustrated in the above mentioned patent.

To secure a comprehensive idea of the invention, it must be considered from four aspects; first, as a machine for compiling data from a previously prepared detail record; second, as a machine for producing a record which is a summary of the data previously compiled; third, as a machine for compiling data from two or more summary records; and, fourth, as a machine for producing a grand summary record of the data compiled from the summary records.

The records themselves, both detail and summary, are in the form of cards or sheets having control points, here shown as perforations, arranged in a definite order.

It is necessary to consider, first, the original or detail record; second, the summary record; and third, the grand summary record. Structurally considered, the summary and grand summary records are identical, but the detail record is slightly different. When compiling data from a detail record the machine is so controlled that the same data may be distributed into a plurality of places in the machine at one time, while when compiling data from the summary or grand summary records the data is registered in one place only at any one time.

The machine has adjustments by reason of which it can take care of either kind of record, and by reason of which it can itself produce the summary and grand summary records. The adjustments used to analyze and compile data from detail records and summary records or grand summary records are identical; the adjustments employed in producing summary and grand summary records are identical, but different from the adjustments used in analyzing these records. From a structural standpoint, therefore, the machine must be considered from two aspects; first, as a machine for analyzing and compiling data from records previously prepared by the machine or otherwise; and, second, as a machine for producing either a summary or grand summary record from the data compiled either from a plurality of detail records or from a plurality of summary or grand summary records.

The machine may be used wherever data is to be accumulated and recorded, for instance, in connection with a mail order house to compile and record data, indicating the number and the amount of the various sales, the character of the goods sold, the names of the clerks filling the orders, the character of the transactions and the states to which the various articles are sent; or, in connection with general stores to compile and analyze data from the various stores of a chain of stores, which may be in several different states, or in all of the states of the union; or in railroad freight offices, to compile and analyze data essential to an understanding of the condition of the business of the road; in short, wherever data of the character indicated must be compiled and a record thereof made.

Considering, for instance, a mail order house, a daily detail record would be prepared, either in connection with a cash register, modified to prepare such a record, as the various orders are filled; such, for instance, as that illustrated in Letters Patent of the United States No. 1,506,056, issued to Maximilian M. Goldberg, on August 26, 1924, and also the Goldberg Patent, No. 1,657,712, dated January 31, 1928; or any other special machine capable of producing a record having the desired data. At the end of any given period, for instance, at the close of each day, these records would be sent to a central office where one of the auditing machines would be installed. The records would then be run through the machine and a summary record for each department prepared. To acquire a complete knowledge of the business done by any department for any desired period, such as a week, or a month, it would only be necessary to run through the machine the several summary records for each department covered by the period selected, and to then prepare a grand summary record therefrom. To secure a knowledge of the whole business for the period it would only be necessary to run through the machine the necessary records for that period, and produce a grand summary record therefrom. The summary and grand summary records would constitute a complete history of the business, and from these any desired data might be derived at any time.

In preparing the summary and grand summary records it is not necessary to clear the entire machine, but by preparing what is known as a clearing sheet or a clearing control record any parts of the machine may be cleared and a record produced therefrom. This is quite different from the manner of preparing summary and grand summary records from the machine referred to in the above mentioned Patent, No. 1,694,009.

The invention is not to be regarded as to be restricted to the uses suggested, for obviously various adaptations of the principle will occur to those using the machine.

With these and incidental objects in view, the invention consists of certain novel features of construction and combinations of parts the essential elements of which are set forth in appended claims and a preferred form or embodiment of which is hereinafter described with reference to the drawings which accompany and form part of this specification.

Figs. 7A and 7B taken together constitute a plan view of that part of the machine which has the totalizing mechanism.

Fig. 8 is a plan view of the recording end of the machine.

Fig. 9 is a section through the master switch.

Fig. 10 is a view of one of the control switches and its actuating means.

Fig. 11 is a view showing the means for operating the master switch.

Fig. 12 is a detail view, with parts broken away, showing a part of the mechanism of Fig. 13.

Fig. 13 is a section on line 13—13 of Fig. 8, looking in the direction of the arrows, and shows the classification selecting mechanism.

Fig. 14 is a detail of some of the mechanism of Fig. 13 in the moved position.

Fig. 15 is a detail of the cam and pitman for operating certain parts of the zero stop mechanism.

Figure 16:
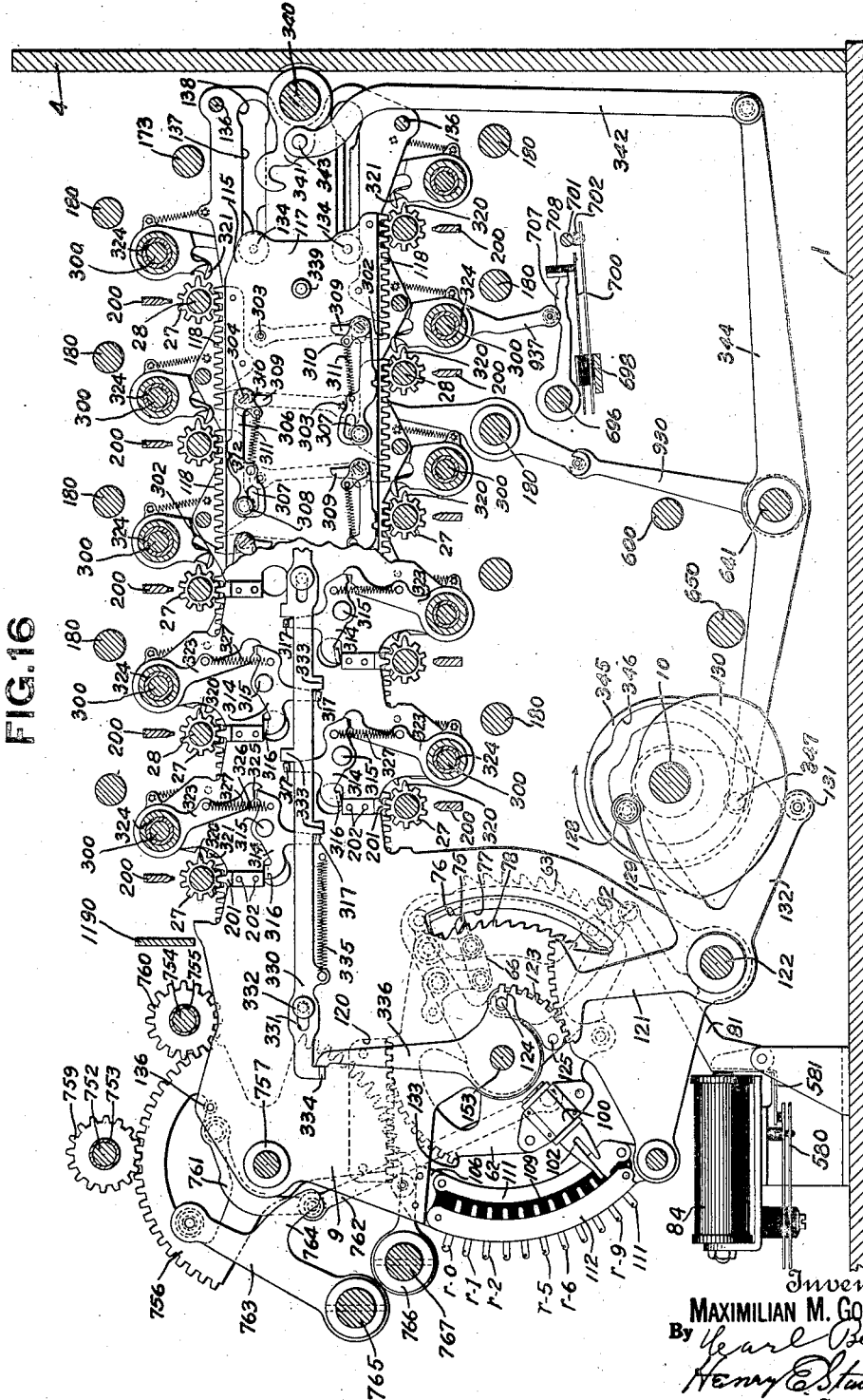

Fig. 16 is a section on line 16—16 of Fig. 7A, looking in the direction of the arrows.

Figure 17:
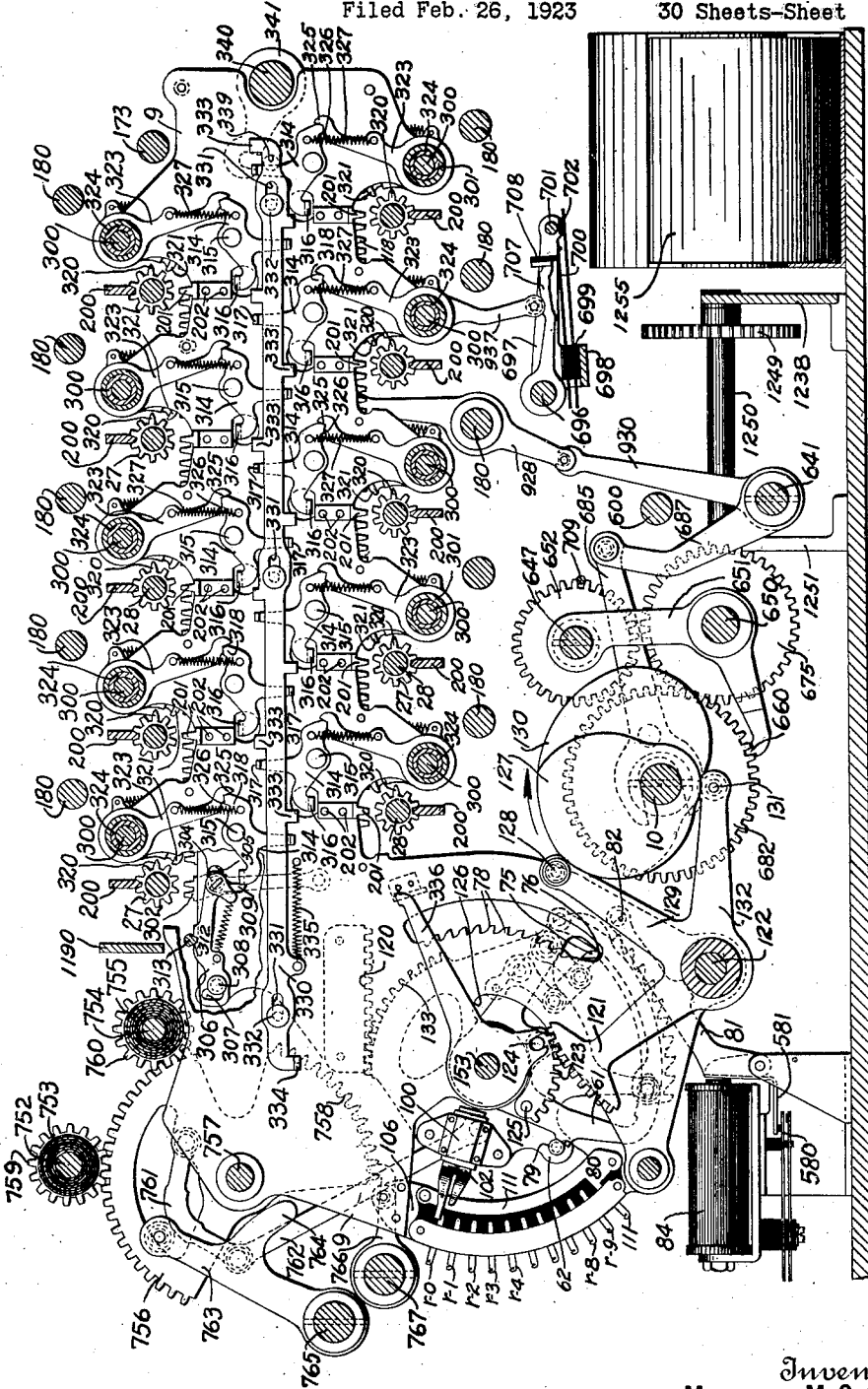

Fig. 17 is a section on line 17—17 of Fig. 7B, looking in the direction of the arrows.

Figure 18:
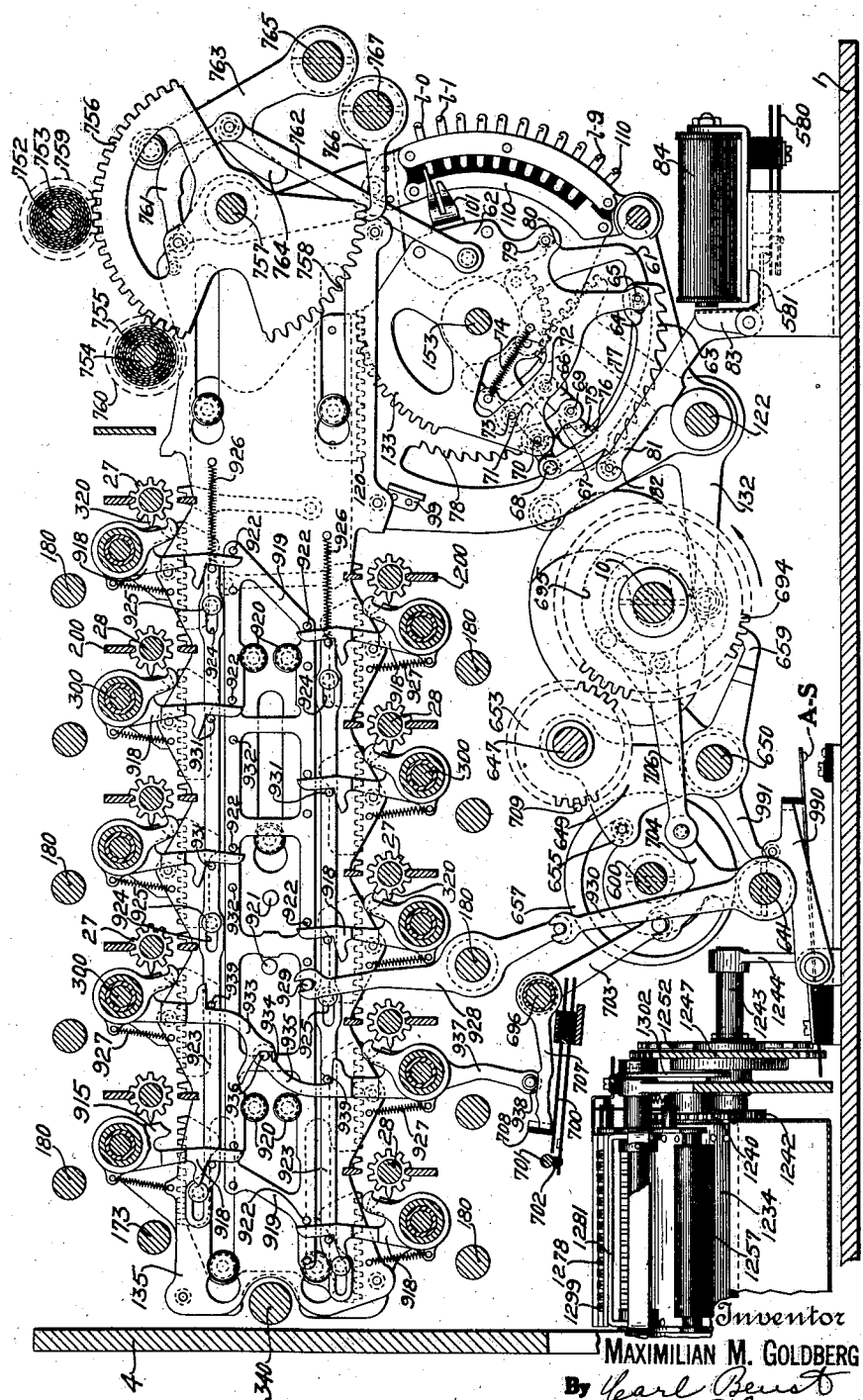

Fig. 18 is a section on line 18—18 of Fig. 7B, looking in the direction of the arrows.

Figure 19:
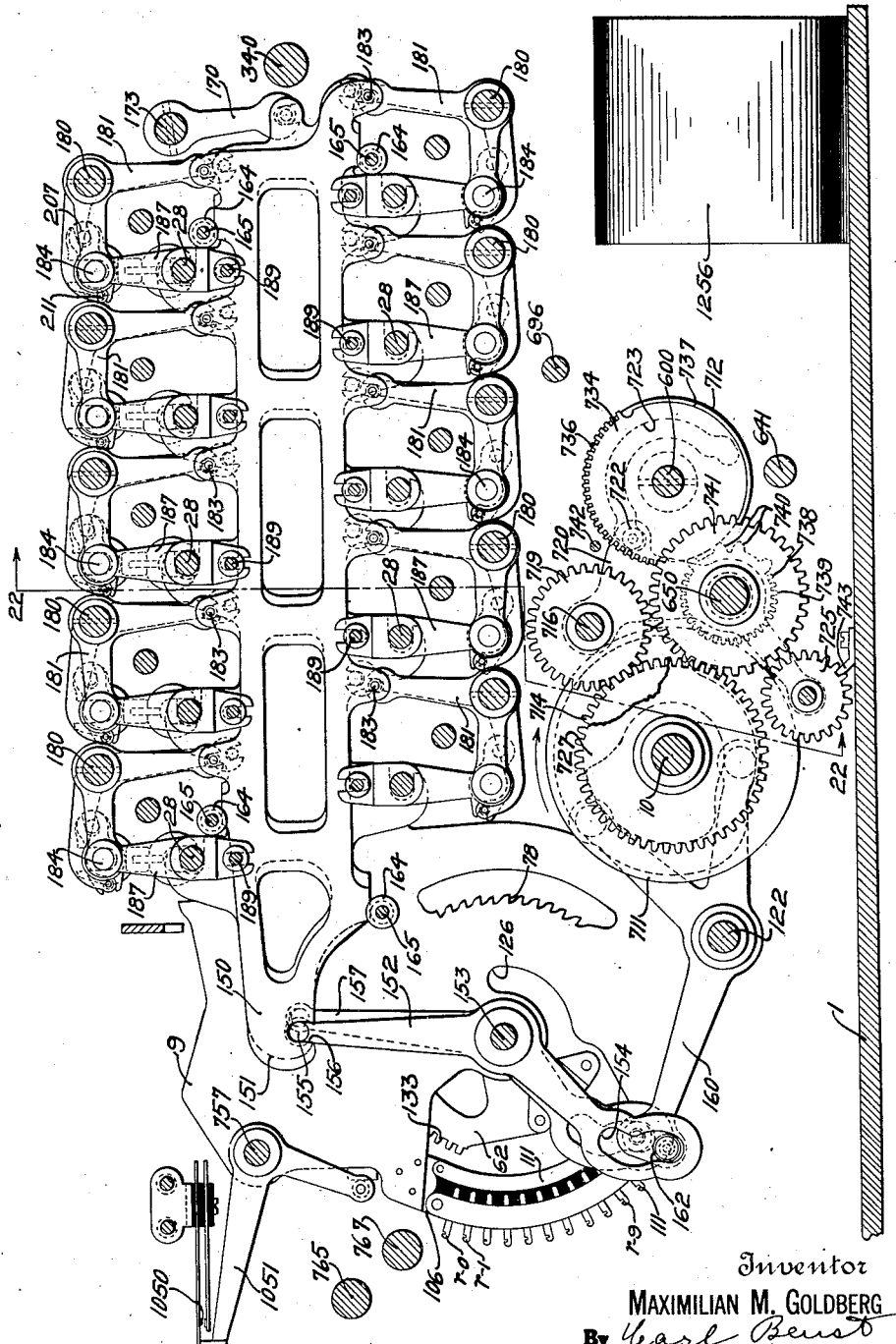

Fig. 19 is a section on line 19—19 of Fig. 7A, looking in the direction of the arrows.

Figure 20:
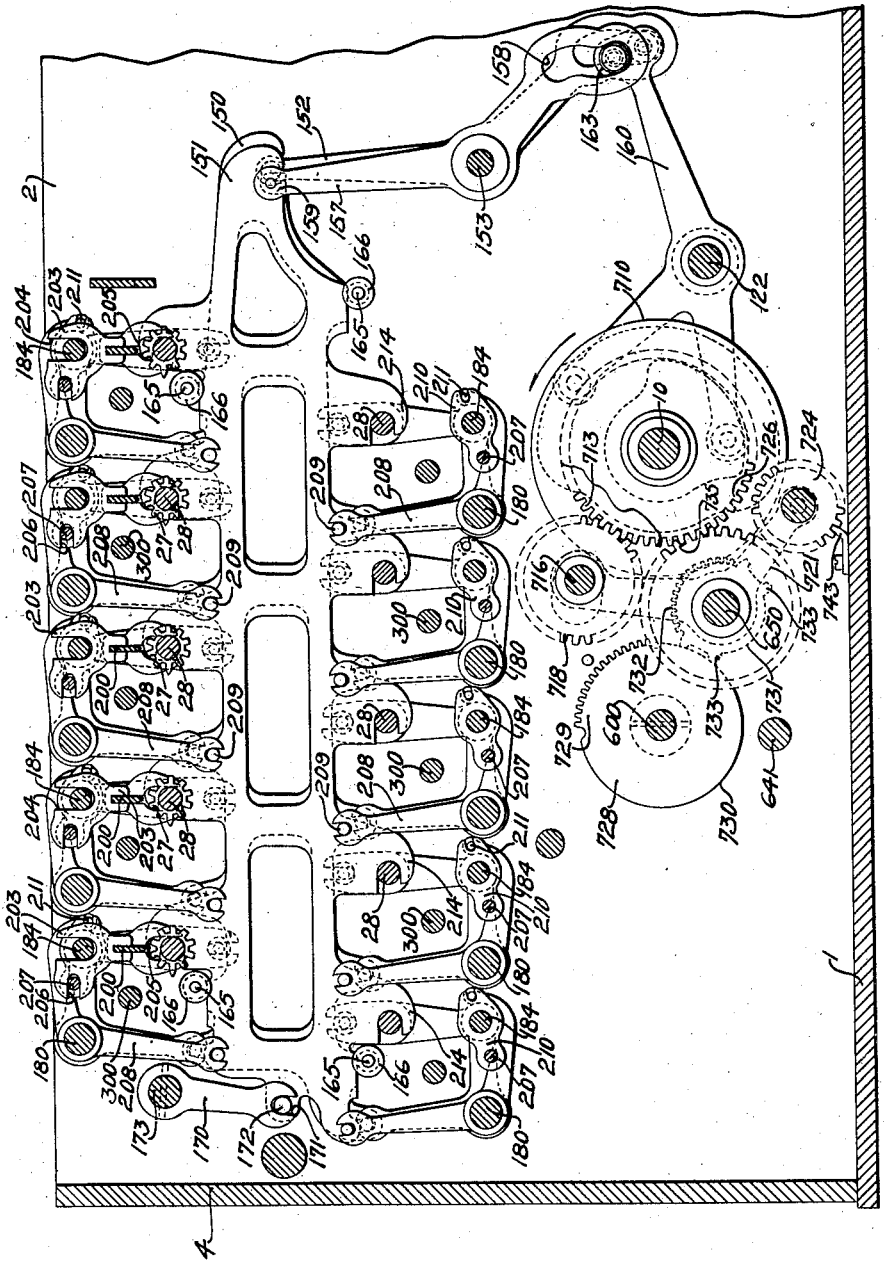

Fig. 20 is a section on line 20—20 of Fig. 7A, looking in the direction of the arrows.

Figure 21:
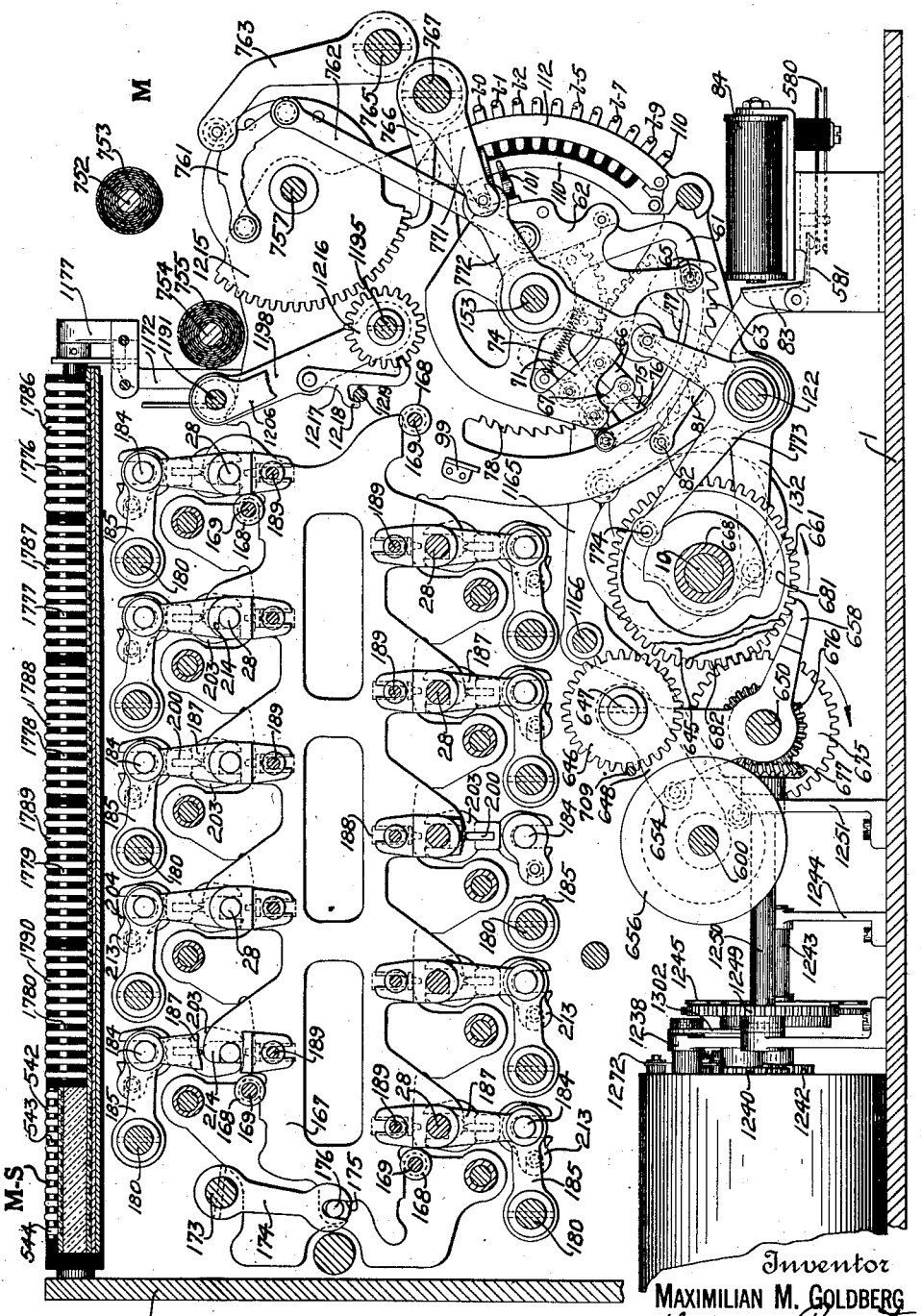

Fig. 21 is a section on line 21—21 of Fig. 7B, looking in the direction of the arrows.

Fig. 22 is a section on line 22—22 of Fig. 19, looking in the direction of the arrows, and shows the positioning means for the upper totalizer shafts.

Fig. 23 is a view showing one of the main controlling switches and certain of the gear connections.

Fig. 24 is a view showing the positioning means for the lower totalizer shafts.

Figure 25:
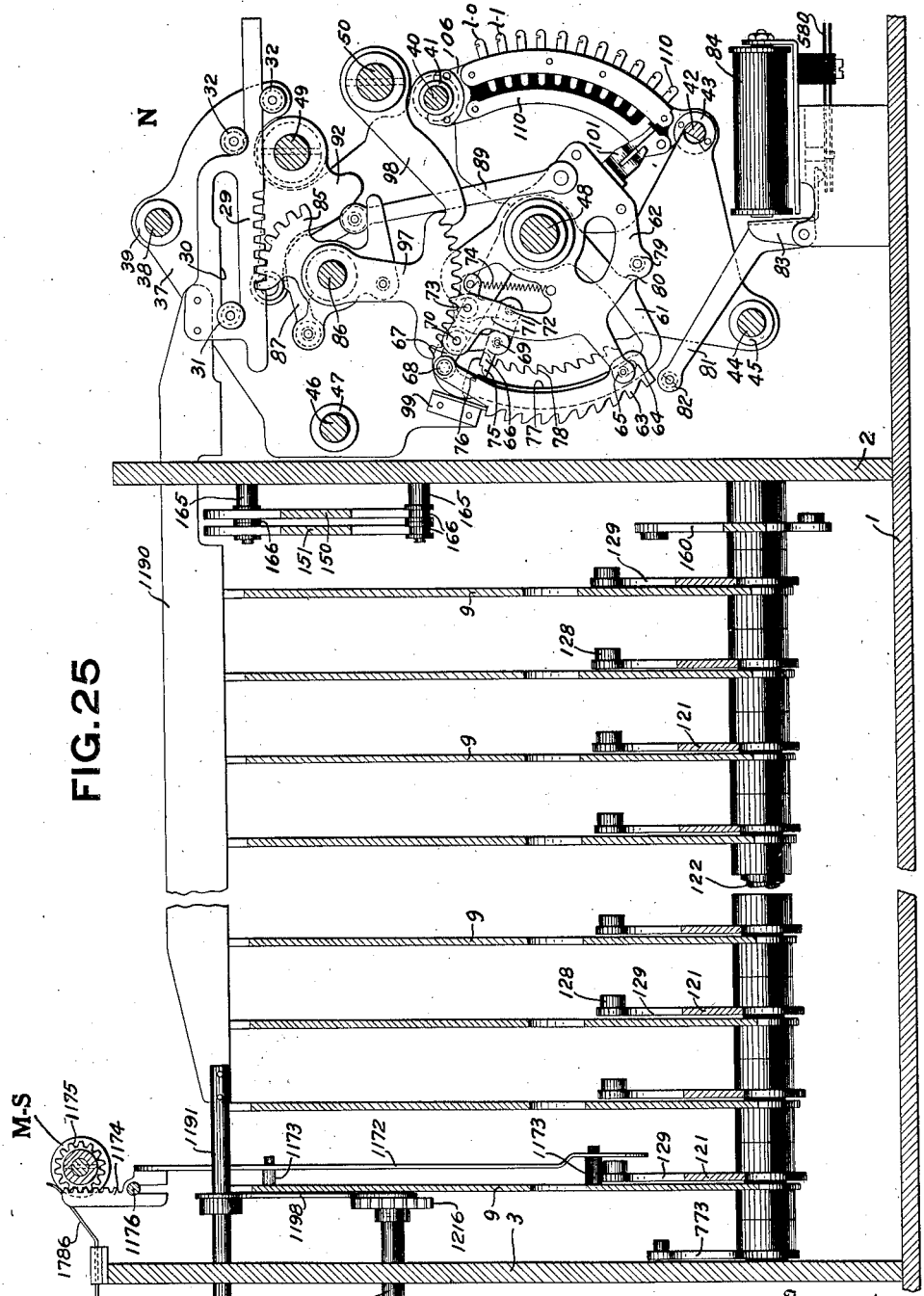

Fig. 25 is a section on line 25—25 of Figs. 7A and 7B, looking in the direction of the arrows.

Fig. 26 is an enlarged sectional view of parts of the transfer mechanism on line 26—26 of Fig. 27.

Fig. 27 is an edge view of the mechanism of Fig. 26.

Fig. 28 is a view of the cam which drives the totalizer shaft positioning devices, and certain of the actuators for positioning the actuating racks.

Fig. 29 is a view of certain of the driving mechanisms, some of which are active under all conditions, and some only during totalizing operations.

Figure 30:
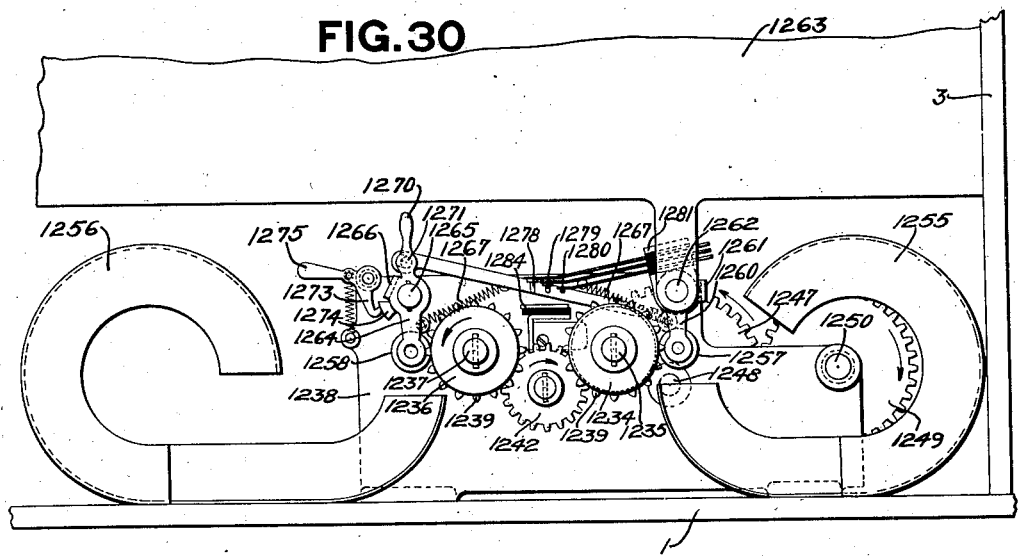

Fig. 30 is an end elevation of Fig. 29, showing only the mechanism pertaining to the selecting control strip.

Figure 31:
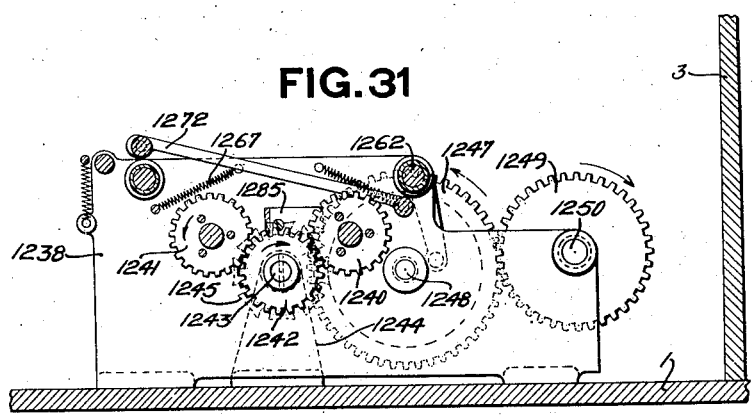

Fig. 31 is a section on line 31—31 of Fig. 29, looking in the direction of the arrows, and shows only the mechanism pertaining to the selecting control strip.

Figure 32:
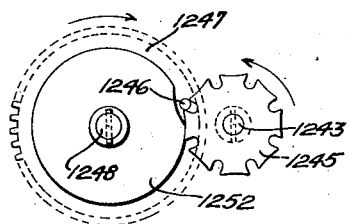

Fig. 32 is a detail of the Geneva drive for the selecting control strip.

Figure 33:
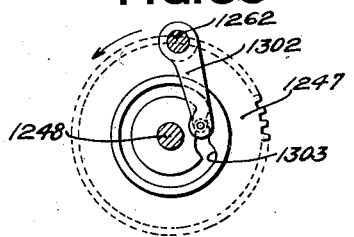

Fig. 33 is a detail of the operating cam and arm for the selecting control strip contacts.

Fig. 34 is a view of the gear train employed to transmit motion to the various parts of the analyzing and recording portions of the machine, the gears being displaced to show the relation of the parts.

Fig. 35 is a view of the analyzer and its actuating means.

Fig. 36 is a side view of one of the punch actuators.

Fig. 37 is an edge view of the punch actuator of Fig. 36.

Fig. 38 is a perspective view of a portion of the punch holder or support, with several punches therein.

Fig. 39 is a view of the beam actuator for adjusting the printing and the punching devices.

Fig. 40 is a view of the supplemental punch actuator and the punches it actuates.

Fig. 41 is an end elevation of the analyzing and recording portion of the machine.

Figure 42:
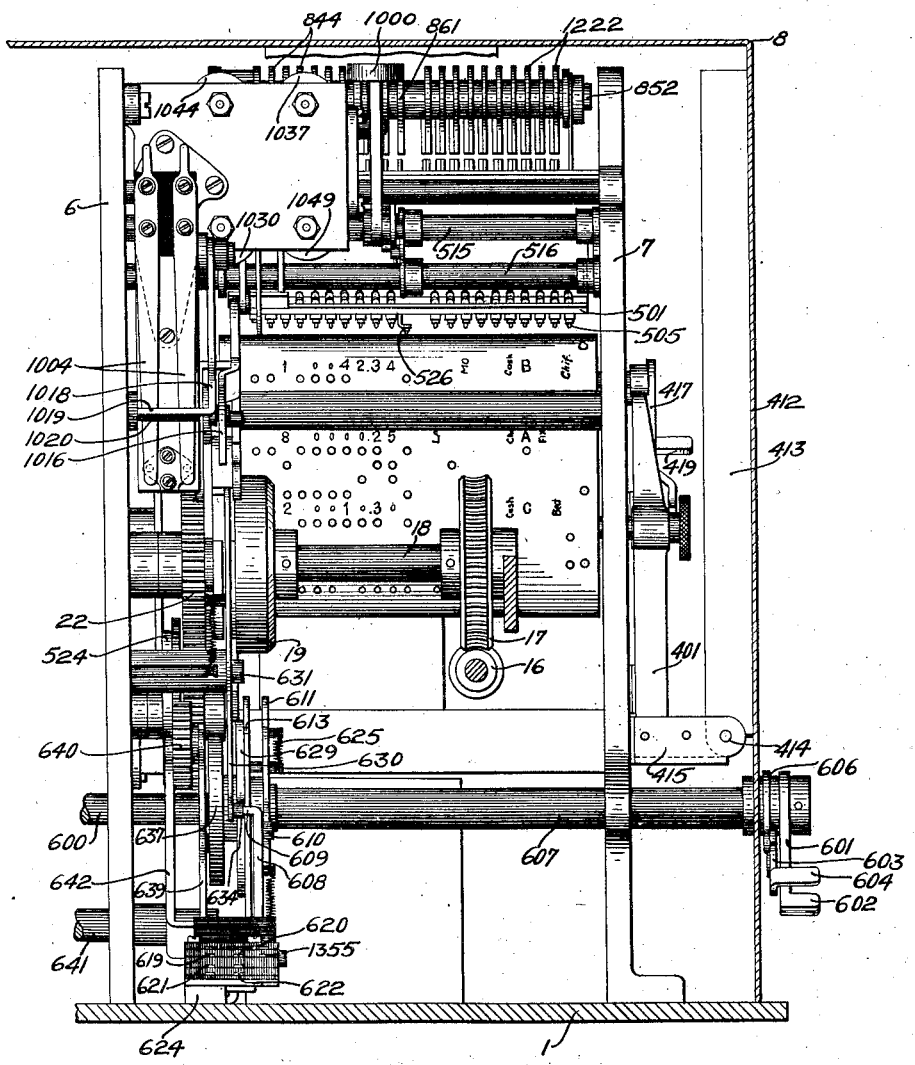

Fig. 42 is a side elevation of the analyzing and recording portion of the machine.

Figure 43:
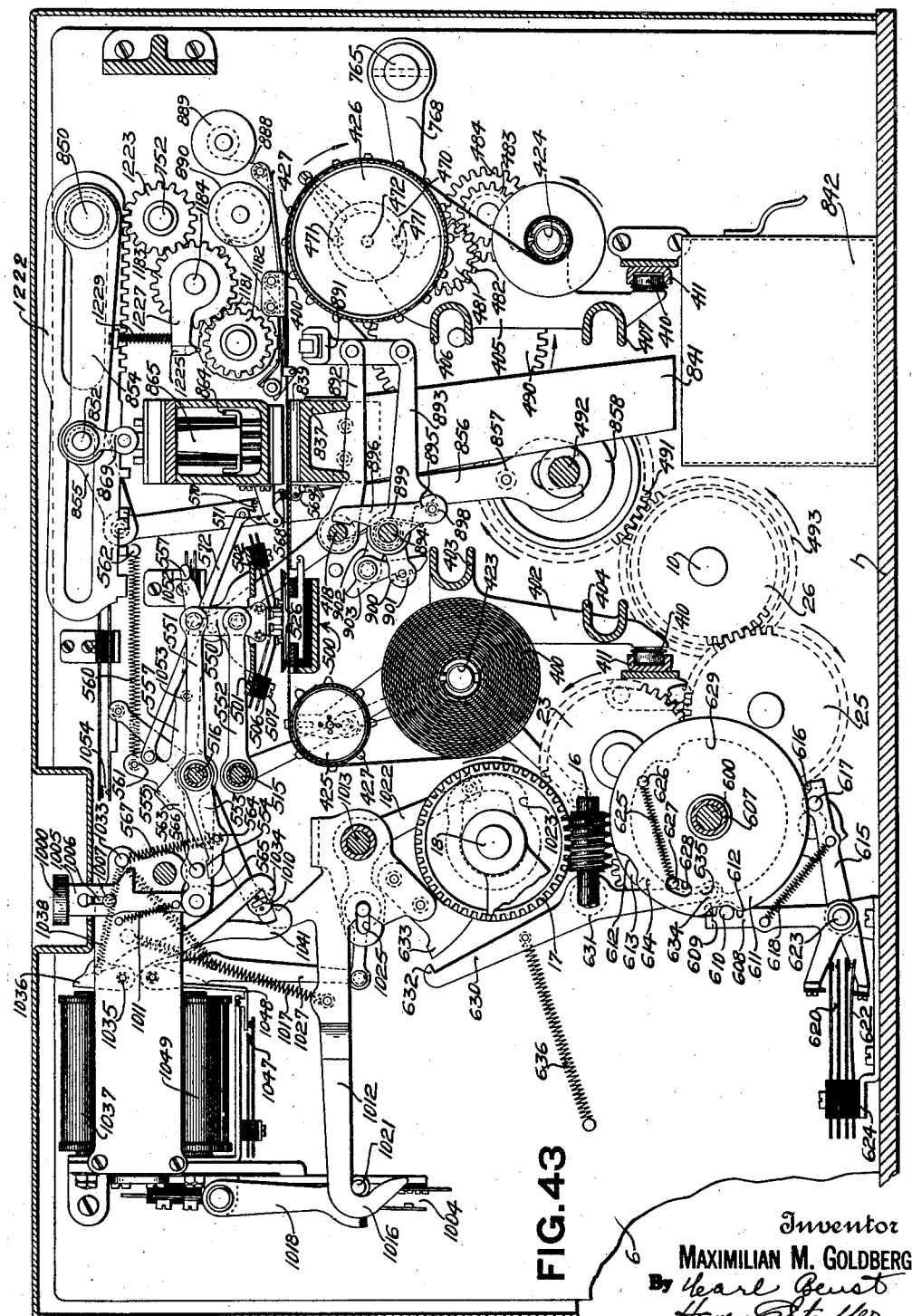

Fig. 43 is a section on line 43—43 of Fig. 8, looking in the direction of the arrows.

Fig. 44 is a section on line 44—44 of Fig. 8, looking in the direction of the arrows.

Fig. 45 is an enlarged detail of the type wheel alining mechanism.

Fig. 46 is an enlarged fragmentary plan view of the printing and perforating mechanisms.

Figure 47:
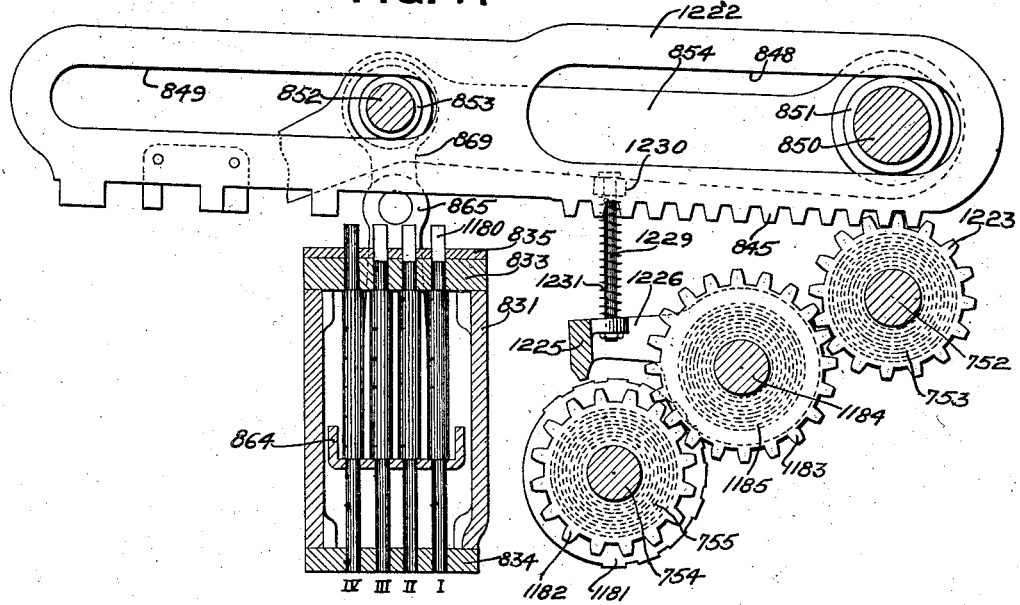

Fig. 47 is a section on line 47—47 of Fig. 46, looking in the direction of the arrows.

Figure 48:
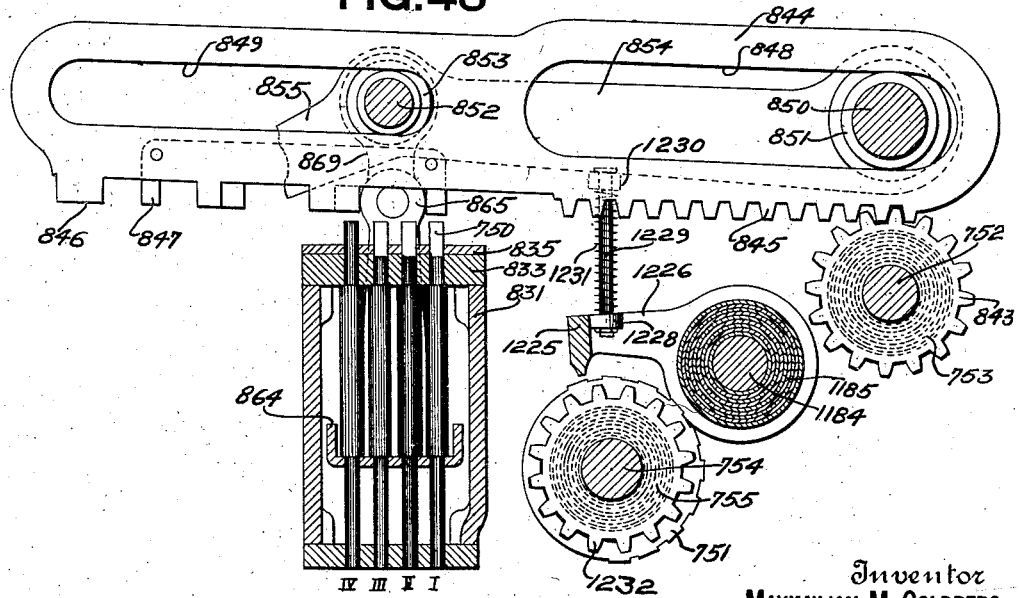

Fig. 48 is a section on line 48—48 of Fig. 46, looking in the direction of the arrows.

Figs. 49A, 49B, 49C and 49D, taken together, constitute a diagrammatic view of the various electrical circuits, magnets and other electrical elements of the machine.

In General

In order that the invention may function as intended, it is essential that a considerable number of accounting devices be provided; the number will depend upon the requirements of the business with which the machine is used, but in that herein described, 100 are employed. The accounting devices may themselves be of any preferred form, those here illustrated being what are commonly known as "totalizers"; that is, accounting devices in which varying amounts may be simultaneously entered upon the several denominational elements; and, while the accounting devices will hereinafter be usually referred to as "totalizers", it is to be understood that, in the broader aspects of the invention, any suitable accounting devices may be employed.

In order that the accounting devices or totalizers may be selected with readiness, and with a minimum amount of mechanism, they have been divided into groups; and in making a selection, the group or groups containing the desired accounting devices or totalizers are determined and the selected totalizer or totalizers then selected from these groups.

When the machine is compiling data, the selection is controlled by either the detail record or the summary record, depending upon which of these is being analyzed. If the data represents original transactions, the control sheet is of the form shown in Fig. 1; if the data is a summary of other data, the control sheet is in the form shown in Fig. 2.

Figure 5:
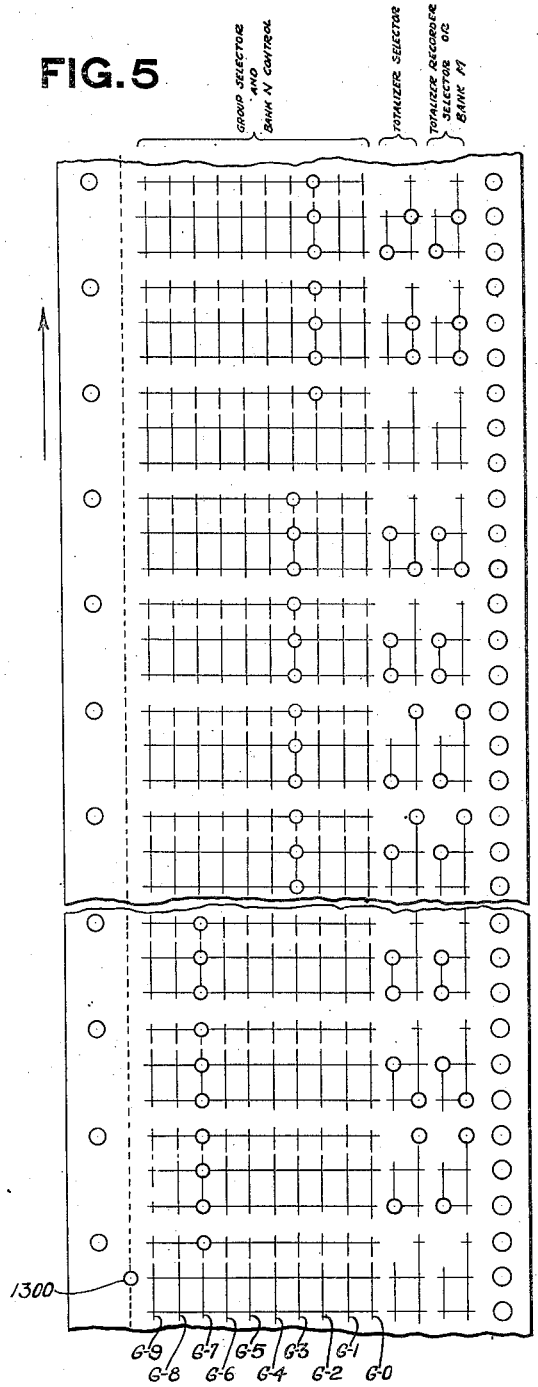
Fig. 5 is a fragmentary view of the totalizer restoring or resetting control sheet or strip.

When the machine is operating to record the data upon its totalizers, the totalizers to be cleared are selected by means of a control sheet of the form shown in Fig. 5. This sheet is not prepared by the machine herein described but may be prepared by any suitable mechanism, such, for instance, as a hand punching machine, and the perforations may be arranged to control the selection of the totalizers in any desired order. That is, the groups may be selected in any order and the totalizers from the selected groups may be selected in any order. This is quite different from the manner of selecting the totalizers to record their data, as is illustrated and described in the machine of the above-referred to Patent No. 1,694,009, of the applicant. With this control sheet it is not necessary to clear all totalizers of the machine, as they may be selected promiscuously by reason of the fact that this control sheet, shown in Fig. 5, may be made as desired.

Perforations

Figure 4:
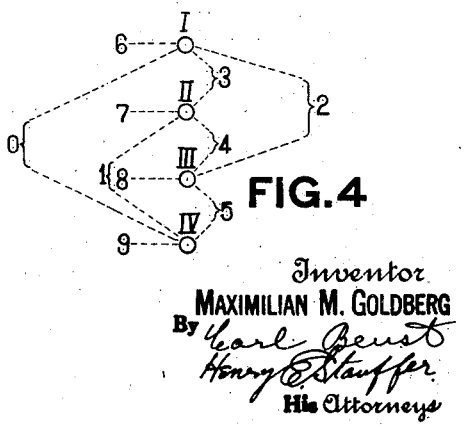
Fig. 4 is a diagrammatic view showing how the perforations are employed either in combination or alone to select the digits when analyzing.

It is necessary that every element to be controlled be set to any one of ten positions. The simplest method of doing this would perhaps be to employ ten positions in the control record for each element to be controlled. This would require a record of undue length. To limit the same as much as possible, recourse has been had to a combination of perforations. It is possible by the use of only four positions to secure the necessary selections. These positions are designated by the Roman numerals, I, II, III and IV. The manner in which this is done is illustrated in Fig. 4. As there shown the digit 0 is represented by two holes, one in the first and one in the fourth positions; the digit 1 is represented by two perforations, one in the second and one in the fourth positions; 2 is represented by perforations in the first and third positions; 3 by perforations in the first and second positions; 4 by perforations in the second and third positions; and 5 by perforations in the third and fourth positions. The other four digits are represented by a single perforation each; namely, 6 by a perforation in the first position; 7 by a perforation in the second position; 8 by a perforation in the third position; and 9 by a perforation in the fourth position. In this manner any one of the whole number of digits can be selected by the use of not more than two perforations.

*Detail record*

Figure 1:
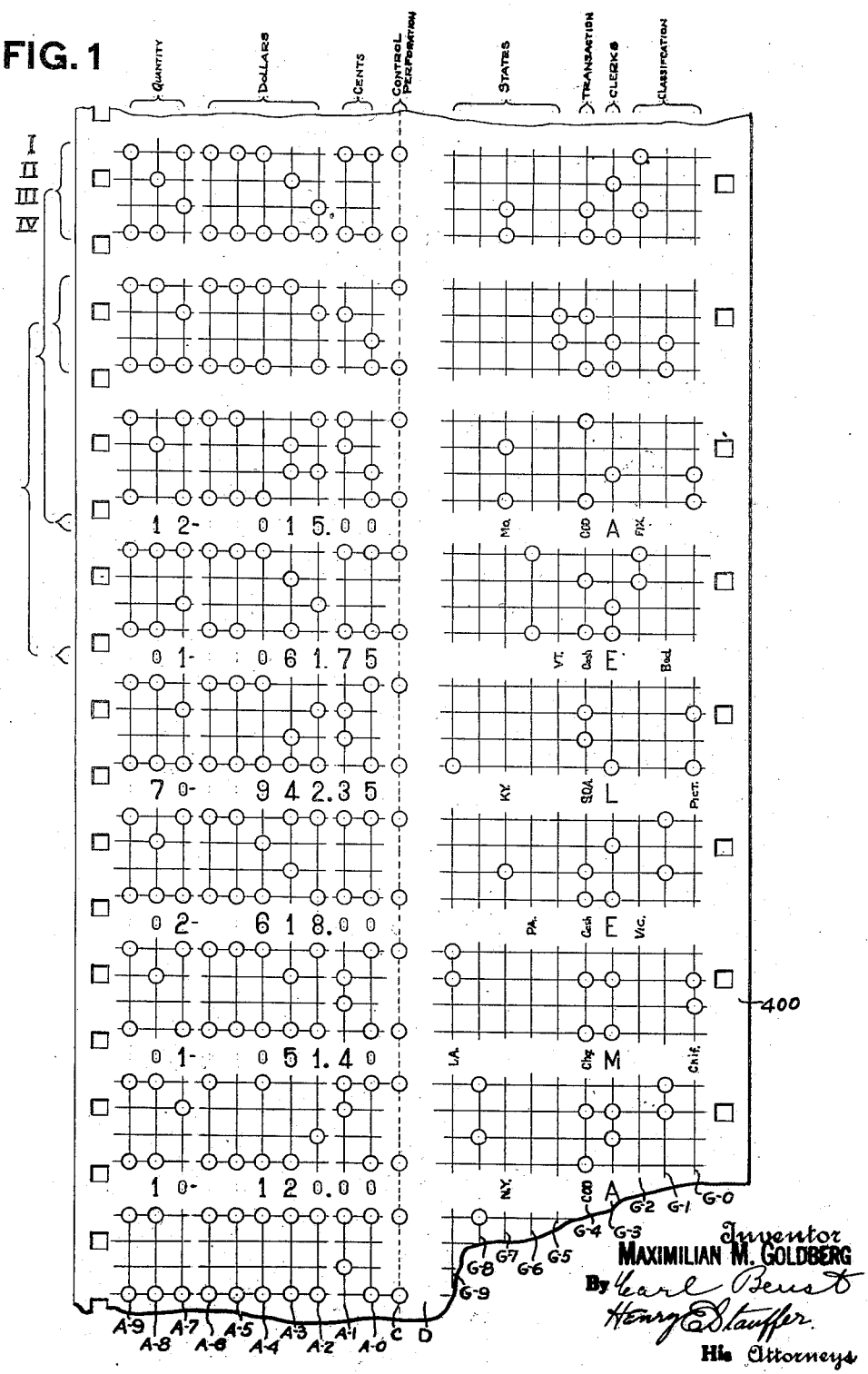
Fig. 1 is a fragmentary view of the detail record, to be used with the machine.

The detail record or control sheet, as it appears in practice, is shown in Fig. 1, except that the lines appearing thereon may be omitted, since they serve no function except to aid in visually locating the control points. It will be noted that the sheet has ten columns of perforations on the right hand side and ten on the left hand side. Between these is an additional space equal in width to the width of two columns. An additional column of perforations appears in the left of these two spaces; the other space is blank.

Each of the columns of perforations constituting the right hand side of the sheet controls one group of totalizers, and the combinations of perforations appearing in the columns determine the particular totalizers to be selected. The number of these columns must, therefore, equal the number of groups of totalizers. In the machine here shown there are ten groups of these totalizers, therefore there are ten columns in the control sheet. If a less number of groups of totalizers were used, the number of columns would be made to agree therewith; and if a greater number were used the number of columns would have to be increased to accord therewith.

The perforations in the ten columns on the left hand side of the sheet control the mechanism which actuates the denominational elements of the totalizer; that is, control the amounts to be entered on the denominational elements of the totalizers which have been selected by the perforations in the right hand columns. There must, therefore, be upon this side of the sheet as many columns of perforations as there are denominational elements in the totalizers. In the machine here shown each totalizer is provided with ten elements. Therefore, there are ten columns of perforations in the sheet. Should the totalizers be provided with a less number of denominational elements, a correspondingly smaller number of columns of perforations would be used. If, on the other hand, the totalizers should have a greater number of denominational elements, a correspondingly greater number of columns of perforations would be employed. It is thus seen that the columns of perforations on the right hand side of the sheet select the totalizers upon which the entries are to be made, while the perforations in the columns on the left hand side of the sheet determine the numerical quantities which are to be entered on the totalizers which have been selected.

In entering any given transaction, a totalizer may be selected from any group, or one totalizer may be selected from each of two or more groups, but not more than one totalizer can be selected from any one group. Since ten groups are provided in the machine herein described, it is possible in any case to select as many as ten totalizers for the simultaneous entry of the same data, but not more.

The additional column of perforations lying adjacent the left hand set of columns is used solely for control purposes, and does not in any way enter into the computations of the machine. The blank space lying between the two sheets of columns is not used for any purpose whatsoever in the machine herein shown.

In the drawings (Fig. 1) the various columns are provided with legends, which illustrate how the data to be classified may be divided or considered, but these legends are illustrative only. Various other arrangements and classifications may be used, depending upon the needs of the situation.

The numerical quantities, and the classification thereof, may both vary. As applied to commercial enterprises, such as those referred to above, the numerical amounts are more frequently by dollars and cents and the classification will be goods, clerks, character of the transactions, etc., but the numerical amounts may be other matter. Some of the columns may in fact be set aside for dollars and cents, and other columns for other information. In the illustration the three columns on the left hand side have been used to indicate the quantity of articles entering into the transactions; columns 4 to 8, inclusive, have been used to represent dollars, while columns 9 and 10 indicate cents.

As to the classification in the illustration shown, the first three groups on the right hand side of the right hand column have been set aside for classes of goods; the next column for clerks; the next column for transactions; and the next five columns for the various States.

In the first three columns at the right the classes of goods have been designated by printing the name of the goods sold. In the next column, are found the letters A, E, L, etc., which are used to designate clerks. This lettering is entirely arbitrary, as any desired method of indicating the clerks may be used.

In the fifth column from the right, which is the transaction column, will be found special legends, such as "S. O. A.", sold on approval; "C. O. D.", collect on delivery; "Chg.", charge; and "Cash".

In the sixth to tenth columns inclusive, from the right have been set aside for the various States to which the articles are sent. Abbreviations of the States such as "Mo.", "Ky.", etc., are printed in these columns to designate the particular State to which an article is sent.

The sheet will perhaps be better understood by describing in detail all of the perforations and all of the data pertaining to some particular transaction. For this purpose, the transaction at the top of the sheet will be taken. Since four perforations are required to completely control the selection of the ten digits, each transaction is to be considered as represented by four horizontal rows of perforations taken together and considered as a unit. The details of the several transactions are printed in Arabic numerals so that it is possible for one not familiar with the combinations of perforations to at once readily interpret any given transaction. However, for mechanical reasons the printed interpretation of any particular transaction does not lie immediately adjacent the perforations of that transaction, but as here shown is displaced two spaces behind the transaction which it interprets, so that the data printed below the third transaction on the sheet (Fig. 1) is the interpretation of the first transaction, represented by the first four horizontal rows of perforations; and the second line of printed data is the interpretation of the second transaction, as represented by the second group of four horizontal rows of perforations and so on down the sheet. In the drawings the rows of perforations which constitute a transaction are connected by a brace, and the interpretation thereof is connected to this brace by a larger one. This is the form of sheet produced by the machine shown in applicant's Patent No. 1,506,056, issued August 26, 1924, and also his Patent, No. 1,657,712, above referred to.

The separation of the interpretation of any given transaction from the transaction itself is a matter of no special importance, for the operator will readily become acquainted with the method of interpretation. The positions on the detail record are indicated by the Roman numerals I, II, III and IV. In the example shown in the drawing (top of Fig. 1), and beginning at the left hand side of the sheet, it will be noticed that the perforations in the first column lie, one in the I position and one in the IV position; these, according to the diagram (Fig. 4) represent 0, but the zero is not printed in the interpretation. In the second column, holes are arranged in the II and IV positions, which, indicate 1, and "1" is shown printed in this position in the interpretation. In the third column perforations occur in the I and III positions, which, indicate 2, and "2" is printed in the interpretation. In the fourth, fifth and sixth columns perforations are found in the I and IV positions, which indicate 0. The zero in the fourth and fifth columns is not printed in the interpretation, but the zero in the sixth column is printed in the interpretation. In the seventh column perforations appear in the II and IV positions, which, represent 1, and "1" is printed in the interpretation. In the eighth column perforations appear in the III and IV positions, which represent 5, and "5" is printed in the interpretations. In the ninth and tenth columns perforations again appear in the I and IV positions, which indicate zero, and "0" is printed in the interpretation.

Provision must be made for supplemental or carry-over elements in the totalizers, and if all positions were used in the detail record there would be no extra totalizer elements for this purpose. Therefore, in the detail record all of the positions set aside for quantities and all of the positions set aside for dollars have not been used. The positions are provided with zero perforations merely to control the elements of the machine so that nothing should be added to these elements. The printing of zeroes in these columns is omitted, because they are unnecessary and would only obscure the record.

The columns on the right hand side of the sheet will now be considered. These columns control the selection of the totalizers and have been divided into groups. The first five, beginning at the left, are set aside for States, the next column is set aside for transactions, the seventh column is set aside for clerks, and the eighth, ninth and tenth columns are set aside for the classification of goods, in this particular case for the classification of goods being shipped from the furniture department.

As the first five left hand columns are set aside for the control of the different States, perforations will be found in only one of these columns depending upon to which State the article is to be sent. In the first transaction the perforations will be found in the third column, and in the III and IV positions thereon. These positions have been designated by the different States, and in this particular case represent the State Missouri, and "Mo." is printed in the interpretation. In the transaction column, perforations also occur in the III and IV positions, which in this instance denote cash on delivery, and "C. O. D." is printed in the interpretation. In the next column perforations are found in the II and IV positions, which, according to the system herein used, represent clerk A, and "A" is printed in the interpretation. The next three columns, as above mentioned, are set aside for the classification of goods, therefore perforations will appear in only one of these columns for any particular transaction. For this transaction the perforations are in the first of these three columns and in the I and III positions, which, according to the system herein used, have been set aside for fixtures, and "Fix." has been printed in the interpretation.

The interpretation of the whole first transaction is that twelve articles were sold for $15.00; that those articles were sent to the State of Missouri; that the transaction was collect on delivery; that clerk A filled the order; and that the goods shipped were fixtures.

The second transaction, as interpreted by the information on the detail record, is that one article was sold for $61.75; that the article was sent to the State of Vermont; that the transaction was for cash; that clerk E filled the order; and that the article sold was a bed.

*Summary and grand summary records*

Figure 2:
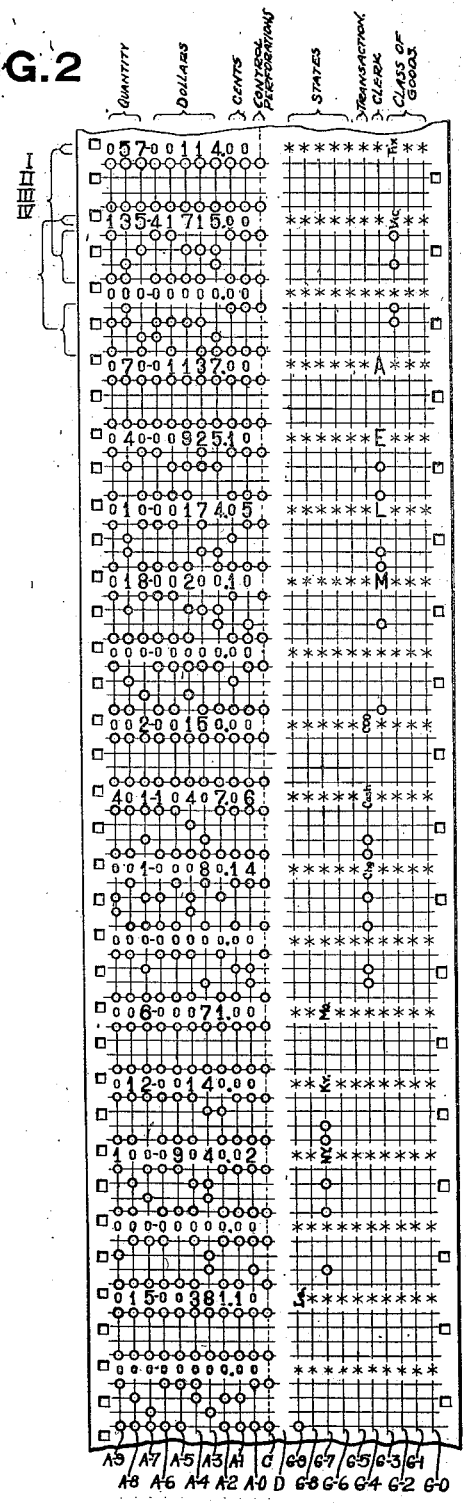
Fig. 2 is a fragmentary view, in reduced size, of the summary or grand summary record.

Since the summary and grand summary records are identical from a structural standpoint, a description of one will suffice for both. Fig. 2 illustrates the structure of these records. The ten columns at the left hand side of the sheet coincide in location, and are identical as to formation and method of interpretation, with the ten columns on the left hand side of the detail record (Fig. 1). No lengthy description of this portion of the record is therefore necessary. Each field, or what in the detail record was described as a transaction, here represents the data taken from one totalizer; that is, the data from each totalizer is transferred to one field of the summary or of the grand summary record. Therefore, the largest number of fields or transactions that can be recorded in the summary or the grand summary record coincides with the number of the totalizers in the machine. The machine described in this application, which contains 100 totalizers, can, therefore, produce a record of 100 fields.

The columns on the right hand side of the sheet are ten in number and coincide in location, and are identical as to the function and method of interpretation with the ten columns on the right hand side of the detail record (Fig. 1). The only difference noticeable in the record is that perforations and printing never appear in more than one column for any one transaction, this of course being due to the fact that only on totalizer can be reset to zero and a record thereof made during a single operation.

As there are 100 totalizers in the machine and ten selecting columns in the summary record, the four spaces in each column are adapted to take care of all ten totalizers in each group. In this way the whole 100 totalizers can be recorded on the sheet.

The positions on this sheet are indicated by the numerals I, II, III and IV, as the positions in the detail record were indicated. The interpretation printed in the first line at the top of the sheet (Fig. 2) belongs to the transaction within the first brace. As here illustrated, the interpretation is printed on the sheet just as in the detail record. In this record, however, the interpretation is printed one field ahead of the transaction instead of two fields or spaces behind, as in the detail record. The connection of interpretations with the transactions is shown in two instances by braces. The distance between the perforations of any given transaction and its interpretation is more or less arbitrary. In the machine forming the basis of applicant's Patent No. 1,506,056, issued August 24, 1926, and also his Patent No. 1,657,712, which is adapted to produce the detail record (Fig. 1), the printer is arranged to print two spaces or fields behind the perforator, while in this machine when adjusted to produce the summary or grand summary record, it prints one space ahead of the perforator.

The summary and grand summary records differ from those produced by the machine illustrated in the above mentioned Goldberg Patent, No. 1,694,009, in that, in the record produced by that machine the totalizers are designated by two columns of perforations only, one of which designates the groups and the other of which designates the totalizers from the groups, whereas in this machine there are provided on the summary and grand summary record ten columns which are adapted to receive printed and perforated interpretations of the totalizers as they are cleared. The column in which the printing and perforations are made determines the group from which the totalizer is selected and cleared and the location of the perforations in the columns determine which totalizer of the particular group was cleared. Instead of having the totalizers numbered, each totalizer in this machine is given a name and the name of that totalizer is printed in connection with the interpretation thereof.

The columns of the summary and grand summary records will not be considered seriatim as was done in connection with the detail record. Considering the rows of perforations connected by the top brace to the printing at the top of the sheet (Fig. 2), it will be seen that the first column represents 0, the second 5, the third 7, the fourth and fifth 0, the sixth 1, the seventh 1, the eighth 4, and the ninth and tenth 0. In the other words, these perforations represent that 57 articles were sold for $114.00.

The perforations on the right hand side of the sheet show that these 57 articles were fixtures, because the name of the fixture totalizer is printed in connection with this transaction.

Another difference between the summary record produced by the machine herein and that produced by the machine in the above mentioned Goldberg Patent, No. 1,694,009, is that in the machine of said patent the totalizers are cleared in a regular order, that is, beginning with 00 and ending with 99. Therefore, the summary record produced by said machine and the recording of the totalizers is in regular order. In other words, when producing a summary record on said machine it is necessary to clear all of the totalizers in the machine and in a regular order. The totalizers cannot be picked out and cleared promiscuously.

In the machine shown herein it is possible to select the totalizers in any order desired to reset the same to zero and to produce a record of these totalizers as they are selected. This makes it unnecessary to clear the entire machine when it is desired to reset, say only twenty-five totalizers out of the entire one hundred. This shortens the operation considerably.

In order to clear the totalizers in this manner a special selecting control record is prepared outside of the machine. This record is shown in Fig. 5 and consists of three groups of columns of perforations. Instead of having four rows to control the selection of the totalizers and the recording thereof and also selection of the groups and the recording thereof, only three rows are used. In the left hand group there are ten columns of three rows each. These columns are designated G—0, G—1, to G—9. It will be noticed that there are perforations in all three positions in column G—2. Each one of these columns controls the selection of a group of totalizers from the machine. The perforations in the two bottom rows control the selection of the group, and the perforation in the top row controls the selection of the means which causes the recordation of the group selected. The next group of columns consists of two columns only, having two positions in the left hand column and three positions in the right hand column of these two columns. These two columns and the combination of any two perforations therein select the totalizers from the group which has been selected by the perforations in one of the ten left hand columns. The third group of columns has only two columns, having two positions in the left hand column and three in the right hand column. Perforations in any two of these five positions control the means for recording the totalizer which has been selected according to the perforations in the totalizer selecting columns.

Figure 6:
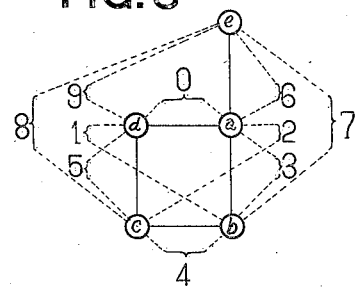
Fig. 6 is a diagrammatic view showing how the perforations are used in combination on the control strip for selecting the totalizers and for controlling the recording thereof.

Fig. 6 is a diagrammatic view showing how the totalizer selecting and the totalizer recording positions are used in combinations to select the totalizers and to control the means for recording them as selected. These positions, of which there are two in the left hand column, and three in the right hand column, are designated as follows: The two left hand positions are $d$ upper, and $c$ lower. The three positions in the right hand column from top to bottom are $e$, $a$ and $b$. The significance of these letters will be clearly understood when the electrical features of the machine are taken up. The interpretation of these perforations is as follows, and can be readily understood by following the diagram in Fig. 6. Perforations in the $d$ and $a$ positions indicate 0, and will select the totalizer in the zero position of any selected group. Perforations in the $d$ and $b$ positions represent 1, and will select the totalizer in the 1 position of any group; perforations in the $c$ and $a$ positions represent 2, and will select the totalizer in the 2 position of any group; perforations in the $a$ and $b$ positions select the totalizer in the 3 position of any group; perforations in the $c$ and $b$ positions will select the 4 totalizer of any group; perforations in the $d$ and $c$ positions will select the 5 totalizer of any group; perforations in the $e$ and $a$ positions will select the 6 totalizer; perforations in the $e$ and $b$ positions will select the totalizer in the 7 position; perforations in the $c$ and $e$ positions will select the totalizer in the 8 position of any group; and perforations in the $d$ and $e$ positions will select the totalizer in the 9 position of any group. These same combinations of perforations are used to control the printing wheels so that they will be set to print the name of the totalizers selected.

The totalizer selected by the three rows at the top of this strip would be in the totalizer in the second group, and it would be in the 2 position of that group because in the two columns which control the selection of the totalizers perforations are found in the $c$ and $a$ positions. Likewise, perforations are found in these two positions in the two columns which control the recording of the totalizers.

The next three rows of perforations will select the second group and will select the 3 totalizer in that group, and the perforations in the recording columns are in the same positions as the perforations in the totalizer selecting columns so that the totalizer selected will be properly recorded.

The next, or third three rows has one perforation only in the group controlling column, there being no perforations in the totalizer selecting columns nor in the totalizer recording columns. The reason for this is that when the selection of totalizers changes from one group to another it is necessary to make an idle operation before a new group is selected so that the recording mechanism will be restored to normal position. This will be fully explained later on in connection with the recording mechanism. As above mentioned, this record (Fig. 5) is not made by the machine herein shown and described, but may be made in any way desired, depending upon which of the totalizers it is desired to select.

*The detail analyzing machine*

The machine will first be described as adapted to audit previously prepared detail records. Its construction to produce the summary record, to add up or summarize the data of a plurality of summary records, and to produce a grand summary record will be taken up later. Certain parts of the machine, are, however, essential to all operations, and these will be referred to in connection with the description of the analyzing machine.

This machine is quite similar to the machine shown in the above mentioned Goldberg Patent, No. 1,694,009, and the parts which are similar are given the same reference numerals herein that they have in the other case. The same mechanism, however, does not always appear in the same figures.

Referring to the drawings, and particularly to Figs. 7A, 7B and 8, a base plate 1 supports end frames 2 and 3 and a side frame 4. A supplementary frame 5 is attached to the base plate and to the end frame 2 and supports certain of the operating parts. At the other end of the machine, frames 6 and 7 rise from the base plate and support the selecting and printing elements and certain other operating parts. A casing 8 covers the analyzing and printing mechanism. In order to furnish a support for certain of the operating elements a group of plates 9 (Figs. 7A, 7B and 16), supported by rods 300 (described later) is arranged across the body of the machine parallel with the frames 2 and 3.

A main shaft 10, supported by the frames 2, 3 and 6, runs lengthwise through the machine and transmits motion directly to many parts of the machine. This shaft communicates motion directly to a gear 11 (Figs. 23 and 28) at the left end of the machine, which meshes with an idle gear 12, which in turn meshes with a gear 13 fast on a supplementary shaft 14, and transmits motion thereto. This last mentioned shaft communicates motion to certain of the operating elements which are arranged across the end of the machine. Power is supplied to the main shaft by means of a motor 15 (Fig. 41) of any suitable construction, an electric motor being here shown. This carries upon its shaft a worm 16, which engages a worm gear 17 (Figs. 41 and 43) upon a shaft 18. At the other end of the shaft 18 is a clutch having a drum 19 (Fig. 44) and an inner clutch member 20 which cooperates with the drum by means of rollers 21 in a well known manner. A gear 22, driven by the inner clutch member 20, communicates motion to an idle gear 23, mounted to rotate on a stud 24 (Figs. 34 and 44); and this, in turn, transmits motion to a gear 25 loose on a stud supported in the frame 6, and from this gear motion is transmitted to the gear 26 fast on the main shaft 10. Through this train of gears motion is transmitted from the motor to the main shaft 10 and the supplementary shaft 14, and from these to all of the operative parts of the machine.

*Totalizers*

To facilitate selection, the accounting devices are divided into groups of any convenient number, and since this machine is provided with 100 totalizers, the grouping here adopted has been by tens; so that we have ten groups of totalizers with ten totalizers to the group. While the accounting devices may be of any preferred form, it is desirable to have them in as compact form as possible. The accounting devices or totalizers here used belong to that class in which all of the denominational elements belonging to any group are mounted together, the units together, the tens together, the hundreds together, and so on to the end of the series. It is necessary to provide only one actuator or operating rack for each set of the several denominational elements; one rack for all the units of the group, another for all of the tens, another for all of the hundreds, etc. With this arrangement, by effecting a relative movement between the totalizers and the actuators, all denominational elements of any desired totalizer may be brought into operative relation with the actuators.

The various sets of totalizer units are designated by the character 27 (Figs. 7A and 7B). It is to be understood that the character 27 does not indicate a complete totalizer, but designates a set of all the common denominational elements of all the totalizers in any group. Thus, the first elements of all the sets of any group are to be taken as constituting one totalizer, the first one in the first set belonging to the units of that totalizer, the first one in the second set being the tens of that totalizer, the first one in the third set being the hundreds of that totalizer, the first one in the fourth set the thousands of that totalizer, and so on to the end of the series. The second totalizer is made up of the second element of the first set, which is the units of that totalizer; the second element of the second set which is the tens, the second element of the third set which is the hundreds, and so on to the end. The third totalizer has the third element of the first set for its units, the third element of the second set for its tens, the third element of the third set as its hundreds, etc., and the tenth totalizer has the last element of its first set as its units, the last element of the second set as its tens, the last element of the third set as its hundreds, etc. Each totalizer is made up of ten elements which may therefore indicate a maximum of 9,999,999,999. The size of the totalizers, namely, the number of denominations included, will of course vary with the requirements to which the machine is to be put, and for many purposes a much smaller number of denominations than here disclosed would suffice. Each group of ten totalizers is mounted upon a shaft 28. There are ten of these shafts arranged in two tiers of five shafts each, and supported in a manner to be described for both longitudinal and vertical movement. The shafts in the respective tiers are not arranged in vertical alinement, but for structural reasons the shafts of one tier are offset with respect to those of the other tiers.

A space appears between the elements of the several denominations. This is the so-called neutral or blank position, and any shaft upon which no totalizer has been selected will always assume this position. When in this position none of the denominational elements engage the rack and the latter move idly through the machine so far as these totalizers are concerned.

Shaft setting mechanism

The shafts which carry the groups of totalizers are positioned by means which will now be described. All of the shafts are provided with extensions which protrude through enlarged openings in the frames 2 and 3 (Figs. 22, 23 and 24). To each shaft is attached a rack 29 having a slot 30, which cooperates with a roller 31 to guide one end thereof, and passes between two rollers 32 to guide the other end. The racks are fastened to the shafts by pins 33 which pass loosely through perforated bosses 34 fastened to the shafts. Each of the bosses has on one edge a tooth 35 which engages a fixed notch plate 36, the tooth and the plate together serving as an alining device for the shafts. The rack is held against vertical movement by the guide rollers 31 and 32; but as stated before, the shafts are adapted to move somewhat in a vertical plane. To permit the racks to actuate the shafts and to provide for this vertical movement, a space is left between the bosses on the shafts and the upper supports of the pins 33 so that the bosses may move up and down upon these pins.

All of the actuating devices for both tiers of shafts are substantially identical in construction. The parts, however, which actuate the lower racks (Fig. 24) are in some respects reversed in position with respect to those which actuate the upper racks. This refers particularly to the racks 29, the guiding rollers 31 and 32, the pin 33, the boss 34, the alining tooth 35 and notched plate 36. But since these parts are identical in construction with those which operate the upper tier of shafts no further specific reference thereto is necessary. While the construction by which the lower tier of totalizer shafts is actuated is substantially identical with that which operates the upper tier, it is to be noted that in setting the tiers, the shafts on the upper tier are shifted from right to left, whereas those in the lower tier are shifted from left to right.

The racks are supported by plates 37 arranged one adjacent each of the racks to which the guide rollers 31 and 32 are secured. These plates are held in place by rods and spacers. These include rod 38, with spacers 39; rod 40, with spacers 41; rod 42, with spacers 43; rod 44, with spacers 45; and rod 46, with spacers 47. The rods themselves are supported in the frames 4 and 5. This gives a rigid construction, and one that is easily assembled and put in place.

Differential setting mechanism

Inasmuch as only one actuating rack is provided for each set of denominational elements; namely, one for all the units, one for all the tens, one for all the hundreds, etc., it is necessary that the shafts which carry the respective groups of totalizers shall be so positioned with respect to the racks that the denominational elements of any totalizers may be brought into engagement therewith. For this purpose a differential mechanism is used which will set the shafts in whatever position required, in order that the elements of its selected totalizer shall be in position to engage the actuating racks. There is, therefore, one differential device for each shaft.

While no reference has yet been made to the means for operating the actuating racks, it may be stated that these too require to be differentially set so that any amount from 1 to 9 may be entered upon any of the denominational units of the selected totalizer elements. The mechanism by which they are set is substantially identical with that used to adjust the shafts. Three shafts, 48, 49 and 50 (Figs. 22, 24, 25 and 28), extend across the end of the machine and are suitably supported in the frame work. The supplemental shaft 14, has secured thereto a drum cam 51. The shafts 48, 49 and 50 do not rotate, but oscillate between fixed limits, the motion being derived from the cam 51. Shaft 48 has fixed to its end an arm 52 bearing a roller 53 which engages a raceway 54 in the cam 51. The shaft 49 has fixed thereto an arm 55 bearing a roller 56 which engages a raceway 57 in the cam 51. The shaft 50 has fixed upon its end an arm 58 bearing a roller 59 which engages a raceway 60 in the cam 51.

The shaft 48 has secured thereto a set of drivers 61 (Figs. 22, 24 and 25), one for each of the ten shafts. Since these are fastened to the shaft, and the shaft is driven by a cam, the drivers have an invariable extent of movement for each cycle of the machine, but since it is necessary to adjust the shafts differentially it is necessary to have some mechanism by which the variable elements may be driven from the parts which have invariable movement. Loosely mounted upon the shaft 48, and adjacent to the drivers 61, are differential elements 62. Each of these has mounted thereon a segmental rack 63 having a slot 64 through which passes a pin 65. The differential carries a latch 66 supported at one end by a lever 67 which is pivoted to the rack at 68, to the latch at 69, and to the differential member at 70. The other end of the latch is supported by a link 71 pivoted to the latch at 72 and to the differential member at 73. A spring 74, fastened to a lateral extension of the link 71, and to a pin on the differential 62, tends to keep the latch in its outward position. The latch carries at its outer end a double-faced latch-head 75, one face of which contacts the shoulder 76 at the upper terminal of the locking face 77 when the parts are latched together, and moves along the face 77 when the parts are unlatched; and the other face of which is adapted, when the parts are unlatched and the latch thrown in, as best shown in Figs. 22 and 24, to engage the teeth of a segment rack 78 cut in the fixed plate 37.

The differential element 62 carries a pin 79 which extends into the path of a projection 80 on the driver 61. Upon the return of the driver the projection 80 engages the pin and thereby returns the differential member to its home position, whatever position it may have assumed during any particular cycle of operation.

The differential member is stopped at the desired position by means of an arm 81, which carries a stop 82, adapted to engage any one of the several teeth of the rack 63, carried by the differential member. The arm 81 is attached to, and actuated by, the armature 83 of an electromagnet 84. Whenever the magnet is energized it attracts its armature and thereby throws the stop 82 into engagement with the rack 63. The time in the cycle at which the magnet is energized will be determined by the perforations in the control sheet. The method of energizing the magnet under the control of this sheet will be described later. It is sufficient at this point to say that the differential is arrested in any of its several possible positions by means of the magnet and the parts controlled thereby.

Rigidly secured to the frame 37 is a stop 99 so positioned as to engage the first tooth of the differentially adjustable rack 63, and thus stop the rack, unlock the latch 66, and thereby stop the differential, if it has not been previously stopped by the magnet and its co-acting parts.

The rack 63 has teeth equal in number to the positions which the totalizer shafts may occupy, whatever the number may be. In this case, each shaft carries ten totalizers, and has therefore ten totalizer positions. The segmental racks have ten teeth or stopping points.

When selecting a totalizer the differential member 62 moves clockwise and is stopped by the energization of the magnet 84. When no totalizer is to be selected the magnet will not be energized and the differential will move down to its extreme clockwise position as shown in Fig. 22. Should the magnet be energized its stop 82 would be thrown into position to engage the rack 63. The continued movement of the driver effects the withdrawal of the latch 66 from contact with the shoulder 76 and throws it into engagement with the teeth of the rack 78 upon the fixed support. The differential is thereby unlocked from the driver, and the latter continues to the full extent of its movement. Should the magnet of any particular driver not be energized, the segmental rack will come in contact with the stop 99, which will unlock the parts just as the stop 82 effects this result. When the parts are unlocked, either by means of the magnet and its co-acting elements, or by the stop 99, the latch is thrown into cooperative relation with the rack 78, and the latch-head engages the surface 77 on the driver and is thereby prevented from retracting until the driver returns and moves the surface 77 beyond the point of the latch. The latch then moves forward under the action of its spring 74, and falls into position and contacts the shoulder 76 of the driver.

*Differential positioning mechanism*

The means for transmitting the variable motion of the differentially adjustable elements to the several totalizer shafts will now be described. One differential and one actuating mechanism is provided for each shaft. The racks for actuating the upper tiers of shafts have their teeth upon the lower edge, while those for actuating the lower tiers have their teeth upon the upper edge. These racks are engaged by two segments, which are variably positioned as the selection may require. The mechanisms which position the shafts of the upper tier (Fig. 22) are all identical in construction, and those which position the lower tier (Fig. 24) are likewise identical in construction. Those which control the upper tier differ from those which control the lower tier only in the position of the actuating segments. With this understanding, a description of one mechanism will suffice for all.

Referring to Fig. 22, a segment 85, loosely mounted on a shaft 86 is in engagement with the rack 29. A lever 87, known in the art as a "beam", and hereinafter so designated, has one end secured by a pivot 88 to a lateral extension of the segment 85. A link 89 has one end pivoted to the beam at 90 and the other end pivoted to the differential element 62 at 91. As the element 62 is differentially adjusted, it will vary the position of the beam 87, but this alone will not produce movement of the segment 85. Another element, known in this art as a "beam actuator", and hereinafter so designated, is necessary. The beam actuator 92 is rigidly fastened to the shaft 49, which is oscillated through an invariable arc by the arm 55 (Fig. 28) and the race 57 of cam 51, the oscillations occurring once for each cycle of the machine. As the link 89 (Fig. 22) is shifted by the differential, the beam actuator moves its roller 93 to engage with the upper surface of the beam. As the beam actuator has an invariable extent of movement it forces that part of the beam with which the roller engages to a definite position, but since one end of the beam is fastened to the link 89, and may therefore have a varying position, and the other end of the link is secured to the segment, this segment due to the combined action of these parts will be variably positioned, the variations following exactly the variations of the differential member 62. The beam actuator 92 is lifted from engagement with the beam at the same time the driver 61 returns. This permits the link 89 and the beam 87 to adjust themselves to accommodate the movement of the differential, but the segment 85 is not shifted by this reverse movement of the parts. It remains in the position in which it was set. Should any totalizer on this shaft be selected for the succeeding operation, the cooperation of the elements is such that the shaft will be moved at once to the new position, and will not be brought home before such adjustment can be effected. The adjustment to the new position is thus always effected by the least possible movement. This beam and co-acting mechanism are generally known in the art as a "minimum movement device".

An extension 94 of the beam actuator 92 lies behind the upper end of the link 89 and an extension 95 of the segment 85 extends in front of this link. These serve to guide the free ends of the beam 87 and the link 89 and thereby prevent lateral displacement thereof.

In order that the pivot 88 of beam 87 may be held in exact position, the segment 85 has rigidly attached thereto by means of a pin 96, or any other suitable means, a segment 97. Co-acting with this segment is an aliner 98 rigidly fastened to the shaft 50. This shaft is oscillated once during each cycle of the machine by the cam 51 (Fig. 28), race 60 and lever 58. The aliner is timed to disengage from the segment 97 before adjustment of the segment 85 beings and to be again placed in position immediately after the adjustment is completed. In this manner the actuating segment 85, and consequently the shaft which it controls, is differentially positioned and positively locked, except during the period of adjustment.

Contact banks

Each shaft actuating mechanism has associated therewith certain electrical contacts. The rack actuating mechanism also has associated therewith electrical contacts which are identical with those associated with the shaft actuating mechanism. As these electrical contacts are fully illustrated and described in the above mentioned Goldberg Patent No. 1,694,009, they will be referred to only in a general way herein. In the description of these contact banks, Figs. 16 and 22 will be particularly referred to. Fig. 16 shows the right hand side of one of the contact banks associated with the rack actuating mechanism, and Fig. 22 shows the left hand side of a contact bank associated with the totalizer shaft actuating mechanism.

Each differential element 62 has secured thereto a movable contact support 100. Each contact is made double and has two blades 101 (Fig. 22) and 102 (Fig. 16). Each blade has two fingers, a long one and a short one. These two blades 101 and 102 are insulated from each other and from the support 100.

Removably fastened to the framework of the machine are the contact segments 106, one being provided for each shaft actuating mechanism and one for each rack actuating mechanism. Each of these segments consists of a plate cut on the arc of a circle. They are so positioned as to enable the differential mechanism to carry the movable contacts into operative relation with the contacts of the segment. Each segment has a recess at each end and the upper end is held in position by the rod 40, (Fig. 22) while the lower end is held by the rod 42. The recesses are so cut that the upper end can be inserted under its supporting rod and the lower end then slipped into position. The rod 42 is rotatable and is provided with certain flat sections where the segments are to be engaged. The segment is placed in position by turning the rod 42 so that the recess of the segment can pass over the rod when the flat section is in one position, but is retained when the rod is turned. The upper ends of the actuator contact banks are each mounted on a stud on the plate 9 (Figs. 16 and 17) instead of a rod such as is used to mount the upper ends of the shaft contact banks (Figs. 22 and 25).

Segment 106 carries a sheet of insulating material 109 on either side thereof. Each segment also carries two long contacts 110 and 111, one on either side thereof, over which the fingers of the movable contacts 101 and 102 are adapted to move; and they carry twenty other short fixed contacts, ten on each side thereof, all electrically insulated from each other and from the contacts 110 and 111 and so positioned that the long fingers of the movable contacts 101 and 102 sweep over them. By this means the last mentioned contacts are electrically connected to the long contacts 110 and 111 successively as the movable contacts move over the segments. The fixed contacts on the right hand side (Fig. 16) are designated $r$—0, $r$—1, $r$—2, $r$—3, etc., to $r$—9, while those on the left hand side (Fig. 22) are designated $l$—0, $l$—1, $l$—2, $l$—3, etc., to $l$—9. Plates 112, and insulating plates underneath these plates 112, are used on each side of the contact segments to hold the fixed contacts in place.

Totalizer actuating mechanism

The totalizers are operated by actuating devices, here shown as racks (Figs. 16, 17 and 22). There is one of these racks 115 for each denomination of the totalizers, and since the totalizers here shown have ten denominations there are ten racks. These racks may be of any preferred construction, but as here shown are built up of two thin plates 116 and 117 (Fig. 22), with rack sections 118 secured between them. The sections 118, secured to the top of the rack structure, engage the same denominational elements in all of the groups of totalizers on the upper tier of shafts, and since, in the construction here shown, there are five shafts in each tier, there are five rack sections on the top of each rack structure and five rack sections on the bottom thereof. These sections will be varied with the number of groups of totalizers. If the number be less than that disclosed, the rack sections will be less; if the number be greater, the rack sections will be greater. These racks 115 also carry other elements which are used in transferring from a lower to a higher denominational order. The construction and operation of these parts will be given when the transfer mechanism is disclosed. Each rack structure also carries upon its under side an additional rack section 120 which engages the driving segment of its differential and is used to shift the rack structure back and forth as circumstances require.

Rack adjusting devices

The racks are adjusted and controlled by differential devices identical in many respects with those used to adjust the totalizer shafts. One of these actuators, or differential devices, is provided for each rack structure, and since ten racks are here illustrated ten actuators have been provided. These are best shown in Figs. 16, 17 and 18. There is, however, this difference to be observed between these actuators and those used to shift the shafts. In the latter case the final adjustment of the shafts is by means of the so-called "minimum movement" mechanism, or by the combined action of the differential devices with these minimum movement elements; but with the rack actuators the racks are adjusted and operated directly by the differentials.

Since the rack actuators are all alike, the description of one will suffice for all; and in order to avoid the use of an unnecessary number of reference characters the parts of these actuators which are identical with the shaft actuators will be designated by the same characters that have been used in describing those structures. Therefore, following this designation, a driver 61, identical with the drivers used in connection with the shaft differentials, communicates motion to the differentials 62. These drivers, however, are not rigidly attached to their supporting shaft 153 as are the drivers for the shaft differentials, but are loosely mounted thereon and are provided with independent driving means. This is because these differentials cannot act at all times in unison, but must come back successively. Each differential carries a rack 63 having a slot 64 in which moves a pin 65. A latch 66 is supported at one end by a lever 67 which is pivoted to the rack 63 at 68 and to the latch at 69. A link 71 is pivoted to the latch at 72 and to the differential at 73. A spring 74 forces the latch forward. The latch-head 75 of the latch engages the driver at 76 until disengaged therefrom at the point selected, whereupon it is thrown in and the rear edge of the latch-head 75 engages one of the rack teeth 78, while the surface 77 of the driver rides over the point of the latch and prevents it from being retracted. An arm 81 having a stop 82 is supported by the armature 83 of an electromagnet 84, and serves under conditions to be hereinafter described as a means for stopping the differential element at the point determined by the controlling record. The driver returns the differential by a projection 80 engaging the pin 79, as in the construction formerly described. Each differential mechanism has a movable contact 100 and a contact segment 106, which elements have contacts hereinbefore described.

The rack actuators are, as stated, individually driven. This is accomplished by means of segments 121 (Figs. 16 and 17), loosely mounted upon a shaft 122. These segments engage segments 123 fastened to the drivers 61 by means of pins 124 and 125. The segment 123 is arranged on the other side of the support plate 9 from that occupied by the driver, and is therefore spaced therefrom sufficiently by the pins 124 and 125 to permit the engagement of the actuating segment therewith. In order to permit the free movement of the parts, the plate 9 has a recess 126. The driving segment 121 is actuated by a double plate cam, one plate 127 (Fig. 17) of which operates upon a roller 128 upon an arm 129 to move the segment in one direction, and another plate 130 operates upon a roller 131 on arm 132 to move the segment in the reverse direction. This movement takes place once for each cycle of operation. The arms 129 and 132 are integral with the segment 121.

Each differential 62 carries a segment 133 which engages the rack section 120 and thereby transmits motion to the rack 115. Any varying movement which is communicated to the differential is therefore by this means transmitted to the rack, and the latter is thereby adjusted differentially.

*Totalizer adjusting mechanism*

In order that the selected totalizers may be placed in positions for actuation, all of the totalizer shafts with the totalizers mounted thereon are shifted at one time from their normal positions to their rack engaging positions. The totalizers which have been selected for actuation are thus placed in engagement with the racks, while those which have not been selected are so placed with relation thereto that the racks move idly through the blank positions with which each group of totalizers is provided. The means for moving the totalizer shafts toward or from the racks and the means for operating the totalizers will now be described.

In order to prevent displacement of the totalizer elements it is necessary that they be locked against movement at all times except when in engagement with their respective racks. This is effected by alining devices which will be hereinafter considered.

In describing the totalizer adjusting devices, reference is made to Figs. 19 and 20 in particular, and also to Figs. 7A, 21, and 22. The initial movement, that is, the movement for engaging the selected totalizers with the actuators, is derived from a slide 150 located in the left end of the machine (Fig. 7A). A similar slide 151 is used to communicate motion to the alining devices. The slide 150 is shifted by means of a lever 152 (Fig. 19) pivoted on shaft 153 and having at its lower end a slot 154 and at its upper end a stud 155. The stud 155 engages a slot 156 in the slide 150. Another lever 157 (Fig. 20) pivoted on shaft 153 and having a slot 158 at its lower end and a stud 159 at its upper end engages and actuates the slide 151. Both levers are in turn actuated by another lever 160 which is pivoted on shaft 122 running across the machine, and in turn derives its motion from cams on the cam shaft 10. This lever 160 carries a roller 162 which engages the slot 154 in the lever 152; and another roller 163 which engages the slot 158 in the lever 157. The cams which drive the main lever 160 are specially designed so that the timing thereof may be changed during total taking operations. This construction will be described when the last mentioned operation of the machine is considered. The slide 150 is guided by grooved rollers 164 mounted on studs 165 in the frame 2. The slide 151 is similarly guided by rollers 166 also mounted on the studs 165.

At the other end of the machine is another slide 167 (Fig. 21) guided upon rollers 168 mounted on studs 169 secured to the frame 3. This slide is mounted to move in synchronism with the slide 151. Motion is communicated thereto from slide 151 by means of a lever 170 (Fig. 20) having a bifurcation 171 engaging a pin 172 on the slide 151. The lever 170 is fastened to a shaft 173 which has at its other end another lever 174 (Fig. 21) having a slot 175 which engages a pin 176 on the slide 167. By this connection any movement of slide 151 is imparted to the companion slide 167.

The shifting of the totalizers into engagement with the actuators is effected directly by the slide 150, while slide 151 actuates the aliners; slides 151 and 167 together hold the totalizers while in their engaged positions.

Running lengthwise through the machine above and below the actuating racks are a series of shafts 180 (Fig. 19), there being one shaft for each group of totalizers. These are journaled in the main frames 2 and 3 of the machine. To each shaft there is rigidly secured a bell crank 181, there being one of these cranks for each totalizer shaft. One arm of each bell crank is slotted to engage a pin 183 on the slide 150; the other end of the bell crank embraces and carries one end of another shaft 184, likewise running across the machine. These shafts are journaled for oscillation in the bell cranks and do not extend to the frames. The shafts 180 have arms 185 (Figs. 7B, 21 and 22) secured to them at the other ends of the machine, which arms embrace the opposite ends of the several shafts 184. Other arms 186 (Figs. 7A, 7B and 22) are fastened to the shafts 180 intermediate their ends, and likewise embrace the shafts 184, thereby helping to support the same between their ends.

Hung on the shafts 184 adjacent the bell cranks 181 and the arms 185 are arms 187 (Figs. 21 and 22) engaging guide rollers 189 secured to the end frames of the machine. In these arms 187 are hung the totalizer shafts 28, each shaft being supported by two of these arms 187, one at each end of the machine. By this means, as the slide 150 is shifted to the right (Fig. 19) it actuates the several bell cranks 181, thereby lowering the upper and raising the lower arms 187 and putting the totalizers into engaging position with the actuating racks. As the slide moves in the reverse direction, the shafts 28 and totalizers are withdrawn. This shifting of the totalizers occurs once during each cycle of operation, and is so timed that the totalizers are brought into engaging position after the actuating racks have been differentially positioned, so that the selected totalizers are in engagement with the racks during the return of the latter to their home positions and thus the movement represented by the variously positioned racks is communicated to the totalizers. The totalizers are then disengaged from the racks.

Alining devices

As stated above, the alining devices are actuated by the slide 151 which receives its movement from the shaft 10 by means of the levers 157 and 160. It is necessary that all totalizer elements be positively held at all times except when in actual engagement with the actuating racks. Two alining devices are therefore provided, one for holding all of the totalizer elements when the totalizers are out of rack engaging position and another to hold all of the totalizer elements that are not in engagement with the racks when the totalizers have been moved to their engaging positions.

To hold the totalizers alined when in their disengaged positions, alining bars 200 (Figs. 20 and 22) are provided. There is one of these bars for each group of totalizers, and they are so mounted as to move both longitudinally and vertically with the groups with which they are respectively associated. Stationary alining devices are shown at 201. These are short and rigid sections equal in length to the space occupied by ten totalizer elements, and are secured to the plates 9 between the actuating racks by means of rivets 202 (Fig. 17). When the totalizers are moved into engaging positions all elements not in engagement with the racks are brought into engagement with these alining devices.

The alining bars 200 are mounted in supporting slides 203 (Figs. 20 and 21). Each slide 203 is provided at its upper end with a slot 204 by which it is guided by the shaft 184; and at its lower end with a slot 205 by which it is guided by the shaft 28. Each slide has a third slot 206 in a lateral extension which engages a short pin or rod 207 by means of which it is raised and lowered.

The movement of the alining devices must be such that they will move with the totalizers, and keep the elements thereof alined, until the totalizers are in their rack-engaging positions, at which time the elements of the totalizers are held by the stationary alining devices or by the racks themselves. Immediately after the totalizers are in rack-engaging positions, the movable alining devices must be withdrawn so that the racks may actuate the selected elements. As soon as the selected elements have been actuated by the racks the movable alining devices must again engage all of the totalizer elements, and this engagement must be maintained while the totalizers are being moved from their rack engaging positions. It is, therefore, seen that the alining devices must first be moved with the totalizers, then they must be disengaged therefrom, then they must be re-engaged therewith, and then again moved away with the totalizers.

Loosely mounted upon the shafts 180 are bell cranks 208 (Fig. 20) the lower end of which engages a pin 209 on the slide 151. The other arms of these bell cranks extend laterally over the shafts 184 and each carries at its end a pin 211. Rigidly secured to the shafts 184 are levers 210, there being one lever for each shaft. One end of these levers has a slot with which the pin 211 on the bell crank 208 engages. The opposite ends of these levers 210 carry one end of the short rods 207. At the other end of the machine, rigidly attached to the shafts 184, are similar levers 213 (Figs. 7B, 21 and 22), but these levers merely carry one end of the rods 207 located at that end of the machine, and do not have slots at the other end as do the levers 210, since there are no bell cranks at this end of the machine for directly actuating these levers. The other ends of the rods 207 are supported by levers 215 rigidly secured to the shafts 184.

Collars 216 (Fig. 7A), secured to the shafts 180, hold the bell cranks 208 in position and yet permit their free oscillation. This construction is somewhat involved, but its operation is clear, and is as follows: Referring now particularly to Figs. 19 and 20; at the beginning of the movement of the totalizers toward the rack-engaging position, slides 150 and 151 move together. Slide 150 acts upon the bell cranks 181 and effects the positioning of the totalizers. Slide 151 also moves the bell cranks 208. The elements are so arranged that there is no substantial relative movement between the totalizers and the alining devices, the latter simply moving with the totalizers. When the totalizers reach the rack-engaging position and have engaged the racks, and have been engaged by the stationary aliners 201, slide 150 comes to rest, but slide 151 continues its movement. This causes bell cranks 208 to further rotate, and since shafts 184 are now stationary there is a relative movement between the pins 211 and the levers 210 which causes the latter to rotate, and since the levers 210 are fastened to shafts 184 these shafts likewise turn, and with them the levers 213 at the other end of the machine (Fig. 21). This causes the other ends of the levers 210, 213 and 215 to move in a direction opposite to the movement of the pins 211. Since the other ends of these levers actuate the rods 207, and since these rods engage the slots 206 in the slides 203, whatever the longitudinal position of the groups of totalizers with which they are associated, the slides will be withdrawn, and the alining plates 200 removed from engagement with the totalizers. As soon as this happens, the slide 151 comes to rest and all further relative movement between the alining devices and totalizers ceases.

The parts are held in these positions until the racks have reached their home positions, whereupon slide 151 begins to move in the reverse direction, thereby shifting the several pins 211 and thus shifting in a reverse direction the rods 207, which in turn shift the slides 203 at both ends of the machine and cause the alining devices 200 to re-engage the totalizers. Slide 150 then begins to move and the two slides continue their movement in substantial unison so that as slide 151 continues to shift its bell cranks 208, slide 150 shifts the bell cranks 181 and the totalizers and the alining devices reset together to their normal positions, where they remain until the next succeeding cycle of the machine.

Slides 151 (Fig. 20) and 167 (Fig. 21) are provided with hooks 214, there being as many hooks on each slide as there are totalizer shafts. When the totalizers are in their rack-engaging positions, these hooks engage the totalizer shafts 28 and hold the same against displacement. As illustrated in Fig. 19, 20 and 21 the totalizers are in the rack-engaging positions and shown as locked in place by the slides 151 and 167. As the slides recede the hooks 214 also recede. At the same time the alining devices are brought into engagement with the levers. By the time that the alining devices have been placed, the hooks 214 have been removed and the shafts 28, together with the totalizers, may be withdrawn to their normal positions.

The use of the rods 207 is necessary, because of the longitudinal travel of the totalizer shafts. The possible lengthwise movement of each of these shafts is equal to the space occupied by the number of elements in each register, in this case ten, together with the space occupied by the blank position. Since it is necessary for the alining devices to engage the elements of the totalizers, in whatever the position the shaft may be, it is necessary that these alining devices travel with the totalizer shafts. As the shaft is adjusted longitudinally, the alining device for all the totalizers of that shaft, together with its carrying slides 203, moves with it. Since the aliners may have to be adjusted to any position of the shaft the rods 207 are made of such a length that the slides 203 may be adjusted, whatever the position of the totalizer shaft. This is best shown in Figs. 7A and 7B, where the lengths of these rods are particularly illustrated.

*Transfer mechanism*

The carrying mechanism will now be described. Inasmuch as the totalizers are arranged with all the units of each group together, all of the tens together, all of the hundreds together, etc., whenever any totalizer group is selected all of the denominational elements of such totalizer must be in position to engage with the several racks. The units of any totalizer must engage with the units rack; the tens element with the tens rack; the hundreds element with the hundreds rack; and so on to the end of the series. This requires that the carrying mechanism shall carry from the element which is in engagement with the units rack to the element which is in engagement with the tens rack, and that the latter shall be able to carry to the element that is in engagement with the hundreds rack, and so on through the series.

The means for giving the additional step of movement to the denominational element into which the carry is to be made is in the rack structure itself. Each of the racks proper consists of a main rack and a supplemental rack, the main rack being of a length and having movement sufficient to give the totalizer element nine steps of movement, and the supplemental rack being of a length and having movement sufficient to give the totalizer element one additional step of movement. When carrying is to take place the supplemental rack is permitted to act upon the totalizer element into which the carry is to be made, but at all other times the supplemental rack is rendered ineffective. Means is therefore provided for controlling the movement of the supplemental racks by mechanism under the control of the next lower denominational element so that the supplemental rack is effective or not effective, depending upon the condition or position of the next lower denominational element of the totalizer engaged.

Running across the machine is a series of rods 300 (Fig. 16), one for each totalizer shaft, the rods being fixed in the frames 2 and 3 and plates 9. Spacing collars 301 (Fig. 27) are employed to maintain the proper distance between the end frames 2 and 3 and the division plates 9, and also between the plates themselves. Upon the collars are placed the devices which, acting under the control of the denominational elements, determine whether the next higher order element of any given totalizer shall or shall not have its elements moved the additional step necessary to effect a carry.

Adjacent each rack 118 is a supplemental two-toothed rack 302 (Fig. 16) pivotally mounted at 303 between the plates 116 and 117 of the rack structure. A sufficient space is allowed between the racks 118 to permit the supplemental racks 302 to move out of the way when no carry is effected. Each of the supplemental racks 302 carries a pin 304 which passes through a hole 305 in one of the side plates of the rack structure. Loosely mounted upon this pin is a bell crank 306 (Figs. 16 and 17) having at one end an L-shaped slot 307 through which passes another pin 308 rigid with the rack structure. The short arm 309 of the bell crank is adapted to come into engagement with a certain controlling device, the position of which determines whether the supplemental racks shall or shall not be effective. To the pin 304 of each supplemental rack is rigidly secured a short arm 310, and between this arm and the pin on the bell crank 306 is stretched a spring 311. This spring holds the bell crank 306 with the short end of the L-shaped slot 307 engaging the pin 308 unless said bell crank is forcibly shifted to place the long end of the L-shaped slot in line with the pin 308. Each bell crank is further provided with a notch 312 (Fig. 17) adapted to co-act with a fixed rod 313 whenever the rack 302 is held against effective movement.

Tripping lever 314 (Figs. 16 and 17) are loosely mounted upon pivots 315 secured in the plates 9. There are as many of these trip levers as there are racks 118. They are all identical in construction and a description of one will suffice for all. Each trip lever has a laterally bent arm 316 (Fig. 27) which passes through on opening in the plates 9 and extends into the path of movement of the arm 309 (Figs. 16 and 17). There is thus provided a stop supported by the framework of the machine which may extend into position to, co-act with the arm 309, or not co-act therewith, depending upon the position of this stop. Each lever 314 also has another bent arm 317 which is engaged by a restoring bar, to be later described, which restores to normal positions at the end of each cycle of the machine all trip levers which have been actuated during that cycle. Each trip lever 314 is provided with another extension 318 which co-acts directly with the element controlled by the denominational wheels of the next lower denomination and which determines whether its lateral arm 316 shall or shall not engage the arm 309 of the bell crank 306.

Each totalizer element 27 is provided with a tooth 320 slightly longer than the other teeth. Arranged in position to be engaged by this long tooth is a plate 321 mounted on a lever 322 (Figs. 26 and 27). This lever communicates motion to a longer lever 323 in position to engage the trip lever 314 of the next higher denomination, the levers 322 and 323 being connected together by a sleeve 324 so as to move in unison. The lever 323 has two notches or steps 325 and 326. A spring 327 yieldingly connects the trip lever 314 and the arm 323.

Whenever any denominational wheel of any totalizer, except the wheel representing the highest denomination, moves from 9 to 0 its long tooth 320 engages the plate 321 on the lever 322 and slightly displaces the same. This movement is communicated to the lever 323 by the sleeve 324, thereby shifting the lower end of said lever so as to permit the extension 318 to move from the step 325 to the step 326 under the influence of the spring 327. This so changes the position of the arm 316 as to remove it from the path of the arm 309, so that when the rack structure is shifted said arm 316 and the arm 309 will not come in contact with each other, but the latter will pass freely by the bent arm 316. If the totalizer wheel is not shifted, or if moved and its movement is not sufficient to engage its long tooth 320 with the plate 321 then the lever 322 will not be moved, the lever 323 will remain with its step 325 in engagement with the extension 318 of the trip lever 314, and the bent extension 316 will remain in the path of the arm 309 of the bell crank 306. Now, as the rack structure moves the arm 309 will strike the arm 316. This will cause the bell crank 306 to move around its pivot 304, causing the long end thereof to be shifted until the short end of the slot 307 passes over the pin 308 and the long part thereof comes into line with said pin. The supplemental rack 302 is then held against movement, but the rack structure with the racks 318 continue to move, the pins 308 moving through the long portions of the L-shaped slots 307.

As the bell cranks 306 are stopped and rotated to disengage the vertical portion of the slot 307 from the pin 308, they engage the stationary rods 313 which lock with the notches 312. The bell cranks 306 are thus held stationary (Figs. 16 and 17) while the racks complete the short additional movement required. At the time the supplemental racks 302 are stopped they are in engagement with the denominational elements of the totalizer or totalizers which are being actuated. When they are stopped the totalizer elements 27 also stop, but the main racks 118 continue and make the full movement determined by the differentials. Immediately after the rack actuating mechanism comes to a stop the totalizer adjusting and alining devices come into place, the aliners 200 come into position and the totalizers withdraw from the racks.

*Restoring mechanism*

Inasmuch as it is impossible to determine which of the trip levers 314 will be actuated during any one cycle of movement, devices are provided for restoring any and all levers which may have been moved during such cycle. For this purpose, restoring bars 330 (Figs. 16 and 17) are provided, one for each rack structure. These bars are mounted on plates 9 on the same side thereof as are the trip levers 314. Each bar is provided with a plurality of slots 331 through which pass studs 332 secured in the plates 9. Each bar also has lateral extensions 333 equal in number to the number of trip levers which it controls. These extensions are so arranged with respect to the arms 317 of the trip levers that a reciprocation of the bar will engage the arms of all levers that have been tripped during any operation and move them to such positions that the springs 327 will cause the steps 325 of the arms 323 to again engage the extensions 318 on the trip levers, thus holding them in normal positions. Each bar 330 has a lug 334 by which it is shifted in one direction, and a spring 335 stretched between a lug on the bar and a pin on the plate 9 by which it is moved in the other direction. The bars are actuated by arms 336 (Figs. 16 and 17), mounted to oscillate on the shaft 153, and are driven by the segments 121 which actuate the drivers 61 of the rack differentials. Each arm 336 has a laterally bifurcated extension in which a pin 124, hereinbefore referred to, engages, and by which motion is conveyed thereto. The timing is such that the restoring bar is actuated and the levers 314 reset near the end of the advance or positioning movement of the driver 61, so that the trip levers 314 are in positions to act as soon as the totalizer elements begin to rotate on the return movement of the actuators. As soon as the drivers 61 and their actuating segments 121 begin to return, the arms 336 move away from the lugs 334, which, under the influence of the springs 335, move in the reverse direction. This removes the extensions 333 out of the paths of the arms 317 so that they will be free to move, when carrying may take place.

There is no carrying to take place into the denominational elements of lowest order, therefore the trip levers associated therewith do not have all the functions of those on the other banks, but they must be able to separate the supplementary racks 302 from the main racks 118 at every operation of the machine. The arms 316 of the trip levers must therefore always function; but since there is no necessity for moving the restoring bar 330 at each cycle of the machine this bar associated with the lowest denomination is secured in position so as to hold the trip levers in their normal positions wherein they will always function. The means for holding this rack bar and the lower rack bar itself are not shown in this application, but are shown and described in applicant's Patent No. 1,694,009, above referred to.

As before stated, the actuating racks are first set differentially and the selected totalizers then engaged therewith. The racks then return, the units racks starting first and the others following in close succession one after the other, and the amounts represented by the positions of the several racks, are run upon the selected totalizers. As the racks return and it becomes necessary for a carry to be made, the long tooth of the lower denominational element engages the plate 321, thereby operating the lever 323, shifting the trip lever 314 of the next higher denominational element to such a position that when the rack returns, the arms 309 and 316 will not be engaged, thus permitting a supplemental rack 302 of that particular rack to move that denominational element one additional step. For all denominational elements in which no carry is to be effected the trip levers 314 are retained in such positions that the arms 309 and 316 do engage, and the bell cranks 306 are shifted so that the pins 308 run into the longitudinal part of their L-shaped slots 307, and the bell cranks assume positions in which the locking rod engages the notches 312. The locking of the bell cranks 306 is completed just as the rack structure reaches its home position at the end of the cycle.

It will therefore be found that all of the supplemental racks 302 will not at this time be in the same position. Those which have effected a carry will be held in close relation to the main racks with which they cooperate, while those which have not effected a carry will remain separated therefrom, and their bell cranks 306 will remain locked by the rod 313, as shown in Fig. 17. These parts will remain in such positions until the next cycle of operation. As soon as the actuating racks begin their movement in the succeeding cycle the first effect will be for the rack structures to move up to a position assumed by the supplemental racks in the previous cycle, thereby shifting the pins 308 in the slots 307 until they reach the vertical portions thereof, whereupon the springs 311 will oscillate the bell cranks 306 and move the pins 308 into said vertical portions of the slots 307. The camming action between the slots 312 and rod 313 positively rocks the bell cranks 306 upon the movement of said bell cranks to the left (Figs. 16 and 17), which is caused by engagement of slots 305 with the pins 304, thus if the springs 311 becomes sluggish the bell cranks 306 are always rocked to insure the correct operation of the transfer mechanism at the proper times. This unlocks the bell cranks 306 from the rod 313 and the supplemental racks 302 then move with the main rack structure.

The resetting of the supplemental racks which have not carried takes place, therefore, at the beginning of the succeeding cycle. For this reason it is necessary that all racks, during every cycle of operation, have a movement sufficient to bring the supplemental racks into contact with the main racks; otherwise, carrying in the succeeding cycle would not be provided for. In order to accomplish this, all racks, including those which are not to make entries upon the totalizers, move a sufficient distance to effect the resetting of the supplemental racks. As a matter of fact, the construction of the differentials and the record control is such that all rack structures will have at least one step of movement for each cycle of operation. Those racks which are to make entries upon the selected totalizers are set differentially, as determined by the amount of the data, but those which are to make no entries have only the one step of movement necessary to restore to actuating positions the supplemental racks 302.

Rack aliner

In order to definitely aline and place the adding racks, a special aliner is provided which comes into action once during each cycle of operation immediately after all the racks have returned to the home positions. A shaft 340 (Fig. 16) runs across the machine on the side opposite the rack-adjusting devices. To this shaft are fastened hooks 341, one for each rack, which are adapted to engage pins 339 secured to the racks. When the racks are in their home positions the hooks are oscillated to engage the pins and positively adjust and aline the racks. The shaft and attached hooks are actuated by means of a link 342 pivoted to one of the hooks at 343. The link is shifted by a lever 344 pivoted on one of the shafts of the machine, to be later described. This lever 344 is controlled by a cam 345 having a race 346 which engages a cam roller 347 carried by said lever. The cam is so cut as to effect a latching movement of the hooks immediately after the racks have all resumed their home positions, and to release all hooks just before the racks are reset for the next cycle of the machine.

Analyzing mechanism in general

The analyzer, which interprets the record, and selects and determines the extent of movement of the several elements will now be described. This, as viewed in Figs. 7A, 7B and 8, appears at the right hand end of the machine.

Adjacent the analyzer is the perforated record and the means for feeding the same through the machine. Certain recording devices, shown both in the form of a perforating machine and of a printing machine, are arranged here. These recording devices do not function while the machine is analyzing a previously prepared record, but operate to produce a record of the data contained in the machine when the same is being cleared. Since these devices operate only when the machine is producing a record of its data, they will not now be described, but will be considered when the machine is considered from its second aspect.

The paper carriage

The detail record is designated by the character 400 (Figs. 41 and 43). The carriage, which supports the reels, feed roll, etc., is made to be easily removable from the machine. The carriage used in this machine is identical in construction, and is operated in identically the same manner as that shown and fully described in the above mentioned Goldberg Patent No. 1,694,009. Therefore, it is not thought necessary to go into a minute description of the carriage here, as reference may be had to said patent for that description.

It consists generally of three castings; (Figs. 41, 42 and 43) a front piece 401; an end section 402 which has cast with it cross bars 403 and 404; and another end section 405, likewise having cross bars 406 and 407 formed therewith. All of the bars 403, 404, 406 and 407 have enlarged ends by which the sections 402 and 405 are secured to the front piece 401, the parts being secured together by means of screws 409. These three castings together form a rigid framework with an open rear portion so that it may be inserted into the machine without being obstructed by certain of the operative parts.

The carriage has rollers 410 which run on tracks 411 rigidly secured to the framework of the machine. The casing 8 of the machine has a door 412 (Fig. 42) carrying on its inner face two other rails 413. These are hinged by rule joints to supports 415 secured to the machine in such a position that the rails 413 will form continuations of the tracks 411 whenever the door is lowered. The rule joints limit the downward movement of the door so that the same forms a table, upon the rails of which the carriage may be withdrawn.

To lock the carriage in place, a latch 417 (Figs. 41 and 42) is secured to a shaft 418 mounted in the frame. This has a thumb piece 419 by which it may be adjusted, and a latching finger 420 which passes down over the edge of the carriage. As an additional securing means the shaft 418 has attached thereto another arm 421 (Figs. 8 and 41) which engages a pin 422 on the inside of the plate 401. When the carriage has been adjusted, the latch is inserted so as to engage the carriage at both places. To remove the carriage it is only necessary to raise the latch, thereby disengaging the latching finger 420 and arm 421 whereupon the carriage may be at once withdrawn.

Two mandrels are provided (Fig. 41); one, 423 comes to the machine with a record already wound thereon the other, 424 receives the material as it passes through the machine. A guide drum 425 and a feed drum 426 guide and feed the record step by step as the same is analyzed. Both drums are provided with driving pins 427 which engage perforations in the edges of the records. One end of the driving roll has twice as many pins as the other, and the record has on one edge twice as many holes as on the other. This is to enforce the proper placing of the record in the machine, since it must be so arranged as to make the perforations coincide with the pins on the drums. The pins on the guide drum 425 are also spaced on one end, twice as far apart as on the other, for the same reason that the pins are so spaced on the driving drum. A spring-pressed latch 436 holds the supply mandrel 423 from lateral displacement and a spring-pressed latch 452 holds the receiving mandrel from lateral displacement.

The guide drum 425 and feed drum 426 are so located that their upper peripheries are in horizontal alinement with the table of the analyzer, which causes the record 400 to move in a horizontal line from one to the other past the analyzer.

The feed drum 426 is positively driven by means of a driving head 470 (Fig. 43) carrying two pins 471 which engage the driving mechanism at all times when the carriage is in place. The driving head 470 carries a gear 473 (Fig. 41) having pins 476 which engage holes in the drum 426 and serve as the driving connection between the gear and the drum. Meshing with the gear 473 is a gear 481 fast to a gear 482, which in turn meshes with a gear 483 having secured thereto a gear 484 which meshes with a gear 485. The gear 485 frictionally drives the receiving mandrel 424 in a manner fully illustrated and described in the above mentioned Goldberg patent No. 1,694,009.

As the feed drum 426 is driven it will, through the train of gears just described, drive the receiving mandrel 424 to wind the record strip thereon.

Power is communicated to the mechanism from the main shaft 10 by means of a train of gears. Mounted upon the frame 6 is a stud upon which is loosely mounted a Geneva stop wheel 486 (Fig. 44) having a center 487 and a series of equally spaced holes 488 in the face thereof. As the carriage with its record is put in the machine the center 487 enters a recess 472 in the driving head 470 and the pins 471 enter the holes 488. This centers the driving drum and also positively engages the same with the Geneva wheel. The wheel 486 is actuated by a Geneva lock and pin 489 so that it is moved one step for each rotation of said lock and pin. The lock and pin in turn are secured to a gear 490 which meshes with and is driven by a gear 491 loosely mounted on a shaft 492. This gear meshes with and is driven by a gear 493 fast upon the drive shaft 10. It is necessary that this driving mechanism operate during all phases of operation of the machine; for whether the machine be analyzing a previously prepared record or is being cleared, and therefore preparing a record of its own data, record material, in one case already perforated and in the other to be perforated, must be fed through the machine.

When the carriage is in position and the machine is in operation, the paper will be fed a definite distance, the distance necessary to represent one transaction for each cycle of the machine. The movement will be step by step so as to present just so much of the record as represents one transaction for each operation of the analyzer. The gearing is so proportioned that the Geneva stop wheel which drives the feed drum is given a definite and positive motion once for each cycle, the motion being just that required to move so much of the strip as represents one transaction.

Analyzer

The means for analyzing the data upon the detail record or the summary record will now be described. As above stated, the machine is designed to audit data from both of these records; the detail record which comes from the cash register or other perforating machine, and which is illustrated in Fig. 1; and the summary record or a grand summary record (Fig. 2) produced by the machine itself during total-taking operations. These records are substantially identical as to their physical construction, except that when analyzing from the detail record it is possible to select a plurality of groups of totalizers and then one totalizer from each of the selected groups, whereas when analyzing a summary record or grand summary record of the type produced by this machine, only one group of totalizers is selected and one totalizer from that group for each cycle of operation. This is the only difference between the analyzing of the summary records and the detail record.

The analyzer proper is designated generally by the character 500 (Figs. 43 and 44). It consists of two horizontally arranged plates 501 and 502 sufficiently long to extend across the widest record that the machine is intended to use. These plates are connected at their ends by angular extensions 503 and 504 to which the actuating parts are secured. Contacts 505 are carried directly by the plates 501 and 502. In order that they may be properly insulated, bars 506 of insulating material are interposed between the plates and the contacts and also between the upper and lower groups of contacts. The insulating strips bearing the contacts are fastened in place by screws 507. These contacts are arranged in groups of four, running lengthwise of the record, and there are twenty of these groups mounted upon the analyzer frame.

Each group of four contacts is arranged to make electrical connection with stationary contacts 508 arranged in the path of movement of the movable contacts 505 and immediately below the record to be analyzed. These contacts are in the form of elongated plates of a length sufficient to cover the space covered by each group of four movable contacts. They are rigidly secured in insulating material 509, supported by a frame 510, and each contact has a lateral extension by means of which electrical connections with the other parts of the machine are secured.

The positions of the contacts 505 are indicated by the numerals I, II, III and IV and correspond exactly with the positions so indicated on the detail record and the summary record.

The movable analyzer is raised and lowered once for each cycle of the machine. It is mounted upon four parallel arms. Two of these, 511 and 512, are shown in Fig. 44; the former is pivoted to the analyzer frame at 513 and the latter at 514. The arm 511 is rigidly secured to shaft 515, while arm 512 is loosely mounted upon shaft 516. Similar parallel arms are secured to the analyzer frame at the other end, but only one of these arms, 517, (Fig. 8) is shown; the other is immediately beneath this one. This arm 517 is loosely mounted upon the shaft 516 and carries a pin 518 engaging the analyzer frame. The arm below arm 517 is secured to the shaft 515 in the same manner as the arm 511 is secured to said shaft, and it too is connected to the analyzer frame. By means of these parallel arms the analyzer is forced to maintain a horizontal position and the movable contacts will all co-act with the stationary contacts immediately below them. The analyzer is operated by a lever 519 (Fig. 44) fast to the shaft 515, and this is actuated by another lever 520 having a pin and slot connection 522 therewith; and this last mentioned lever is pivoted at 521 and carries at its lower end a cam roller 523 (Fig. 35) engaging a cam slot in one face of the gear 524, mounted for free rotation upon the stud 24.

The gear 524 is driven indirectly from the main shaft 10. Since the analyzer does not function when the machine is being cleared (that is, producing a record of its own data), means must be provided for throwing this driving mechanism out of action during clearing operations. This mechanism is shown in Fig. 44 and will be described when the other parts of the changing mechanism are described. A special set of contacts 526 (Fig. 42) is shown near the middle of the analyzer frame. There are only two of these contacts. These are control contacts and are not attached to the analyzer frame, but are specially supported and connected and have independent operating mechanism. They function in connection with column C of the detail record and the summary record and will be described in detail when the various controls are considered.

Electrical features

The principal parts of the mechanism which function during auditing operations have been described. It remains, now, to consider the electrical elements and features by means of which the various parts are controlled. These are best shown in Figs. 49A, 49B, 49C and 49D, where the circuits and other electrical elements for the machine are as a whole delineated in diagrammatic form.

The parts with which we are now particularly concerned are the contact banks and control magnets for the totalizer group differentials; the contact banks and control magnets for the rack actuator differentials; and the analyzing contacts and circuits by which the selection of the totalizers is effected and the movement of the actuator racks is governed. The parts here shown (Figs. 49A, 49B, 49C and 49D) which have already been described bear the same reference characters as in the other drawings, but it will be convenient to refer to groups of devices in a manner not before necessary, and certain special characters have therefore been added. Thus, the totalizer group contact banks and the control magnets with their connections, considered as a whole, have been designated by the characters G—0 to G—9, inclusive; and the rack actuator contact banks and control magnets with their connections, considered as a whole, have been designated by the characters A—0 to A—9 inclusive. In order to distinguish the analyzer contact banks 505 from each other they have been designated individually by the Roman characters I, II, III, IV, which correspond to the positions so designated on the detail record and the summary record. Particular attention is also directed to three switches; one, M—S (Figs. 7B, 21, 49A and 49B), which is a master switch for the totalizer selecting circuits; another, G—S (Figs. 23, 28 and 49A), which is a master switch for the totalizer group magnets; and a third switch A—S (Figs. 10, 18, 29 and 49A), which is a master switch for the rack actuator magnets. Each of these switches is closed for a certain period during each cycle of operation, and all of them are operated in timed relation to the other parts of the machine.

Selecting circuits

Figure 3:
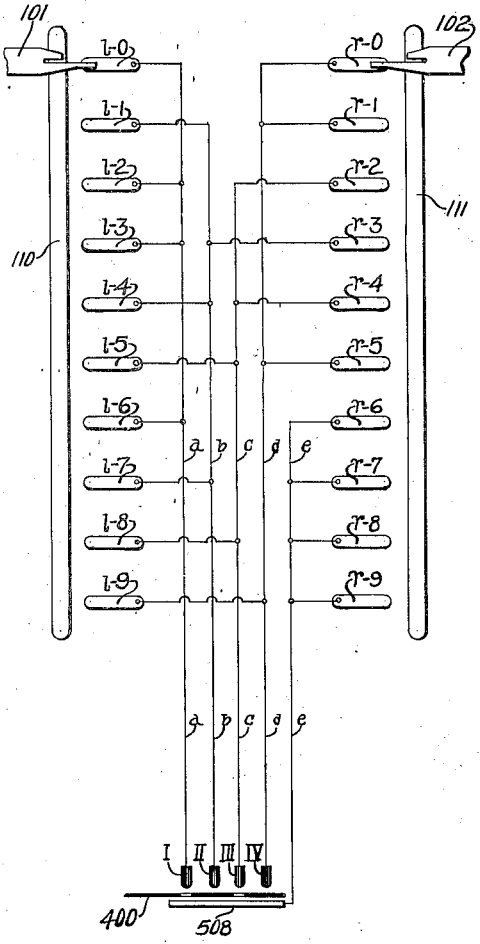
Fig. 3 is a diagrammatic view of the analyzing contacts, the grouping or bank contacts, and the connecting circuits.

As before stated, and as shown in Fig. 4, it is possible to select any of the ten digits by the use of any four perforations. The manner in which the circuits and contacts are combined is shown in Figs. 3, and 49A, 49B, 49C and 49D. The system requires a group of five conductors for each set of contacts, one for each of the four movable contacts and one for the stationary contact. These have been designated by the characters $a$, $b$, $c$, $d$, and $e$. Fig. 3 is a diagrammatic view of the circuits, the control contacts and the bank contacts, and shows how the record controls the selection of the circuits. The contact I of any selected group of four contacts is connected to four contacts of its co-operating bank; namely, to $l$—0, $l$—2, $l$—3 and $l$—6; the contact II is connected to contact banks $l$—1, $r$—3, $l$—4, $l$—7; contact III is connected to $r$—2, $r$—4, $l$—5, $l$—8; contact IV is connected to $r$—0, $r$—1, $r$—5, $l$—9; and a contact plate 508 is connected to r—6, r—7, r—8 and r—9. These parts in the relations they bear to other parts of the machine are more fully illustrated in Figs. 49A, 49B, 49C and 49D.

Totalizer group circuits

In order to explain the electrical features of the invention, the transaction recorded at the top of the detail record will be referred to. As before explained, the interpretation is that twelve fixtures were sold for $15.00, that clerk A filled the order, and that they were sent to the State of Missouri, collect on delivery.

It will be assumed that the analyzer has been depressed; that the movable contacts 505 (Figs. 43 and 44) have passed through the perforations and are resting on the contacts 508; and that the movable contacts 101 and 102 are starting over the contact banks of both the totalizer group contact banks (Figs. 22 and 24) and the rack contact banks (Figs. 16, 17 and 18).

The circuits controlled by the classification perforations will be considered first, for the totalizers upon which the entry is to be made must be selected before the data can be entered. As before stated, the totalizer shafts are to be regarded as being numbered from 0 to 9, and the totalizers on the respective shafts also as numbered from 0 to 9.

The control columns have been marked with the characters G—0 to G—9 (Fig. 1), identical with the characters used on the totalizer group control sets with which they coact. Each group of totalizers is controlled therefore by the column which bears the reference character corresponding to that group; and the perforations in any given transaction determine the totalizers of the groups which are to be selected.

The master switch M—S, so far as the group totalizer circuits is concerned, serves to connect the group sets G—0 to G—9 inclusive, with the positive and negative sides of the line respectively. The M—S switch is so set during analyzing operations that contacts 539 and 541 are against the contact 540 (Fig. 9), and the contacts 542 and 544 are against the contact 543. By this means current passes from the positive line of the generator (Fig. 49A), through G—S switch (now closed) to point 535 (Fig. 49B), then through conductor 536 to a contact 544, and by means of contact plate 543 and contacts 542 to conductors 1100, 1101, 1102, 1103, 1104, 1105, 1106, 1107, 1108 and 1109, as the group sets with which these are respectively connected are selected, to the magnets 84, as will be later described. Likewise current passes from magnets 84 of such group sets as have been selected, through conductors 1120, 1121, 1122, 1123, 1124, 1125, 1126, 1127, 1128 and 1129, to contacts 541, contact plate 540, contact 539, conductor 545, to point 546 on the negative line. The positive line is indicated by plus (+), and the negative line by minus (—).

Considering now the transaction at the top of Fig. 1, the circuits occurring during the analysis of this transaction will be traced. Beginning at the right hand side of the sheet, it will be noticed that there are no perforations in columns G—0 and G—1; accordingly no circuits will be completed for the control magnets of these groups and these differentials will go to their extreme positions and the totalizers on all these groups will move to their several blank positions. Considering the column G—2, which is the first column having perforations therein, it will be noticed that perforations appear in the I and III positions, which, according to the diagram (Fig. 4) represents "2". Therefore totalizer number two of group G—2 will be selected. Since this column controls the magnet 84 of the totalizer selecting group G—2, a circuit will be completed through the magnet of that group when the movable contacts reach the position controlled by the perforations and the totalizer selected will be known as totalizer 121 of group G—2, and in this particular case designated "Fix.", which means "fixtures".

The circuit for this group will be from the positive side of the generator (Fig. 49A), through the master switch G—S, to point 535 (Fig. 49B), through conductor 536, to contact 544, which at this time engages the contact plate 543 of M—S switch, through contact 542 for conductor 1102, through this conductor to point 530 for group G—2, to the line contact 110 for this group, through movable contact 101, to fixed contact l—2 of this bank, through conductor a (Figs. 49B, 49D, 49C), to analyzing contact I, to the contact plate 508, to contact III, through conductor c (Fig. 49C, 49D, 49B), to fixed contact r—2, to movable contact 102, line contact 111, through magnet 84 for this group, through conductor 1122, to contact 541 for this conductor, to fixed contact 540 (Fig. 9) on the drum of M—S switch, to contact 539, through conductor 545 to point 546 on the negative side of the line.

Column G—3 shows perforations in the II and IV positions. Two perforations thus placed indicate 1, which means that totalizer number one of this group, which has been set aside for clerks, and in this case designated as "A", will be selected. The circuit will be as follows: From the positive side of the generator (Fig. 49A), through switch G—S (now closed) to point 535 (Fig. 49B), conductor 536, contact 544, contact plate 543, contact 542 for conductor 1103, to point 530 for group G—3 (Fig. 49B), through line contact 110, movable contact 101, fixed contact l—1, conductor b for this group (Figs. 49B, 49D, 49C), to analyzing contact II, plate 508, analyzing contact IV, conductor d (Figs. 49C, 49D, 49B), to contact r—1, movable contact 102, line contact 111, through magnet 84 for this group, through conductor 1123 (Fig. 49B), to contact 541 for this conductor, contact plate 540 (Fig. 9), contact 539, conductor 545, to point 546 on the negative line.

The next column, G—4, contains perforations in the III and IV positions, which indicate 5. This means that totalizer number five in group G—4, which in this case has been set aside for the transactions, and in this particular instance represents the "C. O. D." totalizer, will be selected. The circuit controlled by these perforations is as follows: From the positive side of the generator (Fig. 49A), through switch G—S (now closed), to point 535 (Fig. 49B), conductor 536, contact 544, contact plate 543, contact 542 for conductor 1104, through this conductor to point 530 (Fig. 49D) for group G—4, line contact 110, movable contact 101, fixed contact l—5, through conductor c (Figs. 49D, 49C), analyzer contact III, plate 508, analyzer IV, conductor d (Figs. 49C, 49D), to fixed contact r—5, movable contact 102, line contact 111, magnet 84, conductor 1124 (Figs. 49D, 49B), to contact 541 for this conductor, contact plate 540 (Fig. 9), contact 539, conductor 545, to point 546 on the negative side of the line.

Columns G—5, G—6, G—7, G—8 and G—9 have been set aside to take care of the various states to which the goods are sent. Therefore, we have perforations in only one of these columns for any one transaction, and in the transaction being analyzed these perforations appear in the column G—7, and lie in the III and IV positions, which means that totalizer number five of this group, and designated "Mo." (Missouri) will be selected, and that no totalizers in groups G—5, G—6, G—8 and G—9 will be selected. The circuit for totalizer number 5 in column G—7 is as follows: From the positive side of the generator (Fig. 49A), through switch G—S (now closed), to point 535 (Fig. 49B), conductor 536, contact 544, contact plate 543 on M—S switch, contact 542 for conductor 1107, through this conductor (Figs. 49B, 49D), to point 530 for group G—7, through line contact 110, movable contact 101, fixed contact l—5, conductor c (Figs. 49D, 49C), analyzer contact III, plate 508, analyzer contact IV, conductor d (Figs. 49C, 49D), to fixed contact r—5, movable contact 102, line contact 111, magnet 84 for this group, conductor 1127 (Figs. 49D, 49B), to contact 541 for this conductor, contact plate 540 (Fig. 9) on M—S switch, contact 539, conductor 545, to point 546 on the negative side of the line.

This means that four totalizers, namely; totalizer number two of group 2, totalizer number one of group 3, totalizer number five of group 4, and totalizer number five of group 7 will be selected to have entered thereon the data represented by the amount perforations on the amount side of the control sheet. This data will be entered upon all four of these totalizers. In other words, the amount which, in this case is $15.00, as represented by the printing of this transaction on Fig. 1, will be added in the totalizer set aside for the State of Missouri, the transaction "C. O. D." totalizer, the clerk A's totalizer, and the totalizer designating the class of goods, which in this case is fixtures.

*Amount circuits*

The perforations in the ten columns on the left hand side of the sheet will now be considered. These columns have been designated A—0 to A—9 inclusive, identical with the rack actuator control sets with which they coact and which have been designated A—0 to A—9 in Figs. 49C and 49D.

In column A—0 perforations occur in the I and IV positions, which indicate "0". This circuit will be as follows: From the positive side of the generator (Fig. 49A), through switch A—S (now closed), conductor 1130 (Figs. 49A, 49B, 49C), to point 1131 for group A—0, line contact 110, movable contact 101, fixed contact l—0, conductor a for this group (Figs. 49D, 49C), analyzer contact I, plate 508, analyzer contact IV, conductor d (Figs. 49C, 49D), fixed contact r—0, removable contact 102, line contact 111, magnet 84 for this group, to point 1132 on the line 1133 which leads to the negative side of the generator (Fig. 49A).

In column A—1, perforations also appear in the I and IV positions, which indicate the amount "0". The circuit for this will be the same as for that described in connection with set A—0, except that in place of going through set A—0 the circuit will go through the fixed and movable contacts of set A—1.

In column A—2, perforations appear in the III and IV positions, which represent the amount "5". This circuit will be as follows: From the positive side of the generator (Fig. 49A), through switch A—S (now closed), conductor 1130 (Figs. 49A, 49B, 49D), to point 1131 for group A—2, line contact 110, movable contact 101, fixed contact l—5, conductor c (Figs. 49D, 49C), analyzer contact III, plate 508, analyzer contact IV, conductor d (Figs. 49C, 49D), to fixed contact r—5, removable contact 102, line contact 111, magnet 84 for this group, to point 1132 on the negative line 1133.

In the next column A—3, perforations appear in the II and IV positions, which indicate the amount "1". The circuit completed by these perforations is as follows: from the positive side of the generator (Fig. 49A), through switch A—S (now closed), conductor 1130 (Figs. 49A, 49B, 49D), to point 1131 for group A—3, line contact 110, movable contact 101, fixed contact *l*—1, conductor *b* (Figs. 49D, 49C), analyzer contact II, contact plate 508, analyzer contact IV, conductor *d* (Figs. 49C, 49D), to fixed contact *r*—1, movable contact 102, line contact 111, magnet 84 for this group, to point 1132 on the negative line 1133.

In columns A—4, A—5 and A—6, perforation appear in the I and IV positions, all of which indicate "0". The circuits completed by these perforations are like those described in connection with set A—0 except that the circuits will go through the sets A—4, A—5, A—6, respectively (Fig. 49C) instead of through set A—0.

In column A—7, perforations appear in the I and III positions, which represent "2". The circuit for this group is as follows: From the positive side of the generator, through switch A—S (now closed), conductor 1130 (Figs. 49A, 49B, 49D, 49C), to point 1131 for the differential set A—7, line contact 110, movable contact 101, fixed contact *l*—2, conductor *a*, analyzer contact I, plate 508, analyzer contact III, conductor *c*, fixed contact *r*—2, movable contact 102, line contact 111, magnet 84 for this group, to point 1132 on the negative line 1133.

In column A—8, perforations appear in the II and IV positions, which indicate "1". The circuit for this column will be like that described for column A—3 except that it will go through the differential set A—8 (Fig. 49C) instead of differential set A—3 (Fig. 49D).

In column A—9, perforations appear in the I and IV positions, which indicate "0". The circuit for this column is the same as that described in connection with column A—0 except that it will be completed through the differential set A—9 (Fig. 49C) instead of the differential set A—0 (Fig. 49D).

Locking circuits

The magnets 84 which are used to stop the differentials are all here provided with supplemental or locking circuits. Adjacent each magnet is a switch 580 (Figs. 16, 17, 18, 21, 22, 24, 49B, 49C, 49D), which is normally open, but the contacts of which are adapted to be closed by an arm 581 integral with the armature 83 of the magnet 84, when the latter is energized. This circuit for the totalizer group magnets is from point 530 (Figs. 49B and 49D) on the positive side of the line, through conductor 582, switch 580, conductor 583, to point 584, through the magnet 84, to the negative side of the line, as for the original circuit. The negative line 545 (Fig. 49B) for the locking circuits of magnets 84 of the actuators of the group switches G—0 to G—9, is reached through the lines 1100, 1101, 1102, 1103, 1104, 1105, 1106, 1107, 1108, 1109 (Figs. 49B and 49D) respectively, contacts 541, contact plate 540 (Fig. 9) on M—S switch, and the contact 539 (Fig. 49B). This circuit for the magnets 84 associated with the differential sets A—0 to A—9 (Figs. 49C and 49D) is from the point 1131 on the positive line 1130, through conductor 582, switch 580, conductor 583 to point 584, then through the magnet 84 to point 1132 on the negative line 1133, as for the original circuit. As soon as the magnet is energized the armature is drawn up, this supplemental circuit is closed and the current will then pass through this path. The magnet will therefore be held in position, whatever may take place in the circuit which originally energized it.

These holding or locking circuits for the totalizer shaft magnets are controlled by the master switch G—S, (Fig. 49A) and the circuits for the actuator or differential magnets are controlled by the master switch A—S (Fig. 49A).

Special record controls

As heretofore stated, a space equal to the width of two columns of perforations lies between the ten classification or totalizer controlling columns and the ten amount or actuator controlling columns of the detail record. One of these special columns of perforations is designated "C" and has perforations therein, while the other space has no perforations, and is designated "D".

Special contacts 526 (Fig. 42), hereinbefore referred to, cooperate with the perforations in column C. These are electrically connected together and cooperate with a fixed contact 548 (Fig. 49A).

The contacts 526 are supported by a post 550 (Fig. 43) arranged in the central part of the analyzer and mounted to be moved independently of the analyzer and in a substantially vertical path by means of parallel arms 551 and 552. Arm 551 is pivoted on the shaft 516, and arm 552 is pivoted on the shaft 515. Integral with the arm 551 is another arm 553 having a surface 554 adapted to be engaged by a pin under the control of the starting key, yet to be described. The contacts are raised by means of a yoke 555 (Fig. 8) pivoted upon the shaft 516 and having extending therefrom an arm 557. Co-acting with the arm 557 is another arm 558 (Fig. 44) secured to the shaft 418, which is actuated by the manual latch 417 that holds the carriage in position. The arm 558 has a pin 559 which engages under the face of the arm 557. A spring 560 is secured at one end to a pin 561 on a projection on the arm 557 and at the other end to a pin 562 secured in the frame 6. The yoke 555 has at its other end an integral arm 563 (Fig. 43) which engages a pin 564 on the arm 553. Another lever 565 adapted to be actuated by a starting key 1000, to be hereinafter described, is fast upon the shaft 516 and carries a pin 566 which engages with the face 554 of the arm 553. A spring 567 stretched between the arm 553 and a pin on the frame 6 keeps the contacts 526 in contact with the record.

The contacts 526 are therefore under the control of two devices; the latch, which secures the carriage in position, and the starting key 1000. The purpose of the latch control is to prevent the starting of the machine unless the carriage with the proper record is place; and the object of the key control is to raise the contacts and keep them permanently out of operative relation so long as the control key is in its lower or operating position. Manipulation of the latch 417 from the position shown in Fig. 41 to unlock the carriage, oscillates the lever 558, which, through the stud 559, will raise the lever 557, oscillate the yoke 555 and depress the arm 563, which engages the pin 564, thereby depressing the lever 553 and raising the contacts 526.

This contact arrangement normally controls the circuit through a magnet which prevents the depression of the starting key until after the magnet has been energized. As soon as the carriage with a properly perforated sheet is placed in the machine, a lowering of the latch to position the carriage also lowers the arm 558, which permits the spring 560 to oscillate the yoke 555, thus allowing the lever 553 and its pin 564 to rise under the action of the spring 567, thereby lowering the contacts 526 into their operative positions. If a properly perforated strip is in place, the magnet circuit, to be hereinafter described, will then be completed, and it will be possible to depress the starting key. However, should an improper sheet be placed in the machine, such as a strip of blank paper; or should the detail sheet not be in proper position, no circuit would be made when the contacts are lowered, the control magnet would not be energized and the machine cannot be started. These contacts, therefore, prevent operation of the machine unless the carriage is supplied with a properly perforated record which is properly positioned.

It will be noted that these contacts 526 are more widely separated than are the analyzing contacts. In fact, they are sufficiently far apart to engage a perforation on either side of the perforations which constitute any given transaction. When a strip to be analyzed is placed in the machine it must be so adjusted that the left hand contact (Fig. 43) comes into register with the first control perforation in column C. Until this position is assumed no circuit can be completed through these contacts and the machine cannot be started. As soon, however, as such a hole does come into register with said contact, a circuit will be completed; the control magnet will be energized and it becomes possible to depress the starting key. A depression of the starting key raises the contacts 526 and closes the circuits of the motors. The paper feeding mechanism starts and makes one movement. This brings the first transaction into position under the analyzer.

The contacts 526 therefore function at this time only as a means for determining whether the perforated record has been properly located preparatory to starting the machine, and in this connection only the left hand contact (Fig. 43) comes into play. Upon pressing the starting key, the frame carrying the contacts is lifted and remains in its elevated position until the record has been completely analyzed. At the end of the operation a control switch, to be hereinafter described, opens the main operating circuits and brings the machine to a stop. When this takes place the starting key rises automatically and the frame carrying the contacts 526 will fall. After the last transaction of the record has been analyzed, the feeding mechanism will be given one additional step before the driving mechanism stops. The analyzer then comes down upon the unperforated sheet, but no circuits are closed and the actuating racks run to their extreme positions and the circuit of the machine is automatically broken in a manner to be hereinafter described. At this time the last hole in the column of control perforations C will be in such a position that when the special contacts 526 fall, due to the lifting of the starting key, the right hand contact 526 (Fig. 43) will register with the last perforation in the control column.

Should the machine now be used to analyze another detail record the operator would proceed normally just as in the case just described, that is, he would insert another record, position it in proper relation to the left hand contact 526 and press the starting key 1000. If, however, he should desire to clear the machine and produce a summary record and adjust the machine for this purpose, and inadvertently leave the detail record in position, he would be unable to start the machine because the circuit closed through this contact 526 would prevent the depression of the starting key because of the circuit established through another magnet to be hereinafter referred to. In this manner, these elements serve to control the machine so as to compel the insertion of the proper record.

The summary record also is provided with a column of control perforations C, identical in location and function with the control perforations C of the detail record.

Rupture controls

There is another set of control contacts, for preventing the starting of the machine without a record, or to effect the stopping of the machine should the record be ruptured. These are shown as insulated roller contacts 568 and 569 (Fig. 43). They are normally separated from each other by the record itself, but should the operator fail to insert a record, or should a record break, the contacts will close a circuit which will prevent the starting of the machine if the record is not in place or which will stop the machine in case of rupture of the record. The lower roller 569 is mounted in a bracket on the frame of the machine; the upper roller 568 is mounted in a movable frame 570 pivoted to a fixed support 571. A link 572 connects the support 570 with a pin on the extension of arm 557 and is therefore under the control of the spring 560. As the latch 417 which locks the carriage is raised, thereby raising the arm 557, the link 572 is moved toward the left in the direction of its length, and raises the roller 568. As the latch 417 is lowered, the frame 570 and roller 568 are likewise lowered and are held in contact with the paper by the spring 560. Brushes 573 and 574 (Fig. 49A) conduct current to the rupture rollers.

Therefore, by these connections, the contact roller 568 is controlled directly by the carriage lock, being raised when the latch is raised to remove the carriage and lowered when the latch is lowered to fasten the carriage in place.

Blank column

The blank column D of the detail record has no function in this machine, as it has in the machine described in Goldberg patent No. 1,694,009, due to the fact that the mechanism which analyzes the detail record in the machine herein is also capable of analyzing the summary record which is produced by this machine. The summary and grand summary records which are produced by this machine also have the blank column D, but this column in these records, as in the detail record, has no function in this machine. Therefore, no further mention of this column is necessary.

Operation

When analyzing either a detail record or a summary record, the operating parts are presumed to be in the positions shown in the drawings. The operator having locked the carriage, manually adjusts the record so as to bring the first perforation in the control column C in position beneath the left hand contact 526 (Fig. 43). Having made this adjustment the starting key is depressed, thereby supplying current to the machine.

After the machine starts, the analyzer will be depressed and contacts made as permitted by the perforations in the record. After the analyzer has reached its low position, the movable contacts 101 and 102 begin to shift over the fixed contacts of the several contact banks; the shafts carrying the groups of totalizers and the beam actuators and aliners cooperating therewith begin to move and the racks which actuate the totalizers begin their adjustment.

As soon as the contacts 101 and 102 of any differentials reach fixed contacts which are in electrical connection with analyzer contacts which have passed through perforations, the magnets 84 of such differentials are immediately energized and the differentials are brought to a stop. This may happen anywhere throughout the whole extent of movement of the differentials and the positioning of the totalizer shafts and of the actuating racks, is determined by the extent of the excursion of the differentials which control these elements. The differentials of those totalizer groups which are not stopped by control perforations continue to the end of their possible movements and bring the totalizers of those groups to the blank positions.

The amount actuating racks are always stopped by control perforations. If no amounts are to be added, they are stopped by 0 perforations, except at the end of the analysis, when, there being no perforations, the racks run to their extreme positions and break the circuit, thus stopping the machine, is will be described later. After the totalizers are selected and the amount racks are positioned, the totalizers and aliners therefor are moved into engagement with the racks and the aliners are withdrawn. The racks then return, beginning with the units rack, and the others following at short intervals so as to allow the carrying operations to take place and the amounts are entered on the totalizers; the alining devices are again engaged; and the totalizers are withdrawn. During the last stages of entering the amounts of the first transaction the record has been again fed forward to present the next transaction, and the analyzer has been depressed, the movements of the various parts of the machine thus overlapping to some extent.

Totalizing or Summary Record Producing Machine

The machine will now be described as adapted to produce a record which will be a summary of the data which has been accumulated on the totalizers, and the totalizers will at the same time be returned to zero. When thus operating, certain parts which function during the adding operation must be disconnected, and the parts which function only during the operation now to be described must be connected.

Thus, the analyzer which interprets the record during the adding operation has no function to perform when the machine is being cleared and a summary record being produced. However, the record producing elements, namely, the punching and printing mechanisms, the mechanisms for setting and alining the printing devices, and the mechanism which cooperates with the resetting control strip, so that the totalizers may be selected for clearing in any desired order, as determined by this prepared control strip, must be brought into operation at this time, and, further, certain of the other parts of the machine must be changed as to their time of operation.

While adding, the totalizers and actuators are moved so that their racks are set differentially before the totalizers are engaged therewith, after which the racks are brought to their home positions; while in totalizing, it is necessary to adjust and definitely locate the totalizers before the racks begin to make their movements, because the extent to which the individual racks are moved is determined by the several denominational elements of the totalizers with respect to zero.

*Changing mechanism*

In order to effect all of these changes, the machine is provided with a manually operated shaft to which the elements that effect the changes are secured, or from which they derive their movement, so that by the manipulation of this shaft alone all of the necessary changes can be made. After these changes have been made by the operation of this manually operated shaft all that remains for the operator to do is to place in the machine the resetting control strip and secure it in position.

This changing shaft runs through the machine and is designated by the character 600 (Figs. 41 and 42). It has an operating handle 601, rigidly secured thereto by means of which the shaft is shifted through an arc of a fixed number of degrees so that by merely moving the handle in one direction or the other to the required extent the machine is changed from an auditing to a totalizing machine, and vice versa. This lever bears a thumb piece 602 and has cooperating therewith another lever 603 having a thumb piece 604 pivoted to the handle at 605. The other end of the lever 603 is bifurcated and coacts with another lever 606 fast to a sleeve 607 mounted upon the shaft 600. A lever 608 (Figs. 42 and 43), having a lug 609 which cooperates with a notch 614 in a plate 613, fast on the shaft 600, serves to definitely lock the shaft 600 in one of its two operating positions.

When the thumb pieces 602 and 604 are grasped and brought together the lever 603 oscillates the sleeve 607, which in turn shifts a cam 611; and camming notches 612 acting upon the pin 610 withdraw the lug 609 from a locking disk 613 which is fast on the shaft 600 and lies immediately behind the cam 611 secured thereto. The disk 613 being fast on shaft 600 locks the latter so that it cannot be moved until said disk is unlocked.

Co-acting with the cam 611 is another lever 615 carrying a stop lug 616 and a pin 617 identical with the lug 609 and pin 610 of the lever 608. A spring 618 connects levers 608 and 615 so that the pins 610 and 617 always contact with the surface of the cam 611. The pins and lugs on the levers 608 and 615 are so positioned with respect to each other that the lug 609 co-acts with one of the notches 614 and the pin 610 co-acts with one of the camming notches 612, while the lug 616 of the lever 615 co-acts with the other notch 614 in the disk 613, and the pin 617 co-acts with the other notch 612 of the cam 611. Thus, in one condition of the machine, the lug 609 prevents movement, while in the other condition the lug 616 becomes effective for this purpose.

Integral with the lever 608 is an arm carrying a piece of insulating material which co-acts with switches 619 and 620 (Figs. 42, 43, 44 and 49A) to close the same whenever the lever 608 is forced out of its locking position by movement of the cam 611. The other locking lever 615 has a similar arm which likewise carries a piece of insulation and cooperates with switches 621 and 622 and maintains said switches closed when the machine is set for analyzing or adding, as shown in the drawings. The levers 608 and 615 are pivoted at 623, and the switches 619, 620, 621 and 622 are supported by a plate 624 secured to the base 1. The functions of these various switches will be described later when the general controls of the machine are taken up.

The cam 611 has a limited movement with respect to the locking plate 613, and a spring 625 (Fig. 43), connected to a pin 626 on the cam 611 and to another pin 627 on the plate 613, is used to restore the relation of the parts after the thumb piece 604 has been released. The pin 627 projects through a slot 628 in the cam 611 which limits the extent to which the cam may travel.

Shaft 600 carries another plate 629 (Fig. 43) which operates a lever 630 pivoted at 631 (Fig. 44). This lever has a hook 632 which cooperates with a lever 633 which in turn controls the motor clutch. The lever 630 carries a roller 634 which cooperates with a recess 635 in the periphery of the plate 629 whereby motion of the lever 630 is controlled in such a manner as to lock the clutch against possible release except when the machine is in either its adding or its totalizing position. A spring 636 stretched between the lever 630 and a pin on the frame 6 keeps the roller 634 in contact with the plate 629.

The next cam 637 (Fig. 44) on the shaft 600 is used to throw the analyzer into and out of operation. It is to be remembered that the analyzer is to operate only during the analysis of either the detail or the summary record and is to remain idle during the clearing or record producing operation. The cam 637 is fast on the shaft 600 and has formed in one of its faces a race 638 which engages a roller on a lever 639 to actuate it. This lever is pivoted upon the end of the shaft 641 and carries at one end a coupling gear 640. The other arm 642 of the lever carries an alining device 643. Adjacent the shaft 600 is the cam-faced gear 524 (Figs. 34 and 35) which operates the analyzing mechanism. This gear is mounted adjacent the gear 23 of the main driving train and is of the same diametrical pitch.

When the shaft 600 is in the position which it assumes when the machine is adjusted to perform the analyzing operation the gear 640 is so adjusted as to couple together the gears 23 and 524; whereas, when the machine is adjusted for totalizing or for producing a record of its own data the gear 640 is out of mesh and the gear 524 is held against rotation by the alining device 643, so that in the first instance the analyzer cooperates with the other elements of the machine, while in the latter it is disconnected and does not function. A pin 644 (Fig. 44) in the frame 6 acts as an alining device for the gear 640 when the same is out of coupling relation with the gears 23 and 524.

The manually adjustable shaft also effects various other changes in the mechanism when shifting from the analyzing to the totalizing position or vice versa. Just within the frame 3 are located devices for controlling the selection of the totalizers during totalizing operations; means for controlling the printing and punching mechanism; means for controlling the zero stop devices; and means for controlling certain of the switches which affect the several circuits.

To this end, means are provided for connecting all of the various devices mentioned so that they may be driven during the totalizing operation and be disconnected during analyzing operations (Figs. 17, 18, 21 and 29). Power is obtained from the gear 645 (Fig 29) fast on the main shaft 10. This meshes with a broad-faced gear 646 mounted to be moved into and out of engagement with the gear 645. To effect this movement the gear 646 is secured to a short shaft 647 mounted in frames 648 and 649 which are in turn pivoted upon a shaft 650 running through the lower part of the machine. Another frame 651 (Fig. 17) supports the shaft 647 at an intermediate point and is likewise mounted upon the shaft 650. Secured to the shaft 647 are two other gears 652 (Fig. 17) and 653 (Fig. 18). The shaft 647 and frames 648, 649 and 651, thus together form a yoke for supporting and shafting the gears 646, 652 and 653. The frames 648 and 649 have lateral extensions 654 and 655 respectively, which carry cam rollers to engage races in the cams 656 (Fig. 21) and 657 (Fig. 18), fast upon the manually adjustable shaft 600. In addition, the frame 648 has as its other end an alining tooth 658; the frame 649 has an alining tooth 659; and the frame 651 has a like tooth 660 (Fig. 17). These alining devices hold in position, gears which are yet to be described.

As the manual shaft 600 is moved from its analyzing to its totalizing position, the cams 656 and 657 are rotated a definite number of degrees. The races in these cams are so cut that when the machine is changed, the gear 646 is brought into engagement with the gear 645 on the main driving shaft, while when moved in the reverse direction the gear is moved out of mesh to the position shown in Fig. 21.

Adjacent the gear 645 and mounted for free rotation on the shaft 10 is another gear 661 (Figs. 21 and 29), having attached thereto a cam plate. When the gear 646 is in mesh with the gear 645 it also meshes with the gear 661 and therefore serves to couple the gears 645 and 661 together. Power communicated by the gear 645 is thus transmitted to the gear 661. The gear 661 with its cam plate is mounted upon one section of a clutch sleeve 668 (Fig. 29) adapted to rotate upon the shaft 10. Secured to the other end of the clutch sleeve 668 is a gear 669 (Figs. 29 and 39) provided with a cam 670 by means of which motion is communicated to certain of the record-producing elements, as will be hereinafter described.

The cam 681 (Fig. 21), which is in the gear 661, is used to communicate motion to alining devices which hold elements to be later described in detail.

Meshing with a gear 682 loose upon the shaft 10, is a gear 675 (Figs. 17, 21 and 29), loosely mounted upon the shaft 650. Rigidly secured to the gear 675 is a bevel gear 676 which meshes with another bevel gear 677 that drives the mechanism to be hereinafter described, for selecting the totalizers during totalizing operations. The gear 682 is operated only during totalizing operations by means of the connection through the gear 652 when the latter is in totalizing position, therefore the bevel gears 676 and 677 will not be operated during analyzing operations.

To actuate the so-called zero stop mechanism the gear 682 (Figs. 15 and 17) has a cam race 684 which communicates motion to a pitman 685 by means of a cam roller 686. The pitman 685 is slotted to pass over the shaft 10 so as to be guided thereby, and is connected to a lever 687 (Fig. 17) secured to the shaft 641 from which the zero stop mechanism derives its motion.

Loosely mounted upon the shaft 10 is another gear 694 (Figs. 18 and 29) which meshes with the gear 653 when the latter is in totalizing position. This gear 694 has a cam race 695 by means of which motion is communicated to a shaft 696, mounted in the frames 2 and 3. Secured to this shaft near each end is an arm 697 (Figs. 17 and 22) which carries a bail 698 having sheets of insulation 699 to which electrical contacts 700 are secured. There is one pair of these contacts for each zero stop mechanism, the functions of which will be hereinafter described. When the machine is operated as an adding machine these contacts do not function, and it is therefore necessary to displace the entire set. To this end, means is provided for oscillating the shaft 696 and the bail 698 which carries the contacts 700. In order that the contacts may be maintained in proper alinement, the arms 697 carry at their outer ends a bar 701 which bears upon insulation 702 at the end of each of the lower contacts 700.

As motion is communicated to the gear 694 by means of the gear 653, a pitman 706 (Fig. 18) is caused to advance and recede, and by means of an arm 703 secured to the shaft 696 and a lever 704, loose on shaft 641, oscillates the shaft 696 so as to shift the entire group of contacts once for each cycle of operation of the machine. Loosely mounted on the shaft 696 is a series of arms 707, each provided with an insulated head 708 by means of which the electrical circuits are completed at a certain stage in the cycle of operation.

An alining pin 709, by its engagement with the gear 646, holds the gears 646, 652 and 653 in position when out of engagement with their co-acting gears 645, 682 and 694 respectively. At the same time, the alining teeth 658, 659, and 660 engage and hold the gears 661, 682 and 694 against displacement.

The means for varying the timing relation between the totalizers and the actuating racks is placed at the other end of the machine. These changes also are effected by a partial rotation of the shaft 600. The change in the mechanism for raising and lowering the totalizers and their alining devices is brought about by changing the positions of the cams which actuate these devices. The lever 160 which indirectly effects the engagement of the totalizers with their racks and the engagement and disengagement of the aliners with respect to the totalizers is actuated by two cams 710 and 711 (Figs. 19, 20 and 29), one of which operates upon one arm to move the lever in one direction and the other of which operates on the other arm to move the lever in the opposite direction. When the machine is changed from an adding to a totalizing machine, or vice versa, the change in time of operation of this lever 160 and the elements cooperating therewith is effected by changing the time of operation of the cams 710 and 711. These are loosely mounted on the main shaft 10 and are rotated through a definite number of degrees so as to bring the cams in such positions as to cause the totalizers and their aliners to be operated at the proper time.

Fast to the shaft 600 is a cam 712 (Fig. 29). The cam 710 has secured thereto a gear 713 and the cam 711 has secured thereto a similar gear 714. When it becomes necessary to change the positions of these cams, motion is communicated thereto from the manual shaft 600. While the cam 710 and its gear 713, and the cam 711 and its gear 714, are loosely mounted upon the main driving shaft, power is communicated thereto from a gear 715 fast on the shaft 10.

Rigidly mounted upon a short shaft 716 is a gear 717 which co-acts with the gear 715. The shaft 716 also carries two other gears 718 (Figs. 20 and 29) and 719 (Figs. 19 and 29), which are normally in mesh with the gears 713 and 714 respectively. As the shaft 10 rotates, the gear 715 transmits motion to the gear 717 and this, by means of the shaft 716, communicates motion to the gears 718 and 719, which drive the gears 713 and 714 respectively, and thereby the cams 710 and 711 connected thereto. This constitutes the normal driving mechanism for transmitting motion to the cams 710 and 711, but in order that they may function in proper time, when the machine is being cleared or used to produce a record, it is necessary to change the positions of both of these cams. The shaft 716 is rotatably mounted in two levers 720 and 721 (Figs. 19, 20, 23 and 29) rigidly secured to the shaft 650. The lever 720 carries a cam roller 722 which engages a cam race 723 in one face of the cam 712. Mounted upon a short shaft connecting the lower ends of the levers 720 and 721 are two broad-faced gears 724 and 725 (Figs. 19, 20 and 22). As the shaft 600 is rotated the cam 712 shifts the levers 720 and 721 so as to first disengage, then hold disengaged for a period, and then again engage the gears 717, 718 and 719 with the gears 715, 713 and 714 respectively.

Loosely mounted upon the hub of the gear 713 is another gear 726, and loosely mounted upon the hub of the gear 714 is a gear 727. Rigidly mounted upon the shaft 600 are two mutilated gears 728 (Figs. 20 and 29) and 734 (Figs. 19 and 29). The former has teeth 729 and a locking face 730, and the latter has teeth 736 and a locking face 737. Co-acting with the gear 728 is a mutilated gear 731, loosely mounted upon the shaft 650. This has teeth 732 and two locking faces 733. Co-acting with the mutilated gear 734 is another mutilated gear 738 loosely mounted upon the shaft 650. This gear has teeth 739 and two locking faces 740. Rigidly secured to the multilated gear 731 is a gear 735 (Fig. 20) which is at all times in mesh with the gear 726, and rigidly secured to the mutilated gear 738 is a gear 741 (Fig. 19), which is at all times in mesh with the gear 727.

As the machine is changed from an adding to a totalizing machine, the shaft 600 is oscillated to move the cam 712 and the mutilated gears 728 and 734 in a given direction, clockwise (Fig. 20) and counter-clockwise (Fig. 19). The race 723 of the cam 712 (Fig. 19) is so designed that just as soon as the shaft 600 begins to turn it moves the shaft 716 and thereby causes the gears 717, 718 and 719 to disengage from their co-acting gears 715, 713 and 714 respectively, and at the same time brings the gear 724 (Fig. 20) into mesh with the gears 713 and 726 and the gear 725 (Fig. 19) into mesh with the gears 714 and 727. During this part of the movement of the cam 712 the locking face 730 (Fig. 20) of the gear 728 engages one of the locking faces 733 of the gear 731; and the locking face 737 (Fig. 19) of the gear 734 engages one of the locking faces 740 of the gear 738. As soon as the gears 717, 718 and 719 have been disengaged from their co-acting gears and the locking gears 724, 725 have been engaged with the gears which they lock and drive, the teeth of the mutilated gears 728 and 734 come into mesh with the teeth of the mutilated gears 731 and 738 respectively, thereby rotating these gears. The motion of the mutilated gears 731 and 738 is communicated to the gears 735 and 741. Since these gears 735, 741 are always in mesh with the gears 726 and 727 respectively, said gears 726 and 727 are also caused to rotate. The movement of the gear 726 is transmitted to the gear 713 by the broad-faced gear 724, and the motion of the gear 727 is communicated to the gear 714 by means of the broad-faced gear 725. By this means, motion is communicated to the two cams 710 and 711 independently of each other, and both are shifted around the main driving shaft an amount determined by the cam 712 and the extent of the teeth of the mutilated gears 728 and 734. As soon as the teeth of the gears 728 and 734 have passed, the locking faces 730 and 737 become effective and the mutilated gears 731 and 738 are again locked against further movement. Immediately thereafter the race 723 of the cam 712, through the roller 722, shifts the shaft 716 back to the position it occupied before the shaft 600 began its movement; that is, it throws the gears 717, 718 and 719 into mesh with their co-acting gears 717, 713 and 714 respectively, and throws the gears 724 and 725 out of mesh with the gears 726 and 727 respectively, which they lock and drive. The cams 710 and 711 now stand in their new positions, with the driving gears coupled up to again communicate motion thereto.

As shown in the drawings the movement communicated to the cam 711 is somewhat greater than that communicated to the cam 710. The reason for using two cams to actuate the lever 160, which lever effects the engagement and disengagement of the totalizers with the racks, lies in the fact that during the adding cycle the totalizers engage the adding racks for a longer period than during the total-taking or clearing cycle. When clearing, the totalizers engage racks during the forward movement of the racks, while during adding they engage during the return movement of the racks. The return movement of the racks taken together requires more time than the forward movement, because the racks move forward simultaneously, while they return successively, to provide time for carrying from one denomination to another. By using two cams, in this case cams 710 and 711, one of them, 711, is used to effect engagement of the totalizers and racks, while the other, 710, is used to effect their disengagement. The cam races in the two cams 710 and 711 have certain portions thereof widened so as to permit the free movement of the cam roller of one cam when the other is active, and vice versa. When changing from adding to totalizing, and the reverse, the two cams are thus rotated through different angles. In this way not only the time of engaging the totalizers with the racks during each cycle is changed, but the time the totalizers remain engaged during the cycle is also varied.

In addition to changing the time of engaging the totalizers, it is also necessary to change the time when the totalizer differentials perform their forward movements. Since the engagement of the totalizers with the racks always takes place immediately after the totalizer differentials finish their forward movements in both adding and totalizing operations, it follows that the totalizer engaging cam 711 and the totalizer differential actuating cam 51 retain the same relation to each other in both adding and totalizing operations. For this reason, cam 711 and gear 11 which through gears 12 and 13 drives cam 51, are clutched together and driven by the same gear 719, as clearly shown in Fig. 29.

When it becomes necessary to readjust the machine for analyzing operations, a shifting of the shaft 600 in the reverse direction simply reverses the direction of the movement of the mutilated gears and their co-acting trains so as to again shift the cams 710 and 711 to their original positions.

In order to preserve the alinement of the parts, an alining pin 742 is secured to the frame 2 and stands in position to engage the teeth of the gears 717, 718 and 719 when they are disengaged from their co-acting gears; and another alining device 743, fixed to the base 1, cooperates with the gears 724 and 725 to hold them against rotation when they are out of engagement with their co-acting gears.

Also fast on the changing shaft 600 is a cam 1140, (Fig. 13) having a race 1141, which engages a cam roller carried by a lever 1142 loosely mounted upon the shaft 650. The lever 1142 has a pin and slot connection with a lever 1143 pivoted on a stud 1144 carried by the frame 6. Also pivoted on the lever 1143 is a link 1145 (Figs. 8 and 12) which carries a pin 1146 engaging a slot 1147 in a lever 1148 pivoted on a stud 1149 carried by the frame 6.

During analyzing operations the pin 1146 normally engages a plate 1150 rigidly secured to the frame 6. Pivoted on the stud 1149 is a lever 1155 having a cam roller 1156 engaging a cam race 1157 in a cam 1158 fixed on the shaft 492, which shaft receives one rotation for each cycle of operation of the machine, both during analyzing and totalizing operations. The cam race 1157 rocks the lever 1155 clockwise and then counter-clockwise once during each of said cycles. The above mentioned lever 1148 has connections to mechanism for recording the totalizers as they are selected during totalizing operations, and said mechanism will be hereinafter described. It is necessary that that mechanism be not operated during analyzing operations, and therefore there is no connection between the lever 1148 and the lever 1155, which is operated by the cam 1158 during analyzing operations.

When changing the machine from analyzing to totalizing the movement of the shaft 600 through the cam race 1141 rocks the lever 1142 clockwise (Fig. 13), which in turn rocks the lever 1143 counter-clockwise, which moves the pin 1146 in the upper end of the slot 1147. When in this position the pin 1146 engages a notch 1159 in the lower end of the lever 1155. When in this position, due to the fact that the pin 1146 projects through the slot 1147 in the lever 1148 and now engages the notch 1159 in the lever 1155, the operation of the cam 1158 will rock the lever 1148 simultaneously with the movement of the lever 1155, which will render the totalizer recording mechanism effective during totalizing operations. When the shaft 600 is moved from a totalizing to an analyzing position, the cam 1141 reverses the action of the levers 1142 and 1143 and causes the pin 1146 to be disengaged from the notch 1159 and moved to the position shown in Fig. 13, and when in this position the lever 1155 simply rocks idly and does not drive the lever 1148.

Also secured to the changing shaft 600 is a cam 1163 (Figs. 11 and 29), having a race 1164 which cooperates with a cam roller on a lever 1165 pivoted on a stud 1166 mounted in the frame 3. The lever 1165 has an integral segment 1170 meshing with a rack 1171 on a bar 1172 supported for vertical movement by means of studs 1173 carried by one of the plates 9 (Fig. 25). The upper end of the bar 1172 has a rack 1174, which engages a pinion 1175 secured to the master switch M—S. The bar 1172 is also supported near its upper end by a pin 1176 carried by a bracket 1177 secured to the frame 3.

During analyzing operations the parts are as shown in Figs. 11 and 25, wherein the contacts 539 and 541 engage the contact plate 540 on the drum of M—S switch, and the contacts 542 and 544 engage the contact 543 on the drum of M—S switch. During analyzing operations these are the necessary connections for controlling the group selecting mechanisms. However, during totalizing operations it is necessary that these connections be broken at these points and that contact plates 1776, 1777, 1778, 1779 and 1780 (Fig. 49A) on the drum of M—S switch be moved so as to contact with groups of contacts 1786, 1787, 1788, 1789 and 1790 respectively, so as to control the group selecting mechanism during totalizing operations. These contacts are normally disengaged during analyzing operations, but when the machine is changed from analyzing to totalizing, the cam race 1164 (Fig. 11) rocks the lever 1165 counter-clockwise, which raises the bar 1172, which, through the rack 1174 and pinion 1175, turns the M—S switch so that the contact plate 1776 engages the contacts 1786; the contact plate 1777 engages the contacts 1787; the contact 1778 engages the contacts 1788; the contact 1779 engages the contacts 1789; and the contact 1780 engages the contacts 1790. The turning of M—S switch at this time causes the contact 540 to be disengaged from the contacts 539 and 541 and causes the contact 543 to be disengaged from the contacts 542 and 544. When the M—S switch is setting in this position the circuits are controlled to the groups so that only one totalizer can be selected for each cycle of operation of the machine.

When the machine is changed from totalizing to analyzing, the movement of the shaft 600 and cam race 1164 reverses the movement of the parts in Fig. 11 and again turns M—S switch back to normal analyzing position, wherein the contact plates 540 and 543 on the drum of M—S switch again engage the contacts 539, 541, and 542 and 544 respectively, and the contact plates 1776 to 1780 inclusive, are again disengaged from the groups of contacts 1786 to 1790 inclusive.

*Amount recording mechanism*

The record produced when the machine is cleared may be either perforated or printed, or both; as here shown (Fig. 2) it is both perforated and printed. The record itself has already been described in detail, and no further description thereof is necessary.

Both the punches 750 (Figs. 46 and 48) and the printing devices 751 used to record amounts, are under the control of the differentials which position the actuating racks. A shaft 752, together with a group of nested sleeves 753 thereon, control the punches 750

A shaft 754, together with a group of nested sleeves 755 thereon, control the printing elements 751.

The printing wheel 751 of lowest denomination is fixed to the shaft 754; the others are secured one to each of the nine nested sleeves 755. These shafts and sleeves are actuated and positioned by segments 756 (Figs. 16, 17 and 18) mounted for free rotation upon a shaft 757 which is supported by the frames 2 and 3. The segments 756 are equal in number to the number of rack differentials. Each segment has on its lower edge a locking rack 758 by which it is held in fixed position when the circumstances require. Secured to the shaft 752, and to each of the sleeves arranged thereon, is a gear 759 which meshes with the several segments 756, and fastened to the shaft 754 and the sleeves 755 are gears 760 which likewise mesh with the segments 756.

Motion from the differentials is communicated to the segments 756 by the "beam and link" movement. To each segment 756 is pivotally attached one end of a beam 761, and to each differential 62 is pivotally attached one end of a link 762; the free end of the beam and the free end of the link are pivoted together. Any movement of the differential 62 is thus communicated to the beam 761.

Beam actuators

Co-acting with the beams 761 is a set of beam actuators 763, one for each beam, rigidly attached to a shaft 765. This shaft is oscillated in timed relation with the other elements once during each cycle of the machine, thereby depressing the beams and thus positioning the segments 756 in accordance with the position of the differentials. This means of setting one group of elements differentially by means of another which has been previously set is well known in this art and has been previously described herein in connection with the positioning of the totalizers. It is sufficient to say that by this means both the punches and the printing wheels are positioned to produce a record such as required by the differentials as they are set under the control of the denominational elements of the totalizers. Extensions 764 on the beam actuators 763 guide the links 762 and prevent any lateral displacement.

Attached to the shaft 765 is an arm 768 (Figs. 39 and 44), which serves to oscillate the same. Movement is communicated to this arm by means of a lever 769 pivoted on a stud 770 carried by the frame 6. The other end of the lever is provided with a cam roller which engages the cam race 670 formed in the side of the gear 669, which, as previously described, is driven by means of the clutch sleeve 668 (Figs. 29 and 34).

When the coupling gear 646 (Fig. 29) is in the position it occupies when the machine is being cleared it meshes with both the driving gear 645 and the gear 661 on the clutch sleeve 668; and by this means motion is communicated from the main shaft 10 to the gear 669, and thence to the shaft 765 by means of the lever 769 and arm 768. When the gear 746 is out of mesh with the gears 645 and 661, as it is in adding operations the beam actuating mechanism is idle.

Segment aliners

In order to aline and definitely hold the segments 756 in any required position, alining devices 766 (Figs. 16, 17 and 18) are provided. There is one of these devices for each segment and they are all rigidly mounted upon a shaft 767 which is mounted in the frames 2 and 3 and is oscillated once during each cycle of the machine. Attached to this shaft 767 is a lever 771 (Fig. 21) connected by a pin and slot to a lever 772 pivoted upon the shaft 153. The lever 772 in turn is connected by a pin and slot to a lever 773 pivoted upon the shaft 122. This lever carries a cam roller 774 engaging the previously described cam race 681 in the face of the gear 661. This is the same gear which serves to communicate motion to the clutch sleeve 668 and through this to the beam actuator mechanism. Therefore, it likewise moves or remains stationary, depending upon whether the gear 646 is in engagement with the gear 645, as in total-taking operations, or is disengaged therefrom, as in adding operations. In other words, this alining mechanism operates only during total-taking operations.

Totalizer recording mechanism

In addition to the ten groups of punches 750 for perforating the amounts there are ten more groups of punches 1180 (Figs. 46 and 47). There is one set of four punches for each of the ten groups of totalizers, each set being adapted to make perforations representative of each totalizer in its respective group.

There are also ten printing wheels 1181, one for each group of totalizers. Each wheel has printing faces, with characters on each face representative of the name of the totalizer in the respective group. In other words, these wheels will print the name of the totalizer represented by the perforations made by the punches 1180. Each wheel also has an asterisk (*) to which position the type wheels are set when no totalizers are selected in the corresponding groups.

The punches 1180 and printing wheels 1181 are controlled by the same mechanism. The printing wheels 1181 are all loosely mounted upon the shaft 754, and each wheel has secured to the side thereof a gear 1182. These gears mesh with gears 1183, one of which is secured to a shaft 1184 and the others are secured each to one end of nested sleeves 1185 mounted upon the shaft 1184. The shaft 1184 is mounted for rotation in the frames 3 and 7 (Fig. 8). Secured to the other ends of the nested sleeve 1185 and the shaft 1184 are gears 1186. Meshing with each of the gears 1186 is a segment 1187 (Figs. 8 and 13), loosely mounted upon the shaft 757. These segments are adapted to be selected for actuation by means of a bank of differential mechanism herein referred to as bank "N", to be later described, and after being selected these gears are adapted to be rotated different distances to record the totalizer selected by means of a bank of differential mechanism known as bank "M", to be later described. These printing wheels 1181 are adapted to print in ten columns on the summary record (Fig. 2), as determined by the group and the totalizer of the group which is selected. The column in which the name is printed from any one of the type wheels 1181 according to its position on the summary record is indicative of the group from which this particular totalizer is selected.

Special perforators

There is a third set of two punches 777 (Figs. 40 and 46), arranged between the groups 750 and 1180. These are used to punch the control perforations in column C in the summary record. These holes are identical in function with the control holes in column C of the detail record. The construction of these punches and the mechanism for operating them will be hereinafter described.

Bank "N"

The special differential mechanism which controls the selection of the gears 1186 and segments 1187 (Fig. 8) which actuates the totalizer recording type-wheels 1181, is substantially identical with the differentials which move the totalizer shafts 28 to select the totalizers thereon.

The machine of the above mentioned Goldberg Patent No. 1,694,009 is also provided with a special differential named therein bank "N", and its function therein is to control certain punches and printing wheels directly, that is, it controls the differential setting of the punches and the printing wheels, whereas in the machine shown herein it does not control the differential setting of the punches or of the printing wheels, but selects which group of punches and printing wheel shall be moved differentially. This differential mechanism appears in the drawings at the top of Fig. 7A and is illustrated in detail in Fig. 25. This device as a whole has been designated by the character N, and in speaking of this structure as an entirety it will be referred to as the bank "N." Its driving device 61, beam actuator 92, and alining device 98 are all identical with the corresponding elements of the totalizer group differentials; and they operate in timed relation with these elements so that no further description thereof is necessary.

The electric contact bank 106 for bank "N" differs from the other contact banks in that it has only one set of fixed contacts, these being the l—0 to l—9 contacts. The movable contact has only one side, this being 101. The reason for having only a single contact bank 106 will be clear when the circuits for this bank are discussed.

The rack 29 instead of being used to adjust a totalizer shaft, as with the totalizer group differentials, is here used to communicate motion to the means which selects the type actuating gears 1186 and segments 1187 (Fig. 8). This rack 29 has secured thereto a bar 1190 (Figs. 7A, 7B, 8 and 25), secured directly to a shaft 1191 mounted to slide in the frames 3 and 6.

As the rack 29 is set differentially by the beam 87 of bank N, the shaft 1191 is set accordingly. Mounted upon the shaft 1191 are two arms 1192 (Figs. 8 and 13). These arms are connected by a hub having a slot 1193 into which projects a pin 1194 secured in the shaft 1191. By this means the arms 1192 are moved laterally with the shaft and at the same time are permitted a slight oscillation for reasons to be hereinafter described.

Extending through the lower ends of these arms is a shaft 1195 having a key-way 1196. This shaft is supported at its ends by arms 1197 and 1198 (Figs. 8 and 13) loosely mounted on the shaft 1191. Mounted on the shaft 1195 between the two arms 1192 is a gear 1199. This gear has a projection which fits within the key-way 1196 so that the gear may be slid longitudinally of the shaft 1195. As the shaft 1191 is differentially set under control of bank N it can be seen that the gear 1199 will be brought into alinement with the segments 1187, as determined by the differential positioning of bank N. The means for controlling the differential positioning of bank N during totalizing operations will be hereinafter described when the totalizer selector mechanism, which operates during totaling operations, is described.

After the gear 1199 has been positioned in alinement with one of the segments 1187 it is rocked into engagement therewith. This means comprises a pin 1200 (Fig. 13) on the arm 1197, which engages a forked arm 1201 integral with the previously described lever 1148. It will be remembered that this lever is actuated by the cam 1157 through the intermediate connection of the pin 1146 and arm 1155. When this connection has been made, when the machine is changed from analyzing to totalizing position, the movement of the arm 1155 is communicated through the lever 1148 and arm 1201 to the arms 1197 and 1198. The shaft 1191 does not oscillate but due to the slot 1193 and pin 1194 the arms 1192 are permitted to be rocked by the arm 1201 through the arms 1197, and 1198 and shaft 1195. This rocking of the arms 1192 causes the gear 1199 to be moved into engagement with whatever segment 1187 has been selected, as determined by bank N under control of the totalizer selecting strip illustrated in Fig. 5.

The segments 1187 are normally locked by means of spring-pressed aliners 1202 which are pivoted upon a rod 1203 mounted in the frames 3 and 6. There are ten of these aliners 1202, all normally in engagement with the segments 1187. As one of the segments 1187 is selected for actuation, its aliner 1202 is simultaneously selected, and as the gear 1199 is moved into engagement with the selected segment 1187 means is provided for disengaging the aliner 1202 from the selected segment. Means is also provided for simultaneously locking this particular aliner out of engagement and locking the remaining aliners 1202 in engagement with the unselected segments 1187.

The means for selecting the aliner is a projection 1204, integral with one of the arms 1192, which cooperates with a projection 1205 on the aliner 1202. When the arms 1192 are rocked to engage the gear 1199 with the selected segment 1187, the projection 1204 engages the projection 1205 and disengages the selected aliner 1202 from the segment 1187.

The means for locking the selected aliner 1202 out of engagement and the unselected aliners 1202 in engagement comprises a pointed bar 1210 which is integral with the arm 1197 and an arm 1206 loose on the shaft 1191 (Figs. 8, 13 and 21). The frame 3 has an opening (not shown) for the bar 1210. This bar 1210 cooperates with the end 1211 of the aliners 1202 and is so positioned that it does not engage them until after the selected aliner has been rocked out of engagement with the selected segment 1187. Immediately following the disengagement of the selected aliner 1202 the bar 1210 is moved from the position shown in Fig. 13 to the position shown in Fig. 14, wherein it lies above the ends 1211 of all unselected aliners and below the end 1211 of the selected aliner.

After the gear 1199 has been moved to select one of the segments 1187, and then rocked into engagement therewith, it is differentially rotated under control of a mechanism to be hereinafter described.

*Bank "M"*

There is another special differential mechanism, which will be hereinafter referred to as bank "M". The above mentioned Goldberg Patent No. 1,694,009, is also provided with a bank M differential which in that machine is used to control the differential setting of a single set of punches and a single type wheel. In the machine herein, the bank M differential is common to all of the type wheels 1181 and controls the differential positioning of said wheels, one at a time, as determined by the selection under control of bank N, and also controls the selection of the punches 1180 in all ten groups after the group has been selected by bank N.

This bank M is the extreme right hand bank in Fig. 7B and also shows in Fig. 21. Structurally considered this bank is substantially identical with the differential devices which adjust the actuating racks. The differential driver 61, the differential 62, the latch 66, the beam 761, the beam actuator 763, and the alining device 766 are all substantially the same as those described in connection with the rack actuating differential and are given the same reference numbers. The electric contact bank 106 is also identical with the other banks. This differential, the beam actuator and the alining device are operated in timed relation with the rack actuating differentials. Therefore, no further description of this part of bank M is thought necessary.

The segment to which the bank M beam 761 is pivoted is slightly different in form from the rack actuating differential segments 756, and has been designated in Figs. 7B, 8 and 21 by the numeral 1215. This segment 1215 is set differentially under control of the beam 761 in identically the same manner as the segments 756 are set under the control of their beams 761. This segment 1215 cooperates with a gear 1216 (Figs. 8 and 21), which is fast upon the previously described shaft 1195. As the gear 1199 is rocked into mesh with the selected segment 1187, the gear 1216 is rocked into mesh with the segment 1215. After this engagement of the segment 1215 and gear 1216 the segment is positioned differentially, as determined by bank M under control of the perforations in the two right hand columns on the control sheet of Fig. 5, thus setting the gear 1216 differentially, as determined by the location of these perforations, according to the diagram in Fig. 6. The setting of the gear 1216 rotates the shaft 1195 and consequently the gear 1199, which in turn rotates the segment 1187, which has been selected for actuation by said gear 1199 under control of bank N. This, through the gear 1186, sleeve 1185, gears 1183 and 1182, differentially positions the selected typewheel 1181 so that the name of any totalizer selected will be printed upon the summary strip.

The gears 1216 and 1199 are held in alinement when they are out of engagement with the segments 1215 and 1187 respectively by means of a spring-pressed alining pawl 1217 (Fig. 21) which is pivoted upon the arm 1198. This pawl has a projection 1218 engaging a pin 1219 on the plate 9 which holds the pawl 1217 out of engagement with the gear 1216 when the same is rocked into engagement with the segment 1215.

From the above descriptions of banks N and M it will be clear that bank N selects the typewheel which is to be actuated, and bank M determines the extent to which the selected wheel shall be actuated.

Perforators in general

The perforating and printing devices are mounted in a supplemental frame in the analyzing portion of the machine. The shafts for carrying the printing and punching elements and certain of the actuating parts are supported in the frames 6 and 7. A frame 831 (Figs. 8 and 48), hollow in cross-section, extends between and is fastened to the frames 6 and 7. This frame 831 supports all of the punches 750, 777 and 1180, and in order that the punches may be readily inserted and replaced, a central portion of the frame 831 is cut away at the top and bottom. A guide plate 833 (Fig. 47) is fastened to the box section at the top and a similar plate 834 is fastened to the bottom. These plates are provided with alined perforations to receive the reduced portions of the punches. Directly above the plate 833, and also secured to the box structure, is a guide plate 835 (Figs. 46 and 47), the holes in which correspond in number to those in plate 833. The holes in the plate 835 are semi-circular in form, and the upper ends of the punches have one side flattened, as at 836 (Fig. 38), so that the extreme ends extend through the semi-circular perforations of the plate 835. Certain of the semi-circular holes (Fig. 46) face in one direction and the other in the opposite direction. This is for the purpose of selecting the punches. There are four of these punches for each digit and the combination of perforations desired is obtained by picking out the punch or combination of punches in the manner hereinbefore described.

Extending between the frames 6 and 7 directly beneath the box section of the frame 831 is a frame 837 secured to the frames 6 and 7 by screws 838 (Fig. 41). Upon this frame 837 is mounted a die-plate 839 (Figs. 43 and 44) with which all the punches coact. A tube 841 (Fig. 43) extends from the frame 837 to a box 842 so as to carry away the small pieces of paper cut out by the punches.

Amount perforating mechanism

Gears 843 (Figs. 44, 46, and 48) are mounted, one on the shaft 752 and the others on the several sleeves 753; these gears are therefore under the direct control of the rack differentials which drive the gears 759 on the other end of the shaft 752 and sleeves 753. Coacting with these gears 843 is a set of ten slides 844 (Figs. 8, 36, 37, 46, 48), each having on its lower edge a rack 845 and hammers 846 which act on the punches.

The punches have to be selected so as to punch holes corresponding to the digit required; it is, therefore, necessary to adjust the racks so that the hammers may select the desired punch or punches. This is accomplished by adjusting the slides 844 so that the hammers are positioned to strike the punches necessary to produce the desired perforations. Certain of the hammers have longer faces than the others; moreover, to the side of each slide 844 is attached a supplemental plate 847 also having several short-faced hammers and one long one. As these hammers are adjusted over the cut-away ends of the punches, certain hammers engage with the punch heads that face in one direction and certain others engage with others that face in the other direction.

The slides 844 are each provided with elongated slots 848 and 849 by which they are supported and guided in their movements. A shaft 850 mounted in frames 6 and 7 projects through the slots 848 and supports the slides 844 at this end. In order to space the slides 844 from each other, and to provide anti-friction bearings therefor, flanged bushings 851 (Figs. 46, 47 and 48) are interposed between the slides, the hub portions of which pass through the slots 848, while the flanged portions serve to space the slides from each other.

The means for supporting and guiding the other ends of the slides 844 are quite similar to that just described. A shaft 852 is here provided, having mounted thereon flanged bushings 853 the hubs of which pass into the slots 849 and the flanges space the slides from each other. This shaft 852, however, is not mounted in the frames 6 and 7, but is supported by two arms 854 (Figs. 8, 46 and 48), both of which are rigidly secured to the shaft 850. The shaft 852 and arms 854 thus in effect constitute a yoke extending from and supported by the shaft 850.

One arm 854 has an extension 855 (Fig. 44) to which a pitman 856 is pivoted. The pitman is bifurcated to embrace the shaft 492 and carries an anti-friction roller 857 which engages a cam 858 (Figs. 34 and 44) secured to the shaft 492. Also secured on the shaft 492 is a gear 859 which derives its movement from the gear 669 mounted upon the clutch sleeve 668, which it will be remembered is driven from the gear 661 (Fig. 29) when the gear 646 is in engagement with the gears 645 and 661. In other words, the cam 858 is operated only during totalizing operations and remains idle during analyzing operations.

Totalizer perforating mechanism

Means must also be provided for selecting and actuating the totalizer punches 1180

(Figs. 46 and 47), which produce the perforations indicating the totalizers as they are cleared. For this purpose, slides 1222, having racks 845 and openings 848 and 849, are provided. There are ten of these slides, one for each group of totalizers. They are supported at one end upon flanged bushings 851 like those supporting the slides 844, and at the other end upon flanged bushings 853 mounted upon the shaft 852. These slides 1222 are adapted to be moved up and down to operate the punches 1180 in identically the same manner and by the same means as the slides 844 are moved up and down to actuate the punches 750. The means for differentially positioning the slides 1222 comprises a series of ten gears 1223 (Figs. 46 and 47) which are loosely mounted upon the shaft 752. These gears mesh with the previously described gears 1183, which, it will be remembered, differentially position the type wheels 1181 under control of bank M. They also mesh with the racks 845 on the under side of the slides 1222, and by this means the slides 1222 are differentially positioned simultaneously with, and to extents commensurate with, the movement of the type wheels 1181, as determined by bank M.

Special perforator mechanism

The punches 777, which produce the control holes in column C (Fig. 2), are operated by an arm 861 (Fig. 40) loosely mounted upon the shaft 850 by means of a flanged bushing 851, and upon the shaft 852 by a flanged bushing 853, the bushings being identical with those employed to guide and separate the slides 844 and 1222. In connection with these special punches 777 no selection is necessary; the two punches are merely actuated at every step of the paper, or once for each cycle of operation. This movement is effected by the pitman 856 which actuates the entire groups of slides 844 and 1222.

Perforator restoring mechanism

In order to support the punches and to remove those which have been driven through the paper, the entire set, consisting of the punches 750, 777 and 1180, are mounted in a carrier 864 (Figs. 43, 44, 47 and 48), which is provided with a series of perforations equal in number to the total number of punches. The punches are supported in the carrier by their enlarged portions. Arms 865 attached to the ends of the carrier pass through guide openings in the plates 833 and 835 and are attached to links 869 (Figs. 47 and 48) which in turn are loosely mounted upon the shaft 852. As this shaft is raised and lowered, the carrier itself will likewise be raised and lowered. When the shaft starts down, the carrier will move down, and with it all of the punches. Those which have been selected for operation are driven by the hammer through the paper, while the others rest upon the top of the record material. After the perforations have been made, shaft 852 is raised and lifts the carrier 864 with it, thereby again raising all the punches to their normal positions.

Aliners for the printer

In order to hold the printing elements in proper alinement there is provided a bar 1225 (Figs. 8, 45, 46, 47 and 48) having on its under side as many teeth as there are printing elements. The bar 1225 is integral with two arms 1226 and 1227, the former loosely mounted upon the outer sleeve 1185 and the latter loosely mounted upon the shaft 1184. The arms 1226 and 1227 each have a lug 1228 which guides the lower ends of rods 1229, the upper ends of which are supported in lugs 1230 on the arms 854. Springs 1231 surround the rods 1229 and keep the bar 1225 under tension at all times. When the arms 854 are moved downward, as previously described, the bar 1225, under the influence of the springs 1231, will be moved into alining position. The teeth of this bar engage the gears 1182 on the type wheels 1181 and gears 1232 secured to the side of each amount type wheel 751. The bottom of each of the rods 1229 is provided with threads and has a nut underneath the lugs 1228 so that when the arms 854 are raised to their normal positions the aliner bar 1225 will be withdrawn from alining position.

Inking mechanism

The inking mechanism 887 (Fig. 41) is generally shown in Figs. 41 and 44. It consists of an inking ribbon 888 which is mounted upon spools 889 and 890. Any well known ribbon reversing mechanism may be used, and that shown is used merely to illustrate how such a ribbon is to be applied.

Impression hammer

The impression from the printing wheels 751 and 1181 is taken by an impression hammer 891 (Figs. 43 and 44). This hammer is supported by two sets of parallel arms, an upper set 892 and a lower set 893, the free ends of which arms are loosely pivoted to the impression hammer so as to cause the same to move in a vertical plane. The upper arms 892 are loosely mounted upon the shaft 418 and the lower arms 893 are loosely mounted upon a shaft 894.

Secured to the shaft 894 are two levers 896, the upper ends of which normally engage the shaft 418. These levers 896 carry pins 898 which normally rest against faces 895 of the arms 893. Wound around the shaft 894 is a spring 899 having one of its ends bent over the shaft 418 and the other end resting against the arm 896. This spring is normally under tension but cannot move the arms 896 or the shaft 894 because the arms 896 are stopped by the shaft 418. The result is that normally the impression device hangs with the faces 895 resting against the pins 898, as shown in Figs. 43 and 44.

Rigidly secured to the shaft 894 is a short lever 900 carrying a flat-faced pin 901. Loosely mounted on the shaft 894 is a lever 902 which has pivotally mounted thereon a latch 903. This latch has at its lower end a hook 904 adapted to engage the pin 901 and has at its upper end an extension 905 adapted to engage a pin 906 carried in the frame 6.

A pitman 908 carrying a roller 909, which engages a cam race 910 in the side of the cam 858, is pivoted to the lever 902. This cam 858, as before explained, is driven by the gear 859 through the mechanism controlled by the manual shifting device so that it operates only during totalizing operations. As the pitman lowers, the latch engaging with the pin 901 lifts the lever 900 and puts spring 899 under tension, and since the levers 896 are fast to the shaft 894 the pins 898 recede from the position shown in the drawings and the parallel arms of the impression device follow the movement of the pins and are thereby lowered from the position shown in Figs. 43 and 44. This motion continues until the extension 905 of the latch 903 strikes the pin 906, whereupon the hook 904 is unlatched from the pin 901 and the mechanism is released. Now the spring 899, acting under the energy stored therein, gives a quick movement to the impression device. As soon, however, as the upper ends of the levers 896 strike the shaft 418 the impelling mechanism is stopped; but the impression device, due to the momentum which it has acquired, moves up and strikes the type through the inking ribbon, after which it recedes until the faces 895 again rest against the pins 898. As the pitman rises, it lowers the latch 903 and the hook 904 passes under the flattened pin 901 on the lever 900, wherein it is again in position to give power to the spring 899.

Zero stop mechanism

In order that the actuating racks may be set differentially and the record-making devices positioned according to the amounts represented by the totalizer elements, means must be provided for stopping the racks when the denominational elements of the totalizers reach zero. Particular reference in regard to this mechanism is made to Figs. 16, 17, 18, 26 and 27.

The stops proper, 915 (Figs. 26 and 27), are provided with hubs 916 by means of which they are supported adjacent the transfer or carrying arms 322; and have concave faces 917 which co-act with the totalizers. An arm 918 is carried by each stop and is arranged on the side of the plate 135 opposite that occupied by the stop to which it is secured. There are ten of these stops for each actuating rack.

The zero stops are under control of the manual shaft. During analyzing operations they are inactive and occupy the positions shown in Figs. 16, 17 and 18, but during totalizing operations they are under the control of mechanism which sifts them into and out of operative position once for each cycle of the machine. When in operative position the stops 915 are so placed as to be in the path of the long teeth 320 of the totalizer elements 27. By this means, as the rack sections are shifted under the influence of their respective differentials, the long teeth 320 of the several denominational elements of the totalizer at that time being cleared will sooner or later strike the stops 915 and cause the same to be shifted. The zero position of the denominational elements is that in which the long teeth are in a horizontal position. As the long tooth of each denominational element approaches zero it engages the side of its cooperating stop 915 and moves the same a certain definite distance. Advantage is taken of this movement to stop the racks and set the recording devices.

The stopping of the racks and the setting of the recording devices is effected by energizing the magnets 84 and thereby stopping the differentials. Since the totalizer elements may stand in any of ten possible positions, the times at which the racks must stop vary. The racks must be stopped when the totalizer elements are home, but must not be stopped at any other position. The control must therefore be effected between the 1 and the home, or 0 positions. Two conditions then exist; one where the long tooth 320 stands at "1" when the totalizing operation begins, and another where the long tooth stands at any other of the nine possible positions. As before stated, the contacts 700, one for each rack or denomination, are carried by a frame which is raised and lowered at a certain time in each cycle of operation. The closing of these contacts is effected by means of arms 937 (Figs. 16, 17 and 18), one for each denomination, which are actuated indirectly by the zero stops.

As the totalizers move into rack-engaging position, the selected totalizer engages with the supplemental racks 302. The first step of the movement of the differentials is to advance the main racks 118 until they come up to the supplemental racks. During this step the totalizer elements are not moved. During the next step of the differentials the main racks 118 also will move one step and rotate the totalizer elements one step. If any of the totalizer elements happen to be standing at the "1" position it will be necessary to stop its rack and its differential at the end of this step of movement so that the totalizer element will stand at zero. This will cause the corresponding recording devices to stand at "1" to indicate that there has been "1" on that element of the totalizer.

Since the differentials are stopped by the magnets 84, and these in turn are controlled by contacts 700, it is desirable to energize the magnets as soon as possible because the time for operation of the parts is necessarily limited. This circuit must not be closed before the totalizer has reached the "1" position, but must be closed at that time, or immediately thereafter. The actual completion of the circuit is, as stated, under control of the arms 937. These arms may occupy any one of three positions. What may be described as the normal position is that shown in Figs. 16, 17 and 18; that is the position they always occupy unless positively moved to some other position, but they may occupy either of two other positions, depending upon the positions of the totalizer elements with which they co-act. If the totalizer element stands at "1" the stop 915 for that element will be arrested when it comes in contact with the side of the long tooth 320. This will cause the arm 937, which it controls, to stop before it passes off a dwell 938 of the arm 707, thereby holding the arm in the position shown. If the totalizer stands at one of the other nine possible positions, the stop 915 will not be arrested by the long tooth, but will pass partly over the top of the short tooth then standing in the "1" position. This will carry the arm 937 off the dwell 938 of arm 707, thereby permitting the latter to rise when the contacts themselves are raised.

Thus, when the totalizer element stands at "1" at the beginning of the cycle, the arm 937 cannot run off the dwell 938, but holds the arm 707 so that the circuit will be closed between the contacts as the same are raised, which takes place immediately after the stops are positioned. On the other hand, when the totalizer stands with its long tooth at any other position than "1," the arm 937 runs off the dwell 938, thus permitting arm 707 to rise with the contacts 700 without closing them. In this case, the contacts will be closed by the long tooth 320 forcing over its coacting stop 915 and through intervening connections to the arm 937. This time is variable, depending upon the position of the totalizer element.

Mounted upon each of the several plates 135 (Figs. 18 and 22) on the side opposite that carrying the rack structure 115 is a slide 919 (Fig. 18) moving on guide rollers 920 which are secured to the plate 135. Pins 921, also fastened to the plate 135, limit the movement of the slides 919 in either direction. These slides have upon each edge a series of pins 922 against which the ends of the arms 918 normally rest. Adjacent each slide 919 are two bars 923, one on either side thereof, provided with guide slots 924 by which they ride over pins 925 fixed in the plate 135. Springs 926, stretched between the ends of the bars 923 and pins on the plate 135, tend to move these bars always to the right (Fig. 18). Other springs 927 (Fig. 26), stretched between the zero stops 915 and the plates 135, tend to throw the arms 918 against the pins 922.

The movements of the slides 919 are effected by levers 928, one for each slide, pivoted upon one of the shafts 180. The upper end of each lever 928 embraces a pin 929 on the slide. The levers 928 are actuated by levers 930 secured to the shaft 641 (Fig. 17), which, as previously described, is actuated by the lever 687, pitman 685 (Fig. 15), cam 684 and gear 682, controlled from the manual shaft 600 through the gears 652 and 646.

The bars 923 have pins 931 which engage the arms 918, and the slides 919 have pins 932 which also cooperate with the arms 918 to advance the same under certain circumstances. The slides 919 are moved back and forth once for each cycle of operation. As they move to the right (Fig. 18) the pins 922 move in the same direction and the arms 918, being no longer restrained, follow under the influence of their springs 927. When the stops reach the totalizer elements they are arrested. Should any totalizer element stand at "1", its stop would be arrested somewhat earlier than those which stand in other positions. The slides continue to move somewhat farther than necessary to position the stops so that if any stops fail to move under the action of their springs 927, the arms 918 are struck by the pins 932 and started; the slides then come back somewhat and hold all of the stops which have made their full movements against the pins 922. Those stops which may have been arrested by totalizer elements standing with their long teeth in position "1," are not held by the slides, but simply rest with their stops against the teeth.

The bars 923 may or may not be moved to their extreme positions under the influence of the springs 926. If any stop is arrested by totalizer elements in position "1", the bar 923 which which it co-acts is also arrested; and levers 933 and 935 are likewise held back and the lever 937 does not pass off the dwell 938 of arm 707. If none of the stops are arrested by totalizer elements in the "1" position, they will all make their maximum movements, and the levers 933, 935 co-act to move the arms 937 entirely off the dwells 938 of the arms 707.

If any totalizer element stands at the "1" position, the arm 937 holds the arm 707 in such a position that when the frame carrying the contacts 700 rises, the circuit is at once closed, the cooperating magnet 84 is at once energized and the parts come to rest at the end of the step, thus stopping the rack at the point where its cooperating recording devices will not stand to record "1". If the totalizer element does not stand at the "1" position, the rack continues to move. As it approaches the "1" position it forces the stop 915 back, causes the arm 937 to rise upon the dwell 938 of the arm 707 and closes the circuit.

If zero is to be indicated on the recording elements, the totalizer element must make a complete rotation, and in passing from "1" to "0", or home position, causes the parts to stop as in other cases. After the totalizer elements are all home, the contacts 700 are again lowered and the slides 919 again returned to their original positions.

Eight of the arms 918 of each denomination, four in the upper and four in the lower row, are identical in construction, but the other two are of somewhat different construction; one, 933, previously mentioned, is provided with a longer arm and has as its lower end a notch 934, the other, 935, also previously mentioned, has a longer arm and carries a pin 936 which rests in the notch 934 of the upper arm. The lower arm for each group also has attached to it the arm 937 which coacts with the lever 707, as heretofore described.

Mounted upon each of the bars 923 adjacent the two long switch actuating arms 933 and 935 just described, is an additional pin 939. If one of the upper totalizers is being cleared, for instance the one at the right (Fig. 18), then when the long tooth moves past the stop 915 it will cause the same to shift, thereby moving its corresponding long arm 918; this co-acting with its pin 931 on the bar 923 will cause the latter to move to the left. In doing so, the pin 939 will cause the long arm 933 to move to the left and the notch 934, through the engagement of the pin 936 will cause the arm 935 to be moved to the left, which will swing the arm 937 to the right and actuate the switch controlling lever 707.

However, should it be a totalizer on the fourth shaft from the right in the top group that is being cleared (Fig. 18), the long tooth of that totalizer would cause the long arm 933 attached thereto to be moved directly, instead of through the intervention of the bar 923, and thus communicate motion to the arm 935 and the other arm 937. If it is a totalizer on the fourth shaft in the lower row, the movement is communicated directly to the arms 935 and 937.

After the totalizer elements are all home, the actuating mechanism for the slide 919 will force the same again to the left (Fig. 18), thereby restoring to their original positions all of the other zero stops 915 and also the spring-actuated bars 923.

*Totalizer selecting mechanism*

The selection of the totalizers in the order in which they are to be cleared, and the setting of the recording devices to record the totalizers as they are selected and cleared, is under the control of mechanism which, in turn, is controlled by a totalizer selecting sheet or strip such as that illustrated in Fig. 5. As before stated, this strip is prepared outside of the machine, and may be prepared to select the totalizers in any order desired. For instance, the third group may be selected and two totalizers from that group selected and cleared, and then another group selected, and two or three, or perhaps all of the totalizers selected and cleared. In other words, it is not necessary to select the entire one hundred totalizers in this machine and clear them in regular order one after the other, as is necessary in the machine shown and described in applicant's Patent No. 1,694,009. In the machine in said patent the clearing of the totalizers is done mechanically, that is, there are electrically controlled switches in the machine which are operated mechanically so that contacts will be made successively in accordance with the groups of totalizers and the totalizers in the groups, so that it becomes necessary after the machine is once started in a resetting operation to reset the entire one hundred totalizers and make a record thereof before the machine will stop.

The selecting strip of Fig. 5 is merely an illustration, and this strip can be perforated in any manner desired to select any of the totalizers. As this strip has already been described in detail, no further mention of it will be made here.

The mechanism for supporting this strip and feeding it through the machine, and the mechanism for cooperating with said strip to select the proper totalizers and select the corresponding recording devices, will now be described.

These mechanisms are operated during the totalizing or summary record producing operations. They are therefore placed under the control of the manual shaft 600 so as to be thrown into and out of operation as the machine is changed from adding to totalizing, and vice versa. Since these mechanisms are to operate only during the taking of a total, the driving mechanism therefor is connected with those elements which operate only during totalizing. These mechanisms derive motion through the previously described bevel gears 676 and 677 (Figs. 21, 22 and 29), which are driven by the gear 675, which is operated only during totalizing operations.

The means for supporting the selected strip comprises a drum 1234 (Figs. 29 and 30), loosely mounted on a stud 1235, and a drum 1236 loosely mounted on a stud 1237. The studs 1235 and 1237 are carried by a frame 1238 rising from the base 1. The drums 1234 and 1236 are provided with driving pins 1239 which cooperate with the holes adjacent the two edges of the control strip. It will be noticed that on the right hand side of the strip there are four of these driving holes to every two on the left hand side of the strip. Hence, the driving pins 1239 on the drums 1234 and 1236 are spaced accordingly. This is to prevent the strip from being put in the machine the wrong way.

These drums are driven step by step intermittently, that is, they are rotated to feed the strip a certain distance, and then held until the completion of that cycle of operation, and then operated again to feed the strip for the second cycle, and so on, until the totalizers are all selected as required by the strip. If the strip is made so as to control the selection and recording of twenty-five totalizers, the machine will make one cycle of operation for the selection of each totalizer and one blank operation between the selection of the totalizers from the different groups. That is, if there are two totalizers being selected out of the third group, and then a totalizer in the fourth group is to be selected, there must be a blank operation, that is, an operation in which no totalizers are selected, just previous to the selection of the first totalizer in the fourth group.

During the blank operation, bank N is moved to the same position as for the previous operation thereby selecting the same recording devices, that is, the same type wheel and punches. Bank M differential, during this blank operation, goes to its extreme position and the beam mechanism for this bank causes the type wheel to be set in the normal or star (*) printing position and also causes the punch actuator to be moved to its normal position. If there was no blank operation between the selection of totalizers from different groups the type wheel and punch actuator would be left in the positions to which they were moved to record the last totalizer selected in a group, and when a new group is recorded the type wheel and punches for the previous group would again record the last totalizer selected from the previous group. This would confuse the record.

The drum 1234 has secured to one end thereof a gear 1240, and the drum 1236 has secured to one end thereof a gear 1241. Meshing with these gears is a gear 1242 fast upon a shaft 1243 supported by the frame 1238 and a bracket 1244 secured to the base 1. Also secured to this shaft 1243 is a Geneva gear 1245 (Figs. 29 and 32) actuated by a pin 1246 secured to the side of a gear 1247 loose upon a stud 1248 supported by the frame 1238. The gear 1247 in turn meshes with a gear 1249 secured to the end of a shaft 1250 supported by the frame 1238 and a bracket 1251 (Fig. 21). To the other end of this shaft 1250 is secured the previously described bevel gear 677, driven by the bevel gear 676 only during totalizing operations.

The movement of the gear 677 is transmitted through the shaft 1250 and gear 1249 to the gear 1247, which is driven, as viewed in Fig. 32, in a clockwise direction, one rotation for each cycle of operation of the machine. This, by means of the pin 1246, rotates the Geneva gear 1245 one-eighth of a rotation for each complete rotation of the gear 1247. The Geneva gear 1245 is divided into eight steps. The control strip will be advanced one step for each cycle of operation of the machine to bring a new group of perforations in position to control the selection of a new totalizer from a group and to control the recording of the group and the totalizer. The Geneva gear 1245 is locked during each cycle, except while it is being rotated, by means of a hub 1252 (Figs. 29 and 32) which is secured to the side of the gear 1247. The strip will be fed in the direction of the arrow (Fig. 5), or from right to left (Fig. 30).

The strip is in a loose roll which is put in a container 1255 and then fed over the drums 1234 and 1236 into a receptacle 1256, into which the strip loosely coils itself.

The means for putting a tension upon the strip, or holding the strip taut while it is being fed, comprises two tension rolls 1257 and 1258. The roll 1257 is mounted in parallel arms 1260 connected by a yoke 1261. These arms are loosely pivoted upon a shaft 1262 mounted in the frame 1238 and a frame 1263 which is supported between the frames 2 and 3. The roll 1258 is carried by parallel arms 1264 loosely mounted upon a stud 1265 supported by the frame 1238, which arms are made integral by means of a yoke 1266. The rolls 1257 and 1258 are held against the drums 1234 and 1236 respectively by means of springs 1267, which are stretched between pins on the frame 1238 and on the arms 1260 and 1264.

In order to put the paper upon the drums it is necessary that the rolls 1257 and 1258 be moved out of contact with the drums so that the paper may pass between the rolls and the drums. This means will now be described. An arm 1270 (Fig. 30) is integral with one of the arms 1264. This same arm carries a pin 1271 engaging a slot in a link 1272, the other end of which is pivotally mounted to one of the arms 1260.

Before attempting to put a control strip in the machine the operator moves the arm 1270 to the right, which moves the roll 1258 to the left and away from the drum 1236, and by means of a link 1272 the arms 1260 are moved counter-clockwise, thereby moving the roll 1257 away from the drum 1234. When the arm 1270 has been moved the required distance, a spring-actuated pawl 1273 engages underneath a projection 1274 on one of the arms 1264 and holds the rolls 1257 and 1258 away from the drums 1234 and 1236 so that it is not necessary for the operator to hold the arm 1270. After the strip has been properly placed on the drums the operator releases the pawl 1273 by raising an arm 1275 integral with said pawl. This allows the springs 1267 to return the rolls 1257 and 1258 to normal engaging position, which keeps the paper taut as it is being fed through the machine.

The means which cooperates with the control strip to cause the selection of the proper totalizer and the recording thereof, as determined by said strip, will now be described. Fig. 30 shows three analyzer contacts, 1278, 1279 and 1280, all insulated from each other and supported by a plate 1281 having parallel arms 1282 which are secured to the shaft 1262. There are ten groups of these contacts 1278, 1279 and 1280 which cooperate with the columns G—0 to G—9 of the control strip (Fig. 5).

The contacts 1278 and 1279 cooperate with a contact plate 1283, and the ten contacts 1280 contact with a plate 1284. A circuit must be completed through all three contacts before a totalizer can be selected and recorded. The two contacts 1279 and 1280 determine from which group the totalizer is to be selected, and the contact 1278 controls bank N so as to control recording mechanism so that the gear 1199 will be moved into operative relation with the proper one of the segments 1187, which in turn operates the selected group recording device. The plates 1283 and 1284 are insulated from each other and supported by a bracket 1285 secured to the frame 1238.

Also supported by the plate 1281 is a group of five contacts 1292, 1293, 1294, 1295 and 1296. These contacts cooperate with a contact plate 1297, also supported by the bracket 1285. These contacts and the plate are diagrammatically shown in Fig. 49A. They cooperate with the two columns of perforations in the strip (Fig. 5) under the heading of "totalizer selector", and after the group has been selected they determine which totalizer of the group shall be selected.

There are five other contacts 1286, 1287, 1288, 1289 and 1290, which are also carried by the plate 1281 and cooperate with a contact plate 1291. These are shown diagrammatically in Fig. 49C. They are controlled by the two right hand columns of Fig. 5 and control bank M so that it in turn will control the differential positioning of the selected recording devices which have been selected under control of the contact 1278. There is one other contact 1299 which is supported by the plate 1281. It cooperates with the plate 1283 and with the column represented by the dotted line at the left of Fig. 5. This contact controls certain circuits to open them should the control strip tear or become ruptured in any way. It also cooperates with a single perforation 1300 in this strip so as to stop the machine after all the totalizers, as determined by the strip, have been selected.

All of these contacts 1278, 1279, 1280, 1286, 1287, 1288, 1289, 1290, 1292, 1293, 1294, 1295, 1296 and 1299 are moved into engagement with their respective contact plates 1283, 1284, 1291 and 1297 once during each totalizing cycle of operation of the machine. The means for accomplishing this comprises an arm 1302 (Fig. 33), secured to the shaft 1262. This arm carries an anti-friction roller which engages a cam-race 1303 in a disk secured to the side of the gear 1247. This cam-race is of such a configuration that the arm 1302 and shaft 1262 are rocked first counter-clockwise and then clockwise once during each cycle of operation. The counter-clockwise movement of said shaft moves the above mentioned contacts into engagement with their respective contact plates, and wherever these contacts find perforations in the strip shown in Fig. 5 they will control electrical circuits which will cause the selection of a group of totalizers and a totalizer from the group, and will cause the selection of mechanism for recording the selected group and the totalizer selected from the group.

*Circuits*

The contact plate 1284 (Fig. 49B) is connected to the positive side of the circuit through switch G—S (Fig. 49A) and conductor 536. The contacts 1280 are connected directly to the conductors 1100 to 1109 inclusive, leading to the contact banks G—0, G—1, to G—9 inclusive, with which the several conductors are respectively connected.

The contact plate 1283 (Fig. 49B) controls the connections to the negative side of the line. The contacts 1279 are connected to the conductors 1120 to 1129 inclusive, leading from the contact banks G—0 to G—9 inclusive, respectively.

The contacts 1292, 1293, 1294, 1295 and 1296 (Fig. 49A) are connected to a group of conductors a, b, c, d and e, so that by a combination of two contacts ten different combinations can be effected. These contact positions have been lettered a, b, c, d and e in Fig. 6, which shows diagrammatically how the ten combinations are effected. The same marking of a, b, c, d and e is used in Fig. 49A for each of the contacts 1292 to 1296 inclusive. This group of conductors a, b, c, d and e to which these contacts 1292 to 1296 are connected are also connected by means of contact plates 1776, 1777, 1778, 1779, 1780 and contacts 1786, 1787, 1788, 1789, and 1790 of M—S switch to all the similar groups of conductors, a, b, c, d and e leading to the contact banks of the groups G—0, G—1, G—2, etc., to G—9 inclusive. By this means, this one group of five contacts 1292, 1293, 1294, 1295 and 1296 serves to select the individual totalizers from all the groups. To explain further, it is sufficient now to say that, assuming that the perforations are found in the *a* and *c* positions in the totalizer selecting columns of Fig. 5, a circuit will be completed through the contacts 1293 and 1296 which will select totalizer number two of the particular group under control. If a circuit is completed through the contacts 1292 and 1295, totalizer number nine of the particular group under control will be selected.

The contacts 1278 (Fig. 49B), by means of the bank N contact bank, control the position of the recording actuator so that the recording mechanism corresponding to the group selected will be selected.

These contacts 1278 are connected directly to the fixed contacts *l*—0, *l*—1 to *l*—9 of bank N by means of conductors 1310, 1311, 1312, 1313, 1314, 1315, 1316, 1317, 1318 and 1319 respectively.

The contacts 1286, 1287, 1288, 1289 and 1290 (Fig. 49C) are connected to the group of conductors *a*, *b*, *c*, *d* and *e*, which lead to the contacts of bank M. These positions for these contacts are designated *a*, *b*, *c*, *d* and *e* to correspond with the positions so designated in the diagram in Fig. 6, and by means of the combinations effected, these control the bank M differential mechanism so as to differentially position the selected recording devices to record the totalizer corresponding to that selected by the contacts 1292 to 1296 inclusive. The contacts for bank M are connected to the positive side of the line through the switch A—S (Fig. 49A). This bank M differential is identical in construction and operation with the rack differentials A—0 to A—9, and operates at the same time.

The circuit connections actually made during the clearing or record-making operations will now be described. Since the totalizers may be cleared in any order desired, depending upon the perforations in the control strip of Fig. 5, the circuits completed, as determined by the perforations in three top rows, which constitute the selecting perforations for one cycle of operation, will now be described.

It will be noticed that in the ten left hand columns, designated G—0 to G—9 inclusive, three perforations appear in column G—2. The top perforation is in position to cooperate with one of the contacts 1278, the second perforation cooperates with the contact 1279, and the third one with the contact 1280. The two bottom perforations, through the contacts 1279 and 1280 determine from which group the totalizer is to be selected. In other words, they complete a circuit only to the group from which the totalizer is to be selected. The top perforation, which cooperated with the contact 1278, controls bank N, and this circuit will be described in connection with the recording circuits.

In the next two columns perforations appear in the *a* and *c* positions, which, according to the diagram in Fig. 6, represent "2", which means that totalizer number two in group G—2, is to be selected. These two positions, *a* and *c*, cooperate with the contacts 1293 and 1296 of Fig. 49A to cause the group differential G—2 to stop in position two so that totalizer number two in this group will be selected.

The circuits completed for the selection of this group and this particular totalizer will be as follows: from the positive side of the generator (Fig. 49A), through G—S switch (now closed), to point 535 (Fig. 49B), to conductor 536 to point 1304, to contact plate 1284, contact 1280, which is connected to conductor 1102, through this conductor to point 530 for group G—2, through line contact 110, movable contact 101, fixed contact *l*—2, through conductor *a* for this group (Figs. 49B, 49D, 49C), to contact 1786 for this line, through contact plate 1776 through another contact 1786 to line *a* leading to contact 1293, through this contact 1293, contact plate 1297, contact 1296 through line *c* leading to contact 1788, through this contact, through plate 1778, out through contact 1788 leading to conductor *c* (Fig. 49C), for group G—2, through conductor *c* (Figs. 49C, 49D, 49B), to fixed contact *r*—2 of group G—2, movable contact 102, line contact 111, magnet 84, conductor 1122, to contact 1279 connected to this conductor, contact plate 1283, conductor 1305 to point 1306 on the negative line. The energization of the magnet 84 closes the locking circuit through the switch 580, which circuit is from point 530 of group G—2, through conductor 582, switch 580, conductor 583 to point 584, through magnet 84 to the negative line 1122.

Since all of the driving members of the shaft differentials are moving in unison, this means that as soon as the contacts for the bank G—2 reach the contact *l*—2 and *r*—2, a circuit will be completed through the magnet 84. The magnet will be energized and the differential stopped with totalizer number two in rack-engaging position. While the contact members for all of the other banks will also be moved down, no circuits will be completed through any of the other magnets 84 because their connections to both sides of the supply line are all interrupted, and these differentials and contact members will all pass idly to their last position, and the totalizer shafts will all be moved to their blank positions.

As soon as the totalizers have been lowered into position by the devices provided for that purpose, the actuating racks are brought into engagement therewith. Those racks which engage denominational elements representing data are stopped when the long teeth 320 actuate the zero stops for those particular racks; but those actuating racks which engage the denominational elements standing at zero give their totalizer elements a complete rotation, and in passing from "1" to "0" the zero stops 915 are actuated and the racks are stopped.

The zero stop mechanism effects the closing of the contacts 700, one pair of which is provided for the magnet 84 of each amount bank. As soon as these circuits are closed current passes from the positive side of the generator (Fig. 49A), through control switch A—S (then closed), through conductor 1130 (Figs. 49A, 49B, 49D) to the upper contact of the pair of contacts 700 for the set being selected (in this case set A—2), through the other contact of switch 700, conductor 583 to point 584, through the magnet 84, to point 1132 on the negative line 1133. This causes the magnet to be energized and the differential controlled thereby to be stopped.

The setting of the amount differential in the manner just described causes the segments 756 (Figs. 16, 17 and 18) to be positioned differentially, which, in turn, position the amount punch actuators 844 and the amount printing wheels 751, so that the punches when operated shall punch the group of holes required by the data, and the printing wheels shall print numbers corresponding to the positions required.

According to the circuits completed above, totalizer number two in group G—2 has been selected and reset to zero and the amount thereon has been printed and perforated on the summary record.

The top perforation in the column G—2 which as before stated controls bank N differential, controls it in such a manner that the circuit will be completed through one of the fixed contacts of this bank and its differential mechanism moved a corresponding distance so as to cause the selection of the proper one of the totalizer recording type wheels and the proper set of totalizer recording punches so that the recording will be in a column on the summary record corresponding to the group from which the totalizer is selected. As this totalizer was selected from the group G—2, the recording thereof will be in column G—2 of the summary record, and due to the fact that the recording is in this column, it designates from which group the totalizer has been selected.

The circuit completed by this perforation in the top row of Fig. 5 in column G—2 is from the positive side of the generator, through switch G—S (Fig. 49A) to point 535 (Fig. 49B), through conductor 1307, to magnet 84 for bank N, through this magnet to line contact 110, through movable contact 101, fixed contact l—2, conductor 1312, to contact 1278 connected thereto, through contact plate 1283, conductor 1305, to point 1306 on the negative line. This energizes bank N magnet and the locking circuit is thus completed from magnet 84 through conductor 1308, switch 580 to point 1309 on the negative line 1133.

The energization of bank N magnet causes the differential to stop in position two, which will cause the gear 1199 (Fig. 8) to be shifted into operative position with the segment 1187 for position two of bank N. This is the third segment counting from the left in Fig. 8. This, through the gear 1186, sleeve 1185 and gear 1183 picks out the type wheel 1181 for position two, or the third one from the left (Fig. 46). This causes the selection of the punches 1180 for position two, or the third column from the left (Fig. 46).

The distance which this selected type wheel 1181 is to be rotated, and the particular ones of the punches 1180 to be selected so as to record the particular totalizer which has been selected from the selected group, is under control of the perforations in the two right hand columns (Fig. 5) which control bank M and its differential mechanism to set this type wheel and select these punches according to the location of the perforations in these two columns on the record control sheet.

The perforations in these two columns must be made identical as to location with the perforations in the two columns headed "Totalizer selector", and as the perforations in the totalizer selector columns are in the a and c positions, the perforations in the totalizer recorded selector columns of bank M are in the a and c positions. The perforation in position a cooperates with the contact 1287 (Fig. 49C), and the perforation in position c cooperates with the contact 1290, and these two control the bank M differential mechanism.

The circuits completed by means of these two perforations are as follows: From the positive side of the generator (Fig. 49A), through switch A—S, conductor 1130 (Figs. 49A, 49B, 49D, 49C), to line contact 110 of bank M set, through movable contact 101, fixed contact l—2, conductor a, to contact 1287, through contact plate 1291, contact 1290, through conductor c, to fixed contact r—2, movable contact 102, line contact 111, through magnet 84 of bank M, to the negative line 1133. This controls bank M differential so that it will stop in position two, which, through the beam 761 (Fig. 21), will rotate the segment 1215, and through the gear 1216, shaft 1195 will rotate the gear 1199 (Fig. 13), which has been moved into engagement with the selected segment 1187 and cause this segment to be moved a distance commensurate with the movement of bank M differential. The movement of this segment 1187 through the gear 1186, sleeve 1185 and gear 1183, moves the type wheel 1181 (Fig. 46) so as to set the type face thereon in printing position to print the name of the particular totalizer, which in this case is totalizer number two in group No. 2 and herein named the "fixture" totalizer. The differential setting of the gear 1183 by means of the gear 1223 (Figs. 46 and 47) sets the punch actuator 1222 so that the punches in the I and III positions will be selected, which perforates holes representing 2, or the fixture totalizer.

Thus it can be seen that the perforations in the three top rows of Fig. 5 control the selection of the group, the selection of the totalizer from the group, the selection of the recording devices which are to be actuated, and the differential positioning of the recording devices so as to print and perforate in a particular column on the summary strip to designate the totalizer and the group from which it is selected; and that the switches 700, by means of the zero stop mechanism, control the A—0 to A—9 differential sets to set the punches and printing elements to punch and print a record of the data of the totalizer which is cleared.

The perforations in the second three rows of Fig. 5 appear in the column G—2, which will select the second group, and the same type wheel and punch actuator will be selected. The perforations in the totalizer selector columns are in the $a$ and $b$ positions, which according to the diagram in Fig. 6 will cause this differential mechanism to stop in position three, which will cause the selection of this corresponding totalizer by means of circuits completed through the contacts 1293 and 1294, and the perforations in the two right hand columns through the contacts 1287 and 1288 will control bank M so that it stops in position three, and the type wheel and the punch actuator will be set accordingly.

In the third group of three rows of perforations in Fig. 5, it will be noticed that a single perforation appears in the top row of column G—2, but that there are no perforations in the totalizer selector columns and the totalizer recording columns. This causes the machine to make a blank or idle operation for the purpose of allowing the bank M differential mechanism to assume its normal position to restore the type wheel and punch actuator, associated with group G—2, to their normal positions. Now when a new group is selected the type wheel for group G—2 will print a star (*) and the punches will not be operated.

During the blank operation the rack differential sets A—0 to A—9 go to their extreme positions and set the type wheels 751 in their small zero (0) positions. The punch actuators 844 are also moved to their normal positions in which they will operate the punches 750 in the I and IV positions and thus perforate representative of zero.

In the fourth group of perforations the perforations appear in the column G—3, which will complete circuits through the group G—3 (Fig. 49B), but as these circuits are similar to the others, except that they go through the group G—3 differential instead of group G—2, it is not thought necessary to further describe circuits for the selection of the groups or the totalizers.

The only circuit that may be slightly different from the others is the circuit through the group G—0. It will be noticed that, while the group of conductors $a$, $b$, $c$, $d$ and $e$, leading from the group bank G—0 (Fig. 49B), are connected to the several contacts 1776 to 1780 inclusive (Fig. 49A), by means of the contacts 1786 to 1790 respectively, when this group is active current does not actually pass through these contacts, but goes directly to the contacts 1292, 1293, 1294, 1295 and 1296, while in all other groups the current passes to and through the several contacts 1776 to 1780, and 1786 to 1790, depending upon the conductors in use, and thence to the conductors $a$, $b$, $c$, $d$ and $e$ leading to the contacts 1292 to 1296. In other words, the contacts 1776 to 1780 inclusive, of M—S switch connect together all of the group sets of conductors $a$, $b$, $c$, $d$ and $e$ to the conductors $a$, $b$, $c$, $d$ and $e$ which lead to the contacts 1292 to 1296 inclusive.

Attention is also directed to the switch G—S (Fig. 49A), previously mentioned. This switch controls the circuit leading to the group banks G—0 to G—9 and bank N. This switch is mounted on the frame 5 (Figs. 7A, 23 and 28), and is actuated by an arm 985 having a cam roller 986 actuated by a cam 987 fast on the shaft 14 which transmits motion to the shaft actuators. The switch G—S is thus closed and opened once during each adding and totalizing cycle of the machine.

Another switch A—S controls the circuits leading to the amount bank sets A—0 to A—9. This switch is mounted on the base 1 (Figs. 10, 18 and 29), and is actuated by an arm 990 operated by a lever 991 pivoted on the shaft 650 and driven by a cam 992 fast on the shaft 10. This switch A—S is also closed and opened once during each adding and totalizing cycle of the machine.

During the blank cycle of operation following the last totalizer selected, the perforation 1300 in the left hand column of Fig. 5 comes into register with the contact 1299 (Fig. 29) to cause the machine to stop. The circuit controlled when this perforation registers with said contact will be hereinafter described when the general controls of the machine are discussed.

SUMMARY RECORD ANALYZING MACHINE

The machine as adjusted to perform the third function, namely, that of compiling data from a plurality of summary records, will now be considered. The machine is adjusted with the analyzers in operation and with the record making devices disconnected, just as when analyzing detail records. In fact, the machine operates in identically the same manner when analyzing a summary record as it does when analyzing a detail record except that only one totalizer is selected at a time instead of a plurality. The reason for this is that when the summary record is produced only one totalizer at a time is cleared. Therefore, the data from only one totalizer at a time can be printed and perforated. Hence, when analyzing this record it is possible to select only one totalizer, while when analyzing the detail record, which is made on the machine described in the previously mentioned Goldberg Patents, Nos. 1,506,056 and 1,657,712, the detail record is so printed and perforated that it is capable of selecting a plurality of totalizers for the simultaneous entry of the same data into all of the totalizers selected.

It is not thought necessary to go into any further description, nor to trace any of the circuits when analyzing a summary record, as this will be clearly understood from those given in connection with the analyzation of the detail record.

Grand Summary Record Producing Machine

The fourth function which the machine is adapted to perform is that of producing a grand summary record, that is, a record of the totalizers of the machine after a plurality of summary records has been compiled thereby.

When producing such a record, the machine is adjusted and functions just as it does when producing the summary record itself. In fact there is no structural difference between the summary record and the grand summary record and one cannot be distinguished from the other except by the amounts which may be represented by the perforations or the printed data thereon.

Inasmuch as the operation is the same as in the production of the summary record and the machine functions in exactly the same way, a description thereof while thus operating would be a mere repetition of the description and of the construction and operation when totalizing; no further reference therefore to this phase of the machine is necessary.

General Controls

The machine is provided with various switches, magnets and circuits which serve to control its operations. Some of these have already been described. In addition to controlling the operations of the machine they particularly force the operator to proceed in a predetermined manner in order that the machine may be properly started, either during adding or clearing operations and cause the machine to stop either at the end of some particular operation or upon some abnormal condition arising, such as the breaking of the paper etc. These devices will now be described, and particular reference will be made to Figs. 43, 44 and 49A, 49B, 49C and 49D.

As already stated, the machine is driven by an electric motor 15 which receives current from some external source, but the magnets which operate the various parts of the machine derive current from a motor generator M—G, which likewise takes current from some external source, but provides current of the proper potential for this purpose. Both the motor 15, which drives the machine, and the motor of the motor generator set, are provided with switches which are under the control of various devices intended to compel the closing or opening of the motor circuits in a particular order or under special circumstances. As in all machines of this class, it is essential that the main driving motor stop and start with the parts in a certain definite order. Provision is therefore made for closing this circuit in a particular manner and for opening it at a particular point in the cycle of operation. It is also essential that the motor generator be energized and that other adjustments of the machine be normal before the main driving motor is energized.

The machine is started by the push button or key 1000, heretofore described. The circuit to the motor M of the motor generator set is controlled by a switch 1001 (Fig. 49A) which is closed by a hand lever 1002. This lever, when moved, and when the machine is delivering current in the intended manner, is held in the moved position by a holding magnet 1003.

Current to the main driving motor 15 is controlled by a main switch 1004 (Figs. 44 and 49A), which is closed under control of the starting key 1000. This key controls devices which require a predetermined condition of the structure and of the circuits before the switch can be closed and before the key can be held in its depressed position.

The key 1000 is mounted upon a stem 1005 having a guide slot 1006 running over a pin 1007 and has its lower end pivotally secured to the lever 565, heretofore described. This lever is rigidly secured to the shaft 516, and another lever 1009 (Fig. 44) is likewise rigidly connected to the shaft so as to be actuated directly by the key 1000. This last mentioned lever 1009 carries a somewhat elongated pin 1010 which extends through the lever so that it may be engaged on either side of the lever 1009 (Fig. 8). A spring 1011 (Fig. 43), having one end secured to the key stem and the other end to the frame of the machine, tends to restore the key to its normal position.

The closing of the starting switch 1004 is effected by means of a lever 1012 (Fig. 44) pivoted upon a shaft 1013. This lever has an extension 1014 which normally rests against the short end of the pin 1010; the lever 1012 therefore cannot be raised until after the pin 1010 has been moved away. The lever 1012 is further provided with a notch 1015 which coacts with other parts to be described. The end of the lever 1012 is also provided with a hook 1016 by means of which the switch 1004 is directly actuated. A spring 1017, having one end attached to the lever and the other end to the frame of the machine, tends to lift the lever. The lever 633, heretofore described, which controls the main motor clutch, is also mounted upon the lever 1012 so that as said lever rises under the influence of its spring 1017 it carries with it this lever 633, thereby unlocking the clutch and permitting the machine to start.

The switch 1004 consists of two movable contacts and a stationary contact (Fig. 42). A lever 1018 (Figs. 42, 43 and 44), having an extension 1019 upon which is an insulating face 1020, serves to depress the movable elements of the switch. This lever carries a roller 1021 which is adapted to be engaged by the hook 1016 of the lever 1012. As the latter rises, the hook 1016 acting upon the roller 1021 brings the movable contacts of the switch 1004 into engagement with the fixed contact.

Mounted upon the shaft 1013 adjacent the lever 1012 is a bell crank 1022, one end of which has a roller which enters a race-way 1023 cut in the side of the gear 22, while the other side has a slot 1025, which under certain circumstances registers with the notch 1015 in the lever 1012.

A pin 1026 projects through the notch 1015 and slot 1025 and locks the lever 1012 and bell crank 1022 together, but the pin 1026 may be moved radially to disengage these parts. To this end the pin is movably connected with a lever 1027 pivoted at 1028 and having attached thereto an armature 1029 which is under the control of a magnet 1030. A spring 1031, having one end attached to the lever 1027 by means of a pin 1032, and the other end attached to a rod 1033, tends to draw the armature away from the magnet and cause the locking pin 1026 to engage the notch 1015 and slot 1025.

The starting key 1000 is normally locked against displacement by a hook 1034 (Fig. 43) pivoted at 1035 and has secured thereto an armature 1036 actuated by a magnet 1037. A spring 1038, having one end attached to the armature and the other end attached to the rod 1033, tends to keep the hook 1034 normally in the path of the pin 1010. So long as the parts maintain these positions the key 1000 cannot be depressed, but if the magnet 1037 is energized it will draw up its armature, withdraw the hook and permit the key to be depressed.

A second hook 1041, adapted to cooperate with the pin 1010, is used to prevent the starting of the machine when adjusted for totalizing operations until all of the parts are in proper working order. This hook is pivoted at 1042 (Fig. 44), and has attached thereto an armature 1043 arranged to be acted upon by a magnet 1044. A spring 1045 attached to the armature at 1046, and with the other end secured to the rod 1033, tends to withdraw the armature from the magnet and to retain the hook normally out of the path of the pin 1010.

Attention is now directed to another controlling switch 1047 (Fig. 43), used to prevent the starting of the machine unless the parts are properly arranged, and to stop the machine under certain abnormal conditions. The switch 1047 is actuated by an armature lever 1048 under influence of a magnet 1049, the circuit of which will be hereinafter described.

Another switch 1050 (Fig. 19) is used to stop the machine at the end of an analyzing operation. The switch is placed in the path of one of the actuator racks 115 and operated by a lever 1051. The circuit of this switch will also be hereinafter described.

Another switch 1052, Figs, 8 and 43) is used to effect control under certain special conditions. It is arranged adjacent the analyzing mechanism and is actuated by a post 1053 on the lever 557, which it will be remembered is actuated by the arm 558, attached to the shaft 418 of the latch 417, so that the switch 1052 is closed whenever the latch is locked, and opened whenever the latch is unlocked.

Still another switch, 1054 (Fig. 44), operated by an arm 1055, fast on the shaft 516, which is actuated by the starting key 1000 is shown in the circuit of magnet 1030 (Fig. 49A).

Another switch 1355 (Figs. 42 and 49A), is mounted adjacent the switch 619 and is operated by the arm 608 which controls the switch 619. This switch 1355 is open, when the machine is adjusted for analyzing, and closed, when the machine is adjusted for totalizing, under control of the manual shaft 600. This switch is in the circuit of magnet 1030 as will be hereinafter pointed out.

As the starting key 1000 is depressed it oscillates the shaft 516, and with it the arm 1055, thereby closing the switch 1054. When the key rises, the shaft 516 is rotated reversely and the arm 1055 causes the switch 1054 to open.

Current from the generator side G of the motor generator is used to energize the various controlling magnets, including the magnet 1003, which operates the switch for the motor side of the motor generator set itself. The armature 1002 is to be depressed by hand to close the switch 1001 of the motor of the motor generator set, and the armature is to be held down by magnet 1003, through which current from the generator side of the motor generator set flows. Therefore, unless current passes through the magnet 1003 the circuit for the motor part of the motor generator will not maintain itself. Certain switches are arranged in series with the magnet 1003, all of which must be closed before current can pass there-through.

Two conditions are to be considered; one where the machine is to be used for analyzing either detail or summary records, and the other where it is used as a totalizing or record producing machine. These conditions will be considered in the order given.

When used as an analyzing machine, the switches in series with the magnet circuit 1003 (Fig. 49A), are 622, 1047 and 1050. Of these, 622 is controlled by the manual shaft 600, and the actuator therefor is so arranged that in the analyzing position this switch is closed, while in the totalizing position it is open. Switch 1047 is under control of the magnet 1049, which in turn is controlled by the contacts 568 and 569, which will come into contact when there is no paper in the carriage and the magnet 1049 will be energized by the current which passes from the positive side of the motor generator to point 1330, through conductor 1331, magnet 1049, conductor 1332, brush 573, contacts 568 and 569 and brush 574 to point 1333, through conductor 1334 to point 1335 on the negative line 1133, thereby immediately energizing the magnet and breaking the contacts of the switch 1047.

This will immediately release the armature 1002, thereby opening the switch for the motor of the motor generator set. The failure of the circuit through magnet 1003 to remain energized is therefore an indication that no record has been put in position. In the same manner, should the record be ruptured while running through the machine these contacts 568 and 569 will be closed, thereby energizing the magnet 1049 which stops the motor of the motor generator set.

The third switch 1050 is under the control of the units actuator rack and is opened by this rack coming into physical contact with the lever 1051 whenever the rack is permitted to go to its maximum position. This happens whenever the analysis of a record is completed and the analyzer comes down upon a blank space; no circuits being then formed, all of the racks will go to their extreme positions. The units rack is selected as a means for actuating this element because this rack will normally have started upon its return movement before the machine comes to its home position, while the higher denominational racks do not return until the beginning of the succeeding cycle of operation.

The starting key 1000 is normally locked against depression by the hook 1034, which is under the control of the magnet 1037, which in turn is energized by current from the motor generator. The magnet 1037 is, however, in circuit with certain other controlling devices, all of which must be closed before current can be passed therethrough. These devices are the switch 621, the switch 1052 and the special contacts 526 and 548. Of these, the switch 621 is under the control of the manual shaft 600 through the lever 615 (Fig. 44) and is closed when the machine is adjusted for analyzing and is open when the machine is adjusted for totalizing or record producing operations. Switch 1052 is under the control of the mechanism which locks the carriage mechanism in position; as the carriage is locked, the contacts forming this switch are closed, so that current passes therethrough. If the carriage is not properly locked in place these contacts will remain open. The contacts 526 and 548 have been heretofore referred to and are used in connection with the special column C of perforations with which both the detail and the summary records are provided.

The circuit for the starting magnet 1037 (Fig. 49A) is therefore from the positive side of the generator, through conductor 1336, switch 1052, conductor 1337, magnet 1037, conductor 1338, switch 621, conductor 1339, control contacts 526, 548, conductor 1340, to point 1333 on the negative side of the line. If any of these switches or contacts are open no current will pass through the magnet 1037 and the hook 1034 will remain in position, and the key 1000 cannot be depressed. However, if the machine is properly adjusted and the switch 621 therefore closed; and if the carriage is properly locked in position and the switch contacts 1052 therefore closed; and if a record is properly placed in position so that one of the contacts 526, 548 completes the circuit at this point, current will pass through the magnet 1037, the magnet will be energized, the hook 1034 will be withdrawn and the starting key 1000 may be depressed.

However, even assuming the circuits are properly made as described, the machine will not yet start until the magnet 1030 shall have been energized. This magnet controls the locking pin 1026, which locks together the lever 1012 and bell crank 1022. The magnet 1030 has in circuit therewith a switch 1054 controlled by an arm 1055, which in turn is controlled by the starting key 1000. As the starting key is depressed the arm 1055 (Fig. 44) causes the switch 1054 to be closed and current passes from the positive side of the generator (Fig. 49A), through conductor 1345 to point 1346, thence through conductor 1347, magnet 1030, conductor 1348, switch 1054, through conductor 1349 to point 1350, switch 1047, conductor 1351, switch 1050, switch 622 to the negative side of the line. This energizes the magnet 1030, which thereupon attracts its armature 1029, withdraws the locking pin 1026 and permits the arm 1012 to rise under the influence of its spring 1017, thereby closing the circuit of the main motor 15. This motor thereupon starts and the machine begins to pass through the several cycles required by the analysis of the record.

Should the machine continue in operation until the analysis is complete, the analyzer as a whole will eventually come down upon an unperforated portion of the record, the actuating racks will then be uncontrolled and will go to their extreme positions, the units rack will actuate the lever 1051 and open the switch 1050, thereby de-energizing magnets 1003 and 1030 thus stopping the motor generator and the motor which stops the machine.

Should the paper break, the contacts 568 and 569 will come together and stop the machine substantially as described above, by de-energizing the magnet 1030, whereupon the locking pin 1026 locks the levers 1012 and 1022 together as soon as the slots in these respective parts come into register, and the machine is brought to a stop.

When the machine is adjusted as a totalizing machine the actuation of the manual shaft 600 opens the switches 621 and 622 and closes the switches 619, 620 and 1355 (Fig. 42). The circuit which now unlocks the starting key is from the positive side of the generator (Fig. 49A), through conductor 1336, switch 1052, conductor 1337, magnet 1037, conductor 1338, switch 620 (now closed), to point 1352 on the negative side of the line. At the same time, current flows in parallel from the positive side of the generator, through conductor 1345 to point 1346, thence through conductor 1347, magnet 1030, conductor 1348, switch 1054, conductor 1349, to point 1350, where it joins the circuit through switch 1047. From here it goes through conductor 1351, switch 1355 (now closed) to point 1356 on the negative line. This energizes the magnet 1030 and withdraws the locking pin 1026 so as to permit the lever 1012 to rise under the influence of its spring 1017 and close the circuit by closing the switch 1004 to the main motor 1015.

Means is also provided for preventing the starting of the machine for totalizing operations unless the same has been provided with blank record material. This consists of the arm 1041 controlled by the magnet 1044. This controlling circuit is as follows: From the positive side of the generator (Fig. 49A), through conductor 1336, switch 1052, conductor 1337, to point 1357, through magnet 1044, through conductor 1358, to switch 619 (now closed), through conductor 1339, to contacts 526 and 548, through conductor 1340, to the negative side of the line. The magnet 1044 will thus be energized and the hook 1041 thrown into the path of the pin 1010 so that the starting key 1000 cannot be depressed. If, however, record material is in position, the contacts 526, 548 are broken; therefore the magnet 1044 cannot be energized and the starting key can be depressed.

When operating to totalize, the machine is normally stopped by the closing of a circuit through the hole 1300 in the extreme left hand column of the totalizer selecting strip of Fig. 5 by means of the contacts 1299 and 1283 (Fig. 49B). This circuit will be as follows: From the positive side of the generator (Fig. 49A), to point 1330, thence through conductor 1331, magnet 1049, conductor 1360 (Figs. 49A, 49B), to contact 1299, contact plate 1283, conductor 1305, to point 1306 on the negative line. This causes the energization of the magnet 1049 and opens the switch 1047 thus de-energizing the magnets 1003 and 1030, the de-energization of magnet 1030 allowing the pin 1026 to again couple together the lever 1012 and bell crank 1022, thus causing the arm 633 to come into operative engagement with the motor clutch and stop the machine.

Assuming the operator desires to analyze either a detail or a summary record, the record is inserted into the machine and adjusted until the left hand contact 526 makes circuit with the contact 548. The carriage locking devices are then brought to position and in so doing the switch 1052 is closed. The operator then depresses the lever 1002, thereby closing the switch 1001 and energizing the motor of the motor generator set. If the parts are in the positions intended, current will then flow from the positive side of the generator (Fig. 49A) through conductor 1345, through the magnet 1003, through conductor 1361 to point 1350, thence through switch 1047, conductor 1351, switch 1050, switch 622, to the negative line, thereby holding the magnet 1003 energized. Current will also flow from the positive side of the generator, through conductor 1336, through switch 1052, conductor 1337, magnet 1037, conductor 1338, switch 621 (now closed), conductor 1339, contacts 526, 548, conductor 1340 to point 1333 on the negative side of the line, thereby energizing the magnet 1037 and thus unlocking the starting key 1000. As the starting key is depressed it closes switch 1054 and current flows from the positive side of the generator through conductor 1345, to point 1346, conductor 1347, magnet 1030, conductor 1348, switch 1054, conductor 1349 to point 1350, thence through switch 1047, conductor 1351, switch 1050, then switch 622 to the negative side of the line, thereby energizing the magnet 1030, which withdraws the pin 1026, permitting the lever 1012 to rise, whereby its hook 1016 closes the switch 1004, thus completing the circuit through the main motor 15, which then begins to run.

Should no paper be in the machine the contacts 568 and 569 come together, which energizes the magnet 1049, thus opening the switch 1047 and the motor generator circuit is broken.

Should the record be in the machine and be improperly placed so that the contacts 526 and 548 do not come together, no current can pass through the magnet 1037 and the starting key cannot be depressed.

Should an attempt be made to start the machine without locking the carriage in place, the switch 1052 will be opened and no current will pass through the magnet 1037 and the starting key cannot be depressed.

As the key 1000 is depressed it causes the pin 566 (Fig. 43) to engage the lever 553 and thereby raise the contact 526 from off the contact 548 and breaks the circuit through the magnet 1037. The hook of the lever 1034 is then retracted but this will not prevent depression of the starting key, for by this time the pin 1010 is beneath the hook. When the analysis of the record shall have been completed, the next movement of the record strip will bring an unperforated section of the record beneath the analyzer. As the analyzer is depressed none of its contacts will make circuit, all of the actuator racks will then make their maximum movements and one of them, in this case the units rack, will strike the lever 1051 and open the switch 1050. This will de-energize magnet 1003 and stop the motor generator set; it will also de-energize the magnet 1030 and the pin 1026 will be thrown into position to lock together the lever 1012 and the bell crank 1022 as soon as the slots in these elements register, which they do once during each cycle of operation of the machine. The lever 1012 will then be lowered and the switch 1004 will open, thereby stopping the main motor.

When the machine is being operated as a totalizer, that is, to produce a summary or grand summary record, it is started in the same manner as when operated as an analyzer, but when the record has been completed it is brought to a stop by means of a circuit completed through the perforation 1300 as it registers with the contacts 1299 and 1283, thus energizing the magnet 1049, which opens the switch 1047 and deenergizes the magnets 1003 and 1030, thereby stopping both the motor generator and the main motor of the machine.

While the form of mechanism herein shown and described is admirably adapted to fulfill the objects primarly stated, it is to be understood that it is not intended to confine the invention to the one form or embodiment herein disclosed, for it is susceptible of embodiment in various forms all coming within the scope of the claims which follow.

What is claimed is:

1. In a machine of the class described, the combination of groups of totalizers, means for selecting any totalizer in any group, means for restoring the selected totalizer to zero, a plurality of recording devices one for each group of totalizers, and means for selecting the device associated with the group from which the totalizer is selected.

2. In a machine of the class described, the combination of groups of totalizers, means for selecting any totalizer in any group for restoring it to zero, a plurality of recording devices one for each group of totalizers, and means common to all of said recording devices for selecting the device associated with the group from which the totalizer is selected.

3. In a machine of the class described, the combination of groups of totalizers, means for selecting any totalizer in any group for restoring it to zero, a plurality of recording devices one for each group of totalizers, means common to all of said recording devices for selecting the device associated with the group from which the totalizer is selected, and means for controlling said selecting means.

4. In a machine of the class described, the combination of groups of totalizers, means for selecting any totalizer in any group for restoring it to zero, a plurality of recording devices one for each group of totalizers and strip controlled means common to all of said recording devices for selecting the device associated with the group from which the totalizer is selected.

5. In a machine of the class described, the combination of groups of totalizers, means for selecting any totalizer in any group for restoring it to zero, a plurality of recording devices one for each group of totalizers, means common to all of said recording devices for selecting the device associated with the group from which the totalizer is selected, and strip controlled means for controlling said selecting means.

6. In a machine of the class described, the combination of groups of totalizers, means for selecting any totalizer in any group for restoring it to zero, a plurality of recording devices one for each group of totalizers, and electro-magnetic means for selecting the device associated with the group from which the totalizer is selected.

7. In a machine of the class described, the combination of groups of totalizers, means for selecting any totalizer in any group for restoring it to zero, a plurality of recording devices one for each group of totalizers, means for selecting the device associated with the group from which the totalizer is selected, and means for actuating the selected device to record the selected totalizer.

8. In a machine of the class described, the combination of groups of totalizers, means for selecting any totalizer in any group for restoring it to zero, a plurality of recording devices one for each group of totalizers, means for selecting the device associated with the group from which the totalizer is selected, and means common to all recording devices for actuating the selected device to record the selected totalizer.

9. In a machine of the class described, the combination of groups of totalizers, means for selecting any totalizer in any group for restoring it to zero, a plurality of recording devices one for each group of totalizers, means for selecting the device associated with the group from which the totalizer is selected, and strip controlled means common to all recording devices for actuating the selected device to record the selected totalizer.

10. In a machine of the class described, the combination of groups of totalizers, electromagnetic means for selecting any totalizer in any group for restoring it to zero, a plurality of recording devices one for each group of totalizers, and means for selecting the device associated with the group from which the totalizer is selected.

11. In a machine of the class described, the combination of groups of totalizers, electro-magnetic means for selecting any totalizer in any group for restoring it to zero, a plurality of recording devices one for each group of totalizers, and means for selecting the device associated with the group from which the totalizer is selected and for actuating the selected device to record the selected totalizer.

12. In a machine of the class described, the combination of groups of totalizers, electro-magnetic means for selecting any totalizer in any group for restoring it to zero, a plurality of recording devices one for each group of totalizers, means for selecting the device associated with the group from which the totalizer is selected, and electro-magnetic means for actuating the selected device to record the selected totalizer.

13. In a machine of the class described, the combination of groups of totalizers, means for selecting any totalizer in any group for restoring it to zero, a plurality of recording devices one for each group of totalizers, means for selecting the device associated with the group from which the totalizer is selected, and differential mechanism for actuating the selected device to record the selected totalizer.

14. In a machine of the class described, the combination of groups of totalizers, means for selecting any totalizer in any group for restoring it to zero, a plurality of recording devices one for each group of totalizers, and differential mechanism for selecting the device associated with the group from which the totalizer is selected.

15. In a machine of the class described, the combination of groups of totalizers, means for selecting any totalizer in any group for restoring it to zero, a plurality of recording devices one for each group of totalizers, differential mechanism for selecting the device associated with the group from which the totalizer is selected, and means for actuating the selected device to record the selected totalizer.

16. In a machine of the class described, the combination of groups of totalizers, means for selecting any totalizer in any group for restoring it to zero, a plurality of recording devices one for each group of totalizers, differential mechanism for selecting the device associated with the group from which the totalizer is selected, and electro-magnetic means for actuating the selected device to record the selected totalizer.

17. In a machine of the class described, the combination of groups of totalizers, electro-magnetic means for selecting any totalizer in any group for restoring it to zero, a plurality of recording devices one for each group of totalizers, differential mechanism for selecting the device associated with the group from which the totalizer is selected, and means for actuating the selected device to record the selected totalizer.

18. In a machine of the class described, the combination of groups of totalizers, electro-magnetic means for selecting any totalizer in any group for restoring it to zero, a plurality of recording devices one for each group of totalizers, differential mechanism for selecting the device associated with the group from which the totalizer is selected, and differential mechanism for actuating the selected device to record the selected totalizer.

19. In a machine of the class described, the combinations of groups of totalizers, means for selecting any totalizer in any group for restoring it to zero, a plurality of recording devices one for each group of totalizers, a common actuator for said devices, and means for moving said actuator into operative relation with any of said devices depending upon the totalizer selection.

20. In a machine of the class described, the combination of groups of totalizers, means for selecting any totalizer in any group for restoring it to zero, a plurality of recording devices one for each group of totalizers, a common actuator for said devices, and strip controlled means for moving said actuator into operative relation with any of said devices depending upon the totalizer selected.

21. In a machine of the class described, the combination of groups of totalizers, means for selecting any totalizer in any group for restoring it to zero, a plurality of recording devices one for each group of totalizers, a common actuator for said devices, and strip controlled means for moving said actuator laterally into operative relation with any of said devices depending upon the totalizer selected.

22. In a machine of the class described, the combination of groups of totalizers, means for selecting any totalizer in any group for restoring it to zero, a plurality of recording devices equal in number to the groups, a common actuator for said devices, means for moving said actuator into operative relation with any of said devices depending upon the totalizer selection, and means for moving said actuator into engagement with the selected device.

23. In a machine of the class described, the combination of groups of totalizers, means for selecting any totalizer in any group for restoring it to zero, a plurality of recording devices equal in number to the groups, a common actuator for said devices, means for moving said actuator into operative relation with any of said devices depending upon the totalizer selection, means for moving said actuator into engagement with the selected device, and means for determining the effectivity of said moving means.

24. In a machine of the class described, the combination of groups of totalizers, means for selecting any totalizer in any group for restoring it to zero, a plurality of recording devices equal in number to the groups, a common actuator for said devices, means for moving said actuator into operative relation with any of said devices depending upon the totalizer selection, means for moving said actuator into engagement with the selected device, and manually controlled means for controlling said moving means.

25. In a machine of the class described, the combination of groups of totalizers, means for selecting any totalizer in any group for restoring it to zero, a plurality of recording devices one for each group of totalizers, a common actuator for said devices, strip controlled means for moving said actuator laterally into operative relation with any of said devices depending upon the totalizer selected, and means for moving said actuator into engagement with the selected device.

26. In a machine of the class described, the combination of groups of totalizers, means for selecting any totalizer in any group for restoring it to zero, a plurality of recording devices equal in number to the groups, a common actuator for said devices, means for supporting said actuator for lateral and rotatable movements, means for moving the actuator laterally independent of said support to select the device associated with the group from which the totalizer is selected, and means for rotating said actuator differentially to cause the selected device to record the selected totalizer.

27. In a machine of the class described, the combination of groups of totalizers, means for selecting any totalizer in any group for restoring it to zero, a plurality of recording devices equal in number to the groups, a common actuator for said devices, means for supporting said actuator for lateral and rotatable movements, means for moving the actuator laterally independent of said support to select the device associated with the group from which the totalizer is selected, means for moving said support to engage the actuator with the selected device, and means for rotating said actuator differentially to cause the selected device to record the selected totalizer.

28. In a machine of the class described, the combination of groups of totalizers, means for selecting any totalizer in any group for restoring it to zero, a plurality of recording devices one for each group of totalizers, a common actuator for said devices, means for supporting said actuator for lateral and rotatable movements, strip controlled means for moving said actuator laterally independent of said support to select the device associated with the selected group, and means for rotating said support so that said actuator will operate the selected recording device to record the totalizer selected.

29. In a machine of the class described, the combination of groups of totalizers, means for selecting any totalizer in any group for restoring it to zero, a plurality of recording devices one for each group of totalizers, a common actuator for said devices, means for supporting said actuator for lateral and rotatable movements, strip controlled means for moving said actuator laterally independent of said support to select the device associated with the selected group, means for moving said actuator into engagement with the selected device, and means for rotating said support so that said actuator will operate the selected recording device to record the totalizer selected.

30. In a machine of the class described, the combination of groups of totalizers, means for selecting any totalizer in any group for restoring it to zero, a plurality of recording devices one for each group of totalizers, a common actuator for said devices, means for supporting said actuator for lateral and rotatable movements, strip controlled means for moving said actuator laterally independent of said support to select the device associated with the selected group, means for moving said actuator into engagement with the selected device, means for rotating said support so that said actuator will operate the selected recording device to record the totalizer selected, and manually operated means for determining whether said moving means shall be effective.

31. In a machine of the class described, the combination of groups of totalizers, means for selecting any totalizer in any group for restoring it to zero, a plurality of recording devices one for each group of totalizers, a common actuator for said devices, and differential mechanism for moving said actuator into operative relation with any of said devices depending upon the totalizer selection.

32. In a machine of the class described, the combination of groups of totalizers, electromagnetic means for selecting any totalizer in any group for restoring it to zero, a plurality of recording devices one for each group of totalizers, a common actuator for said devices, and means for moving said actuator into operative relation with any of said devices depending upon the totalizer selection.

33. In a machine of the class described, the combination of groups of totalizers, electromagnetic means for selecting any totalizer in any group for restoring it to zero, a plurality of recording devices one for each group of totalizers, a common actuator for said devices, and differential mechanism for moving said actuator into operative relation with any of said devices depending upon the totalizer selection.

34. In a machine of the class described, the combination of groups of totalizers, means for selecting any totalizer in any group for restoring it to zero, a plurality of recording devices one for each group of totalizers, a common actuator for said devices, means for moving said actuator into operative relation with any of said devices depending upon the totalizer selection, and means for operating the actuator to record the totalizer selected.

35. In a machine of the class described, the combination of totalizers, means for selecting any totalizer in any group for restoring it to zero, a plurality of recording devices one for each group of totalizers, a common actuator for said devices, strip controlled means for moving said actuator into operative relation with any of said devices depending upon the totalizer selection, and means for operating the actuator to record the totalizer selected.

36. In a machine of the class described, the combination of totalizers, means for selecting any totalizer in any group for restoring it to zero, a plurality of recording devices one for each group of totalizers, a common actuator for said devices, strip control means for moving said actuator into operative relation with any of said devices depending upon the totalizer selection, and strip controlled means for operating the actuator to record the totalizer selected.

37. In a machine of the class described, the combination of groups of totalizers, means for selecting any totalizer in any group for restoring it to zero, a plurality of recording devices equal in number to the groups, a common actuator for said devices, means for moving said actuator laterally into operative relation with any of said devices depending upon the totalizer selection, means for moving said actuator into engagement with the selected device, and means for operating the actuator to record the totalizer selected.

38. In a machine of the class described, the combination of groups of totalizers, means for selecting any totalizer in any group for restoring it to zero, a plurality of recording devices one for each group of totalizers, a common actuator for said devices, means for moving said actuator into operative relation with any of said devices depending upon the totalizer selection, and differential mechanism for operating the actuator to record the totalizer selected.

39. In a machine of the class described, the combination of groups of totalizers, means for selecting any totalizer in any group for restoring it to zero, a plurality of recording devices one for each group of totalizers, a common actuator for said devices, means for moving said actuator into operative relation with any of said devices depending upon the totalizer selection, and electro-magnetic means for operating the actuator to record the totalizer selected.

40. In a machine of the class described, the combination of groups of totalizers, electromagnetic means for selecting any totalizer in any group for restoring it to zero, a plurality of recording devices one for each group of totalizers, a common actuator for said devices, means for moving said actuator into operative relation with any of said devices depending upon the totalizer selection, and means for operating the actuator to record the totalizer selected.

41. In a machine of the class described, the combination of groups of totalizers, electromagnetic means for selecting any totalizer in any group for restoring it to zero, a plurality of recording devices one for each group of totalizers, a common actuator for said devices, and strip controlled means for operating the actuator to record the totalizer selected.

42. In a machine of the class described, the combination of groups of totalizers, electromagnetic means for selecting any totalizer in any group for restoring it to zero, a plurality of recording devices one for each group of totalizers, a common actuator for said devices, means for moving said actuator into operative relation with any of said devices depending upon the totalizer selection, and strip controlled means for operating the actuator to record the totalizer selected.

43. In a machine of the class described, the combination of groups of totalizers, electromagnetic means for selecting any totalizer in any group for restoring it to zero, a plurality of recording devices one for each group of totalizers, a common actuator for said devices, and strip controlled means for moving the actuator into operative relation with any of said devices depending upon the totalizer selection and for differentially operating said actuator to record the totalizer selected.

44. In a machine of the class described, the combination of groups of totalizers, electromagnetic means for selecting any totalizer in any group for restoring it to zero, a plurality of recording devices one for each group of totalizers, a common actuator for said devices, means for moving said actuator into operative relation with any of said devices depending upon the totalizer selection, and differential mechanism for operating the actuator to record the totalizer selected.

45. In a machine of the class described, the combination of groups of totalizers, electromagnetic means for selecting any totalizer in any group for restoring it to zero, a plurality of recording devices one for each group of totalizers, a common actuator for said devices, means for moving said actuator into operative relation with any of said devices depending upon the totalizer selection, and electro-magnetic means for operating the actuator to record the totalizer selected.

46. In a machine of the class described, the combination of groups of totalizers, means for selecting any totalizer in any group for restoring it to zero, a plurality of recording devices one for each group of totalizers, a common actuator for said devices, and means for moving said actuator differentially to bring it into operative position with the desired device and for differentially operating said actuator to record the selected totalizer.

47. In a machine of the class described, the combination of groups of totalizers, a control sheet, means controlled by said sheet for selecting any totalizer in any group for restoring it to zero, a plurality of recording devices, one for each group of totalizers, and means controlled by said sheet for selecting the device associated with the group from which the totalizer is selected.

48. In a machine of the class described, the combination of a main operating device, groups of totalizers, a control sheet, means controlled by the sheet for selecting totalizers in any order from the groups for restoring them to zero, a plurality of recording devices equal in number to the groups, means controlled by said sheet for selecting the devices associated with the groups from which the totalizers are selected, and means controlled by said sheet for stopping the main operating device upon completion of the totalizer selection.

49. In a machine of the class described, the combination of groups of totalizers, a control strip, means controlled by said strip for selecting any totalizer in any group for restoring it to zero, a plurality of recording devices one for each group of totalizers, means controlled by said strip for selecting the device associated with the group from which the totalizer is selected, and means controlled by said strip for actuating the selected device to record the selected totalizer.

50. In a machine of the class described, the combination of groups of totalizers, electro-magnetic means for selecting any totalizer in any group for restoring it to zero, and means for restoring the selected totalizer to zero.

51. In a machine of the class described, the combination of groups of totalizers, electromagnetic means for selecting any totalizer in any group for restoring it to zero, and means for designating the totalizer selected by making a record.

52. In a machine of the class described, the combination of groups of totalizers, electro-magnetic means for selecting any totalizer in any group for restoring it to zero, and strip controlled means for identifying the totalizer selected by making a record.

53. In a machine of the class described, the combination of groups of totalizers, electromagnetic means for selecting any totalizer in any group for restoring it to zero, and means for designating the totalizer selected and the group from which it is selected by making a record in a certain position on record material.

54. In a machine of the class described, the combination of groups of totalizers, electromagnetic means for selecting any totalizer in any group for restoring it to zero, and means for designating the totalizer selected and the group from which it is selected by making a printed and perforated record in a certain position on record material.

55. In a machine of the class described, the combination of groups of totalizers, electromagnetic means for selecting any totalizer in any group for restoring it to zero, and strip controlled means for designating the totalizer selected and the group from which it is selected by making a printed and perforated record in a certain position on record material.

56. In a machine of the class described, the combination of groups of totalizers, electromagnetic means for selecting any totalizer in any group for restoring it to zero, record material having a plurality of fields for receiving data, and means for designating the totalizer selected and the group from which it is selected by making a record in certain of said fields.

57. In a machine of the class described, the combination of groups of totalizers, electromagnetic means for selecting any totalizer in any group for restoring it to zero, record material having a plurality of fields for receiving data, and means for designating the totalizer selected and the group from which it is selected by making a printed and perforated record in certain of said fields.

58. In a machine of the class described, the combination of groups of totalizers, a control sheet, electromagnetic means controlled by said sheet for selecting any totalizer in any group for restoring it to zero, and means for designating the totalizer selected by making a record.

59. In a machine of the class described, the combination of groups of totalizers, a control strip, electromagnetic means for selecting any totalizer in any group for restoring it to zero, and means for designating the totalizer selected by making a printed and perforated record.

60. In a machine of the class described, the combination of groups of totalizers, means for selecting any totalizer in any group for restoring it to zero, a plurality of printing members equal in number to the groups each member having means for identifying each totalizer of its own group, means for selecting the member corresponding to the group from which the totalizer is selected, and means common to all members for positioning the selected one so as to print an identification of the totalizer selected.

61. In a machine of the class described, the combination of groups of totalizers, means for selecting any totalizer in any group for restoring it to zero, a plurality of printing members equal in number to the groups each member having means for identifying each totalizer of its own group, and means for selecting the member corresponding to the group from which the totalizer is selected and for positioning the selected member so as to print an identification of the totalizer selected.

62. In a machine of the class described, the combination of groups of totalizers, means for selecting any totalizer in any group for restoring it to zero, a plurality of printing members equal in number to the groups each member having means for identifying each totalizer of its own group, and strip controlled means for selecting the member corresponding to the group from which the totalizer is selected and for positioning the selected member so as to print an identification of the totalizer selected.

63. In a machine of the class described, the combination of groups of totalizers, means for selecting any totalizer in any group for restoring it to zero, a plurality of printing members equal in number to the groups each member having means for identifying each totalizer of its own group, and electro-magnetic means for selecting the member corresponding to the group from which the totalizer is selected and for positioning the selected member so as to print an identification of the totalizer selected.

64. In a machine of the class described, the combination of groups of totalizers, means for selecting any totalizer in any group for restoring it to zero, a plurality of printing members equal in number to the groups each member having means for identifying each totalizer of its own group, electro-magnetic means for selecting the member corresponding to the group from which the totalizer is selected, and means for positioning the selected member so as to print an identification of the totalizer selected.

65. In a machine of the class described, the combination of groups of totalizers, means for selecting any totalizer in any group for restoring it to zero, a plurality of printing members equal in number to the groups each member having means for identifying each totalizer of its own group, means for selecting the member corresponding to the group from which the totalizer is selected, and electro-magnetic means for positioning the selected member so as to print an identification of the totalizer selected.

66. In a machine of the class described, the combination of groups of totalizers, means for selecting any totalizer in any group for restoring it to zero, a plurality of perforating devices equal in number to the groups each device being adapted to make perforations arranged so as to identify each totalizer of its own group, and means for selecting the perforating device corresponding to the group from which the totalizer is selected and for controlling the selected device so as to perforate an identification of the totalizer selected.

67. In a machine of the class described, the combination of groups of totalizers, means for selecting any totalizer in any group for restoring it to zero, a plurality of perforating devices equal in number to the groups each device being adapted to make perforations arranged so as to identify each totalizer of its own group, electro-magnetic means for selecting the perforating device corresponding to the group from which the totalizer is selected, and means for controlling the selected device so as to perforate an identification of the totalizer selected.

68. In a machine of the class described, the combination of groups of totalizers, means for selecting any totalizer in any group for restoring it to zero, a plurality of perforating devices equal in number to the groups each device being adapted to make perforations arranged so as to identify each totalizer of its own group, means for selecting the perforating device corresponding to the group from which the totalizer is selected, and electro-magnetic means for controlling the selected device so as to perforate an identification of the totalizer selected.

69. In a machine of the class described, the combination of groups of totalizers, means for selecting any totalizer in any group for restoring it to zero, a plurality of printing and perforating devices equal in number to the groups each device having means for identifying each totalizer of its own group, means for selecting the device corresponding to the group from which the totalizer is selected, and means for controlling the selected device so as to print and perforate an identification of the totalizer selected.

70. In a machine of the class described, the combination of groups of totalizers, means for selecting any totalizer in any group for restoring it to zero, a plurality of printing and perforating devices equal in number to the groups each device having means for identifying each totalizer of its own group, and means for selecting the device corresponding to the group from which the totalizer is selected and for controlling the selected device so as to print and perforate an identification of the totalizers selected.

71. In a machine of the class described, the combination of a plurality of totalizers arranged in groups, a control strip, means controlled by said strip for selecting any totalizer in any group for restoring it to zero, a plurality of printing members equal in number to the groups each member having means for identifying each totalizer of its own group, and means controlled by said strip for selecting the member corresponding to the group from which the totalizer is selected and for positioning the selected member so as to print an identification of the totalizer selected.

72. In a machine of the class described, the combination of a plurality of totalizers arranged in groups, a control strip, means controlled by said strip for selecting any totalizer in any group for restoring it to zero, a plurality of printing members equal in number to the groups each member having means for identifying each totalizer of its own group, means controlled by said strip for selecting the member corresponding to the group from which the totalizer is selected, and means controlled by said strip for positioning the selected member so as to record the selected totalizer.

73. In a machine of the class described, the combination of a plurality of totalizers arranged in groups, a control strip, means controlled by said strip for selecting any totalizer in any group for restoring it to zero, a plurality of sets of punches one set for each group of totalizers each set being adapted to identify all totalizers of its respective group, a plurality of punch actuators equal in number to the sets, and means controlled by said strip for selecting the actuator corresponding to the group from which the totalizer is selected and for differentially positioning said actuator so as to operate certain of the punches of its own set corresponding to the totalizer selected.

74. In a machine of the class described, the combination of a plurality of totalizers arranged in groups, means for selecting any totalizer in any group for restoring it to zero, a plurality of sets of punches one set for each group of totalizers each set being adapted to identify all totalizers of its respective group, a plurality of punch actuators equal in number to the sets, and means for selecting the actuator corresponding to the group from which the totalizer is selected and for differentially positioning said actuator so as to operate certain of the punches of its own set corresponding to the totalizer selected.

75. In a machine of the class described, the combination of a plurality of totalizers arranged in groups, means for selecting any totalizer in any group for restoring it to zero, a plurality of sets of punches one set for each group of totalizers each set being adapted to identify all totalizers of its respective group, a plurality of punch actuators equal in number to the sets, means for selecting the actuator corresponding to the group from which the totalizer is selected, and means for differentially positioning the selected actuator to select certain punches of its respective set depending upon the totalizer selected.

76. In a machine of the class described, the combination of totalizers arranged in groups, means for selecting any totalizer in any group for restoring it to zero, a plurality of sets of punches one set for each group of totalizers each set being adapted to identify all totalizers of its respective group, a plurality of punch actuators equal in number to the sets, means for selecting the actuator corresponding to the group from which the totalizer is selected, and means common to all of said actuators for differentially positioning the selected one to select certain punches of its respective set depending upon the totalizer selected.

77. In a machine of the class described, the combination of a plurality of totalizers arranged in groups, means for selecting any totalizer in any group for restoring it to zero, a plurality of sets of punches one set for each group of totalizers each set being adapted to identify all totalizers of its respective group, a plurality of punch actuators equal in number to the sets, and electrically controlled means for selecting the actuator corresponding to the group from which the totalizer is selected and for differentially positioning said actuator so as to operate certain punches of its own set corresponding to the totalizer selected.

78. In a machine of the class described, the combination of a plurality of totalizers arranged in groups, means for selecting any totalizer in any group for restoring it to zero, a plurality of sets of punches one set for each group of totalizers each set being adapted to identify all totalizers of its respective group, a plurality of punch actuators equal in number to the sets, electrically controlled differential mechanism for selecting the actuator corresponding to the group from which the totalizer is selected, and means for differentially positioning the selected actuator to select certain of the punches of its respective set depending on the totalizer selected.

79. In a machine of the class described, the combination of a plurality of totalizers arranged in groups, means for selecting any totalizer in any group for restoring it to zero, a plurality of sets of punches one set for each group of totalizers each set being adapted to identify all totalizers of its respective group, a plurality of punch actuators equal in number to the sets, electrically controlled differential mechanism for selecting the actuator corresponding to the group from which the totalizer is selected, and an electrically controlled differential mechanism for positioning the selected actuator to select certain punches of its respective set depending on the totalizer selected.

80. In a machine of the class described, the combination of a plurality of totalizers arranged in groups, means for selecting any totalizer in any group for restoring it to zero, a plurality of recording means equal in number to the groups, a plurality of aliners one for each recording means and normally in engagement therewith, means for selecting the recording means associated with the group from which the totalizer is selected, and means for disengaging the aliner from the selected recording means.

81. In a machine of the class described, the combination of a plurality of totalizers arranged in groups, means for selecting any totalizer in any group for restoring it to zero, a plurality of recording means equal in number to the groups, a plurality of aliners equal in number to the recording means and normally in engagement therewith, means for selecting the recording means associated with the group from which the totalizer is selected, means for disengaging the aliner from the selected recording means, and means for operating said disengaging means.

82. In a machine of the class described, the combination of a plurality of totalizers arranged in groups, means for selecting any totalizer in any group for restoring it to zero, a plurality of recording means equal in number to the groups, a plurality of aliners one for each recording means and normally in engagement therewith, means for selecting the recording means associated with the group from which the totalizer is selected, means for disengaging the aliner from the selected recording means, and means for locking said aliner in the disengaged position.

83. In a machine of the class described, the combination of a plurality of totalizers arranged in groups, means for selecting any totalizer in any group for restoring it to zero, a plurality of recording devices equal in number to the groups, a plurality of aliners one for each of said devices and normally in engagement therewith, means for selecting the device associated with the group from which the totalizer is selected, means for disengaging the aliner from the selected device, means for operating said disengaging means, and means for locking said aliner in the disengaged position.

84. In a machine of the class described, the combination of a plurality of totalizers arranged in groups, means for selecting any totalizer in any group, a plurality of recording devices equal in number to the groups, a plurality of aliners one for each device and normally in engagement therewith, means for selecting the device associated with the group from which the totalizer is selected, means for disengaging the aliner from the selected device, means for locking said aliner in the disengaged position, and means for operating said locking means.

85. In a machine of the class described, the combination of a plurality of totalizers arranged in groups, means for selecting any totalizer in any group, a plurality of recording devices equal in number to the groups, a plurality of aliners one for each device and normally in engagement therewith, means for selecting the device associated with the group from which the totalizer is selected, means for disengaging the aliner from the selected device, means for locking said aliner in the disengaged position, and means for operating said disengaging means and said locking means.

86. In a machine of the class described, the combination of a plurality of totalizers arranged in groups, means for selecting any totalizer in any group, a plurality of recording devices equal in number to the groups, a plurality of aliners one for each device and normally in engagement therewith, means for selecting the device associated with the group from which the totalizer is selected, means for disengaging the aliner from the selected device, means for locking said aliner in the disengaged position, and common means for operating said disengaging means and said locking means.

87. In a machine of the class described, the combination of a plurality of totalizers arranged in groups, means for selecting any totalizer in any group, a plurality of recording devices equal in number to the groups, a plurality of aliners one for each device and normally in engagement therewith, means for selecting the device associated with the group from which the totalizer is selected, means for disengaging the aliner from the selected device, means for locking said aliner in the disengaged position, means for operating said locking means, and manually operated means controlling said operating means.

88. In a machine of the class described, the combination of a plurality of totalizers arranged in groups, means for selecting any totalizer in any group, a plurality of recording devices equal in number to the groups, a plurality of aliners one for each device and normally in engagement therewith, means for selecting the device associated with the group from which the totalizer is selected, means for disengaging the aliner from the selected device, means for locking said aliner in the disengaged position, means for operating said disengaging means and said locking means, and manually controlled means for controlling said operating means.

89. In a machine of the class described, the combination of a plurality of totalizers arranged in groups, means for selecting any totalizer in any group for restoring it to zero, a plurality of recording means equal in number to the groups, a plurality of aliners one for each recording means and normally in engagement therewith, means for selecting the recording means associated with the group from which the totalizer is selected, means for disengaging the aliner from the selected recording means, and means for locking all the remaining aliners in the engaged position.

90. In a machine of the class described, the combination of a plurality of totalizers arranged in groups, means for selecting any totalizer in any group for restoring it to zero, a plurality of recording devices equal in number to the groups, a plurality of aliners one for each device and normally in engagement therewith, means for selecting the device associated with the group from which the totalizer is selected, means for disengaging the aliner from the selected device, means for locking all the remaining aliners in the engaged position, and means for operating said locking means.

91. In a machine of the class described, the combination of a plurality of totalizers arranged in groups, means for selecting any totalizer in any group for restoring it to zero, a plurality of recording means equal in number to the groups, a plurality of aliners one for each recording means and normally in engagement therewith, means for selecting the recording means associated with the group from which the totalizer is selected, means for disengaging the aliner from the selected recording means, and means for locking said aliner in the disengaged position and locking all the remaining aliners in the engaged position.

92. In a machine of the class described, the combination of a plurality of totalizers arranged in groups, means for selecting any totalizer in any group for restoring it to zero, a plurality of recording means equal in number to the groups, a plurality of aliners one for each recording means and normally in engagement therewith, an actuator common to all of said recording means and normally out of engagement and out of alinement, means for moving the actuator into alinement with the recording means corresponding to the group from which the totalizer is selected, and means for moving said actuator into engagement with the selected recording means and for disengaging the aliner from said selected recording means.

93. In a machine of the class described, the combination of a plurality of totalizers arranged in groups, means for selecting any totalizer in any group for restoring it to zero, a plurality of recording means equal in number to the groups, a plurality of aliners one for each recording means and normally in engagement therewith, an actuator common to all of said recording means and normally out of engagement and out of alinement, means for moving the actuator into alinement with the recording means corresponding to the group from which the totalizer is selected, and means for moving said actuator into engagement with the selected recording means and simultaneously disengaging the aliner from said selected recording means.

94. In a machine of the class described, the combination of a plurality of totalizers arranged in groups, means for selecting any totalizer in any group for restoring it to zero, a plurality of recording means equal in number to the groups, a plurality of aliners one for each recording means and normally in engagement therewith, an actuator common to all of said recording means and normally out of engagement and out of alinement, means for moving the actuator into alinement with the recording means corresponding to the group from which the totalizer is selected, means for moving said actuator into engagement with the selected recording means and simultaneously disengaging the aliner from said selected recording means, and means for locking the moved aliner out of engagement and all the remaining aliners in engagement.

95. In a machine of the class described, the combination of a plurality of totalizers arranged in groups, means for selecting any totalizer in any group for restoring it to zero, a plurality of recording means equal in number to the groups, a plurality of aliners one for each recording means and normally in engagement therewith, an actuator common to all of said recording means and normally out of engagement and out of alinement, means for moving the actuator into alinement with the recording means corresponding to the group from which the totalizer is selected, means for moving said actuator into engagement with the selected recording means and simultaneously disengaging the aliner from said selected recording means, and common means for locking the moved aliner out of engagement and all the remaining aliners in engagement.

96. In a machine of the class described, the combination of a plurality of totalizers arranged in groups, means for selecting any totalizer in any group for restoring it to zero, a plurality of recording means equal in number to the groups, a plurality of aliners one for each recording means and normally in engagement therewith, an actuator common to all of said recording means and normally out of engagement and out of alinement, differential mechanism for moving the actuator into alinement with the recording means corresponding to the group from which the totalizer is selected, means for moving said actuator into engagement with the recording means and for disengaging the aliner from said selected recording means, and differential mechanism for controlling said actuator so that the recording means will be set to record the selected totalizer.

97. In a machine of the class described, the combination of groups of totalizers arranged ten to the group, means for selecting any group, means for selecting any totalizer in the selected group for restoring it to zero, means for restoring the selected totalizer to zero, and means for recording the selected totalizer in a position appropriate to the group.

98. In a machine of the class described, the combination of groups of totalizers arranged ten to the group, means for selecting any group, means for selecting any totalizer in the selected group for restoring it to zero, means for restoring the selected totalizer to zero, and strip controlled means for recording the group and the selected totalizer.

99. In a machine of the class described, the combination of groups of totalizers, electro-magnetic means for selecting any group, electro-magnetic means for selecting any totalizer in the selected group for restoring it to zero, means for restoring the selected totalizer to zero, and electro-magnetic means for recording the selected totalizer.

100. In a machine of the class described, the combination of a plurality of totalizers arranged in groups, electro-magnetic means for selecting any group, electro-magnetic means for selecting any totalizer in the selected group for restoring it to zero, means for restoring the selected totalizer to zero, and means for recording the selected totalizer in a certain position on record material to identify the selected group.

101. In a machine of the class described, the combination of a plurality of totalizers arranged in groups, an electro-magnetic means for selecting any group, electro-magnetic means for selecting any totalizer in the selected group for restoring it to zero, means for restoring the selected totalizer to zero, and strip controlled means for recording the selected totalizer in a certain position on record material to identify the selected group.

102. In a machine of the class described, the combination of groups of totalizers arranged ten to the group, means for selecting any totalizer in any group for restoring it to zero, means for restoring the selected totalizer to zero, means for recording the data thereon, and means for recording the selected totalizer by perforating and printing a record strip in one of ten columns to designate the group to which the selected totalizer belongs.

103. In a machine of the class described, the combination of groups of totalizers arranged ten to the group, means for selecting any totalizer in any group for restoring it to zero, means for restoring the selected totalizer to zero, means for recording the data thereon, and means for recording the selected totalizer by printing on a record strip in one of ten columns to designate the group to which the selected totalizer belongs.

104. In a machine of the class described, the combination of groups of totalizers arranged ten to the group, means for selecting any totalizer in any group for restoring it to zero, means for restoring the selected totalizer to zero, means for recording the data thereon, and means for recording the selected totalizer by perforating on a record strip in one of ten columns to designate the group to which the selected totalizer belongs.

105. In a machine of the class described, the combination of a plurality of totalizers, a control sheet, electro-magnetic means for selecting totalizers in any order for restoring them to zero, and electro-magnetic means for recording the totalizers as selected.

106. In a machine of the class described, the combination of a plurality of totalizers, a control strip, electro-magnetic means for selecting totalizers in any order for restoring them to zero, means for restoring the selected totalizers to zero in the order of selection, and electro-magnetic means for recording the totalizers as selected.

107. In a machine of the class described, the combination of a plurality of totalizers, a control strip, means controlled by said strip for selecting totalizers in any order for restoring them to zero, and electro-magnetic means for recording the totalizers as selected.

108. In a machine of the class described, the combination of a plurality of totalizers, a control strip, means controlled by said strip for selecting totalizers in any order for restoring them to zero, means for restoring the selected totalizers to zero in the order of selection, and electro-magnetic means for recording the totalizers as selected.

109. In a machine of the class described, the combination of a plurality of totalizers, a control strip, electro-magnetic means for selecting totalizers in any order for restoring them to zero, means for recording the totalizers as selected, groups of contacts for making circuits for the electro-magnets as determined by said strip, and means for moving the contacts into cooperative relation with said strip.

110. In a machine of the class described, the combination of a plurality of totalizers, a control strip, electro-magnetic means for selecting totalizers in any order for restoring them to zero, means for recording the totalizers as selected, groups of contacts for making circuits for the electro-magnets as determined by said strip, and common means for moving the contacts into cooperative relation with said strip.

111. In a machine of the class described, the combination of a main operating device, a plurality of totalizers, a control strip, electro-magnetic means for selecting totalizers in any order for restoring them to zero, means for recording the totalizers as selected, groups of contacts for making circuits for the electro-magnets as determined by said strip, and means controlled by the strip for stopping the main operating device at the completion of the totalizer selection.

112. In a machine of the class described, the combination of a main operating device, a plurality of totalizers, a control strip, electro-magnetic means for selecting totalizers in any order for restoring them to zero, means for recording the totalizers as selected, groups of contacts for making circuits for the electro-magnets as determined by said strip, means for moving the contacts into cooperative relation with said strip, and means controlled by the strip for rendering the main operating device ineffective after the completion of the totalizer selection.

113. In a machine of the class described, the combination of a plurality of totalizers, a control strip, electro-magnetic means controlled by said strip for selecting totalizers in any order for restoring them to zero, means for restoring the selected totalizers to zero in the order of selection, and electro-magnetic means controlled by said strip for recording the totalizers as selected.

114. In a machine of the class described, the combination of a plurality of totalizers, a control strip, electro-magnetic means for selecting totalizers in any order for restoring them to zero, electro-magnetic means for recording the totalizers as selected, and a plurality of groups of contacts for making circuits for the electro-magnetic means as determined by said strip.

115. In a machine of the class described, the combination of a plurality of totalizers, a control strip, electro-magnetic means for selecting totalizers in any order for restoring them to zero, means for recording the totalizers as selected, and a plurality of groups of contacts for making circuits for the electro-magnets as determined by said strip.

116. In a machine of the class described, the combination of a plurality of totalizers, a control strip, means for selecting totalizers in any order for restoring them to zero, electro-magnetic means for recording the totalizers as selected, and a plurality of groups of contacts for making circuits for the electro-magnetic means as determined by said strip.

117. In a machine of the class described, the combination of a plurality of totalizers, a control strip, electro-magnetic means for selecting totalizers in any order for restoring them to zero, electro-magnetic means for recording the totalizers as selected, and a plurality of groups of contacts arranged three to the group for cooperating with said strip to make circuits for the electro-magnetic means as determined by said strip.

118. In a machine of the class described, the combination of mechanism for auditing detail records, and mechanism for subsequently producing summary records which can be audited by said detail auditing mechanism.

119. In a machine of the class described, the combination of mechanism for auditing detail records and summary records, and recording mechanism for subsequently producing summary records from the audit of either detail records or summary records adapted to be audited by said auditing mechanism.

120. In a machine for auditing either detail record strips or summary record strips, the combination of a plurality of totalizers, common means for selecting the totalizers when the machine is auditing detail record strips and when it is auditing summary record strips, and means for actuating the selected totalizers.

121. In a machine for auditing either detail or summary records, the combination of groups of totalizers, common means for selecting one or more of the totalizers from the groups when a detail record is being audited and when a summary record is being audited during a single operation of the machine, and means for actuating the selected totalizers.

122. In a machine for auditing either detail or summary records, the combination of groups of totalizers, common means for selecting one or more of the groups when either a detail record or a summary record is audited during a single operation of the machine, common means for selecting the totalizers from the selected groups when either a detail record or a summary record is audited, and means for actuating the selected totalizers.

123. In a machine for auditing either detail or summary records, the combination of groups of totalizers common means for automatically selecting one or more of the groups and the totalizers from the groups when either a detail record or a summary record is being analyzed during a single operation of the machine, and means for actuating the selected totalizers.

124. In a machine for auditing either detail records or summary records, the combination of groups of totalizers, common means for segregating the groups when the machine is analyzing either detail or summary records, and electro-magnetic means controlling the selection of totalizers from the segregated groups when analyzing either record.

125. In a machine of the class described, the combination of selective groups of totalizers, groups of analyzers equal in number to the groups of totalizers and to the control positions on a record for analyzing the same, and a plurality of recording means equal in number to the groups of analyzers for producing a control record.

126. In a machine of the class described, the combination of groups of totalizers, a plurality of group selecting means equal in number to the positions on a control record and controlled by the same, and a plurality of means equal in number to the groups for producing a control record.

127. In a machine of the class described, the combination of groups of totalizers, a plurality of group selecting means equal in number to the positions on a control record and controlled by the same, a plurality of recording devices equal in number to the groups, and means for operating said devices to produce a control record in accordance with the totalizers selected.

128. In a machine of the class described, the combination of groups of totalizers, a plurality of group selecting means equal in number to the positions on a control record and controlled by the same, a plurality of recording devices equal in number to the groups, means for operating said devices to produce a control record in accordance with the totalizers selected, and a control strip for controlling said means.

129. In a machine of the class described the combination of groups of totalizers; recording devices, one for each group of totalizers; a control record having totalizer group controlling positions with group selecting control points and group recording control points in such positions, totalizer controlling positions with totalizer selecting control points in such positions, and totalizer recording control positions with totalizer recording control points in those positions; an analyzer for interpreting the record; and means controlled by the analyzer to control the selection of the groups, the selection of the totalizers from the selected groups, and the recording of the selected totalizers as determined by the control sheet.

130. In a machine of the class described, the combination of groups of totalizers; a plurality of recording devices; a control sheet having totalizer group controlling positions with group selecting control points and group recording control points in such positions, and totalizer controlling positions with totalizer selecting control points in such positions; an analyzer for interpreting the record; means controlled by the analyzer to select any totalizer in any group for restoring it to zero; and means controlled by the analyzer for selecting the recording device associated with the group from which the totalizer is selected.

131. In a machine of the class described, the combination of groups of totalizers; a control record having totalizer group controlling positions with group selecting control perforations and group recording control perforations in such positions; an analyzer for interpreting the record; means controlled by the analyzer for selecting any group; a plurality of recording devices, one for each group of totalizers; and means controlled by the analyzer to select the device associated with the selected group.

132. In a machine of the class described, the combination of groups of totalizers; a control record having totalizer group controlling positions with group selecting control perforations and group recording control perforations in such positions, and totalizer controlling positions with totalizer selecting control perforations in such positions; an analyzer for interpreting the record; means controlled by the analyzer for selecting any totalizer in any group to restore it to zero; a plurality of recording devices, one for each group of totalizers; and means controlled by the analyzer to select the recording device associated with the group from which the totalizer is selected to record the group selected, and the totalizer selected from such group.

133. In a machine of the class described, the combination of a plurality of totalizers; a plurality of recording devices; a control strip having totalizer controlling positions with totalizer selecting control perforations in such positions to control the selection of the totalizers, and totalizer recording control positions with totalizer recording control perforations in such positions to control the recording of the selected totalizers; and an analyzer for interpreting the record.

134. In a machine of the class described, the combination of groups of totalizers; recording devices, one associated with each group of totalizers; a control strip having totalizer group controlling columns with group selecting control perforations and group recording control perforations in such columns; and an analyzer to interpret the record to control the selection of the groups and recording thereof respectively.

135. In a machine of the class described, the combination of a plurality of totalizers; a control sheet having totalizer controlling positions with totalizer selecting control points in such positions, and a special control point; an analyzer to interpret the record and control the selection of the totalizers; and means cooperating with the special control point to stop the machine upon completion of the totalizer selection.

136. In a machine of the class described, the combination of groups of totalizers; a plurality of recording devices, one for each group of totalizers; a control strip having totalizer group controlling positions with control points in such positions, totalizer controlling positions with totalizer selecting control points in such positions, and totalizer recording control positions with totalizer control points in such positions; and an analyzer to interpret the record and control the recording devices, whereby certain of the control points in the group controlling positions control the group selection, and other of the control points in the group controlling positions control the recording devices to record the groups, the control points in the totalizer controlling positions control the selection of the totalizers from the selected groups, and the control points in the totalizer recording control positions control the recording of the selected totalizers.

In testimony whereof I affix my signature.

MAXIMILIAN M. GOLDBERG.